United States Patent [19]

Molaire et al.

[11] Patent Number: 5,773,181

[45] Date of Patent: Jun. 30, 1998

[54] NON-UNIFORMLY SUBSTITUTED PHTHALOCYANINE COMPOSITIONS PREPARATION METHODS, AND ELECTROPHOTOGRAPHIC ELEMENTS

[75] Inventors: Michel F. Molaire; Jeanne Ellen Kaeding; William Tod Gruenbaum, all of Rochester, N.Y.

[73] Assignee: Eastman Kodak Company, Rochester, N.Y.

[21] Appl. No.: 448,056

[22] Filed: May 23, 1995

[51] Int. Cl.$^6$ .................................................. G03G 5/06
[52] U.S. Cl. .......................... 430/78; 430/135; 540/141; 540/136
[58] Field of Search ...................... 430/78, 135; 106/411, 106/412; 252/581.1; 540/136, 141, 122

[56] References Cited

U.S. PATENT DOCUMENTS

| | | | |
|---|---|---|---|
| 3,296,008 | 1/1967 | Riehen | 106/288 |
| 3,615,414 | 10/1971 | Light | 96/1.6 |
| 3,763,182 | 10/1973 | Horiguchi et al. | 260/314.5 |
| 4,141,904 | 2/1979 | Cabut et al. | 106/412 |
| 4,175,960 | 11/1979 | Berwick et al. | 430/58 |
| 4,514,481 | 4/1985 | Scozzafava et al. | 430/58 |
| 4,529,688 | 7/1985 | Law et al. | 430/495 |
| 4,555,467 | 11/1985 | Hasegawa et al. | 430/110 |
| 4,578,334 | 3/1986 | Borsenberger et al. | 430/59 |
| 4,666,802 | 5/1987 | Hung et al. | 430/58 |
| 4,701,396 | 10/1987 | Hung et al. | 430/78 |
| 4,719,163 | 1/1988 | Staudenmayer et al. | 430/58 |
| 4,785,999 | 11/1988 | Takijiri | 241/26 |
| 4,882,427 | 11/1989 | Enokida et al. | 430/76 |
| 4,994,566 | 2/1991 | Mimura et al. | 540/141 |
| 5,008,173 | 4/1991 | Mimura et al. | 430/78 |
| 5,039,586 | 8/1991 | Itami et al. | 430/78 |
| 5,055,368 | 10/1991 | Nguyen et al. | 430/78 |
| 5,059,355 | 10/1991 | Ono | 430/59 |
| 5,112,711 | 5/1992 | Nguyen et al. | 430/78 |
| 5,132,197 | 7/1992 | Iuchi et al. | 430/76 |
| 5,166,339 | 11/1992 | Duff et al. | 540/141 |
| 5,194,354 | 3/1993 | Takai et al. | 430/58 |
| 5,206,359 | 4/1993 | Mayo et al. | 540/141 |
| 5,238,764 | 8/1993 | Molaire et al. | 430/78 |
| 5,238,766 | 8/1993 | Molaire et al. | 430/78 |
| 5,304,445 | 4/1994 | Itagaki et al. | 430/59 |
| 5,443,935 | 8/1995 | Kojima et al. | 430/78 |
| 5,614,342 | 3/1997 | Molaire et al. | 430/78 |

FOREIGN PATENT DOCUMENTS 1-217362  8/1989  Japan .

93/24865  12/1993  WIPO .

OTHER PUBLICATIONS

Paul M. Borsenberger and David S. Weiss, "Organic Photoreceptors for Imaging Systems", 1993 by Marcel Dekker, Inc., New York, pp. 338–391.

Primary Examiner—Christopher D. Rodee
Attorney, Agent, or Firm—Robert Luke Walker

[57] ABSTRACT

Phthalocyanine compositions and prepartion methods. In a method, first, a phthalocyanine mixture is synthesized that has a plurality of differently substituted phthalocyanines selected from the group consisting of compounds having the general structure:

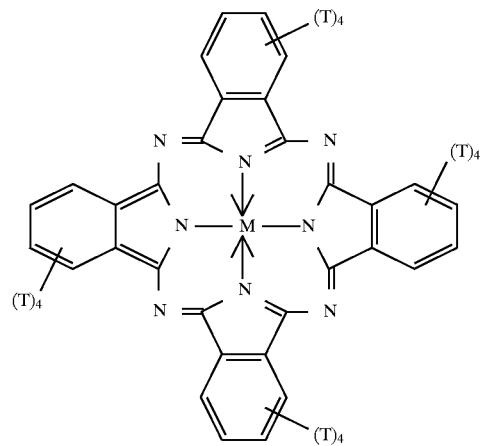

M represents a pair of hydrogen atoms or a covalent or coordinate bonded moiety including a metal atom. Each T substituent is independently selected from the group consisting of H, F, Cl, Br, I, and alkyl having from 1 to 18 carbons. There are at least two different T substituents. The smallest T substituent has a van der Waal's radius that differs from the radius of the largest T substituent by less than about 50 percent of the radius of the smallest substituent. The amorphousness of the phthalocyanine mixture is then imcreased. The amorphous mixture is then contacted with organic solvent having a gamma$_c$ hydrogen bonding parameter of less than 8.0. Prior to the contacting, the amorphous mixture is excluded from contact with organic solvent having a gamma$_c$ hydrogen bonding parameter greater than 9.0.

25 Claims, 25 Drawing Sheets

னon-UNIFORMLY SUBSTITUTED
PHTHALOCYANINE COMPOSITIONS
PREPARATION METHODS, AND
ELECTROPHOTOGRAPHIC ELEMENTS

FIELD OF THE INVENTION

The invention relates to electrophotographic elements and related materials. The invention more particularly relates to methods for preparing mixtures of differently substituted phthalocyanines, electrophotographic elements incorporating such mixtures, and phthalocyanine compositions.

BACKGROUND OF THE INVENTION

In electrophotography an image comprising a pattern of electrostatic potential (also referred to as an electrostatic latent image), is formed on a surface of an electrophotographic element comprising at least two layers: a photoconductive layer and an electrically conductive substrate. The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of photoconductive materials which have been employed in electrophotographic elements are phthalocyanine pigments such as titanyl phthalocyanine and titanyl tetrafluorophthalocyanine. Electrophotographic recording elements containing such pigments as charge-generation materials are useful in electrophotographic laser beam printers because they are capable of providing good photosensitivity in the near infrared region of the electromagnetic spectrum, that is in the range of 700–900 nm.

The photoconductive layer is produced from a liquid coating composition which includes the titanyl phthalocyanine pigment and a solvent solution of polymeric binder. It is necessary that the titanyl phthalocyanine pigment be in a form, either crystalline or amorphous, that is highly photoconductive and sufficiently and stably dispersed in the coating composition to permit its being applied at a low enough concentration to form a very thin layer having high electrophotographic speed in the near infrared range. A variety of methods have been used to produce suitable forms of titanyl phthalocyanine. Different methods have commonly produced titanyl phthalocyanines having differing crystallographic characteristics. (U.S. Pat. No. 5,166,339 to Duff et al presents a table of polymorphs of unsubstituted titanyl phthalocyanine (also referred to as "TiOPc") in which materials bearing multiple designations are grouped as four types. Many types of TiOPc and other phthalocyanines are discussed in Organic Photoreceptors for Imaging Systems, P. M. Borsenberger and D. S. Weiss, Marcel Dekkar, Inc., New York, pp. 338–391.)

In one group of preparations, commonly referred to as "acid-pasting", crude titanyl phthalocyanine is dissolved in an acid solution, which is then diluted with non-solvent to precipitate the titanyl phthalocyanine product. In another group of preparations, the crude titanyl phthalocyanine is milled, generally with particular milling media. Some preparations combine techniques or modify a previously prepared titanyl phthalocyanine.

U.S. Pat. No. 5,132,197 to Iuchi et al teaches a method in which titanyl phthalocyanine was acid pasted, treated with methanol, and milled with ether, monoterpene hydrocarbon, or liquid paraffin to produce a titanyl phthalocyanine having main peaks of the Bragg angle 2θ with respect to X-rays of Cu Kα at 9.0°, 14.2°, 23.9°, and 27.1° (all ±0.2°).

U.S. Pat. No. 5,206,359 to Mayo et al teaches a process in which titanyl phthalocyanine produced by acid pasting is converted to type IV titanyl phthalocyanine from Type X by treatment with halobenzene.

U.S. Pat. No. 5,059,355 to Ono et al teaches a process in which TiOPc was shaken with glass beads producing an amorphous material having no substantial peaks by X-ray diffraction. The amorphous material was stirred with heating in water and ortho-dichlorobenzene. Methanol was added after cooling. A crystalline material was produced which had a distinct peak at 27.3 degrees.

U.S. Pat. No. 4,882,427 to Enokida et al teaches a material having noncrystalline titanyl phthalocyanine and pseudo-non-crystalline titanyl phthalocyanine. The pseudo-noncrystalline material could be prepared by acid pasting or acid slurrying. The noncrystalline titanyl phthalocyanine could be prepared by acid pasting or acid slurrying followed by dry or wet milling, or by mechanical milling for a long time without chemical treatment.

U.S. Pat. No. 5,194,354 to Takai et al teaches that amorphous titanyl phthalocyanine prepared by dry pulverization or acid pasting can be converted, by stirring in methanol, to a low crystalline titanyl phthalocyanine having strong peaks of the Bragg angle 2 theta with respect to X-rays of Cu Kα at 7.2°, 14.2°, 24.0° and 27.2° (all ±0.2°). The low crystalline material, it was indicated, could be treated with various organic solvents to produce crystalline materials: methyl cellosolve or ethylene glycol for material having strong peaks at 7.4°, 10.9°, and 17.9°; propylene glycol, 1,3-butanediol, or glycerine for material having strong peaks at 7.6°, 9.7°, 12.7°, 16.2°, and 26.4°; and aqueous mannitol solution for material having strong peaks at 8.5° and 10.2° (all peaks ±0.2°).

U.S. Pat. Nos. 4,994,566 and 5,008,173, to Mimura et al teach a process in which non-crystalline particles produced by: acid pasting or slurrying then mechanical grinding, mechanical grinding for a very long time, or sublimation; are treated with tetrahydrofuran to produce the a titanyl phthalocyanine having infrared absorption peaks at 1,332; 1,074; 962; and 783 cm$^{-1}$.

U.S. Pat. No. 5,039,586 to Itami teaches acid pasting followed by milling in aromatic or haloaromatic solvent with or without additional water or other solvents such as alcohols or ethers, at 20°–100° C. In an example, crude titanyl phthalocyanine was milled with alpha-chloronaphthalene or ortho-dichlorobenzene as milling medium followed by washing with acetone and methanol. The titanyl phthalocyanine produced had a first maximum intensity peak of the Bragg angle 2-theta with respect to X-rays of Cu Kα at a wavelength of 1.541 Å at 27.3±0.2°, and a second maximum intensity peak at 6.8±0.2°. This was contrasted with another titanyl phthalocyanine which was similarly milled, but not acid pasted. This material had a maximum peak at 27.3°–0.2° and a second maximum intensity peak, in the 6°–8° range, at 7.5°±0.2°.

U.S. Pat. No. 5,055,368, to Nguyen et al teaches a "salt-milling" procedure in which crude titanyl phthalocyanine is milled, first under moderate shearing conditions, along with milling media comprising inorganic salt and non-conducting particles. The milling is then continued at higher shear and temperatures up to 50° C. until the pigment undergoes a perceptible color change. Solvent is substantially absent during the milling steps.

U.S. Pat. Nos. 5,238,764 and 5,238,766, both to Molaire et al, teach that titanyl fluorophthalocyanine products of acid-pasting and salt-milling procedures, unlike unsubstituted titanyl phthalocyanine, suffer a significant reduction in near infrared sensitivity when they are dispersed in a solvent such as methanol or tetrahydrofuran, which has a $\text{gamma}_c$ hydrogen bonding parameter value greater than 9.0. These patents further teach that this reduction in sensitivity can be prevented by first contacting the titanyl fluorophthalocyanine with a material having a $\text{gamma}_c$ hydrogen bonding parameter of less than 8.0.

U.S. Pat. No. 5,112,711 to Nguyen et al teaches an electrophotographic element having a physical mixture of titanyl phthalocyanine crystals and titanyl fluorophthalocyanine crystals. The element provided a synergistic increase in photosensitivity in comparison to an expected additive combination of titanyl phthalocyanine and titanyl fluorophthalocyanine. Similar elements having physical mixtures combining titanyl phthalocyanine crystals and chloro- or bromo-substituted titanyl phthalocyanine crystals produced results in which the photosensitivity was close to that of the least sensitive of the two phthalocyanines used.

U.S. Pat. No. 4,701,396, to Hung et al, teaches near infrared sensitive photoconductive elements made from nonuniformly substituted titanylphthalocyanine pigments. Hung et al also teaches:

"Non-uniformly substituted [phthalocyanines] can be made by reacting titanium trichloride with two or more phthalonitriles, one of which is a fluorophthalonitrile as illustrated above, and the other or others of which are of the formula

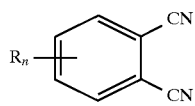

wherein R can be hydrogen, a halogen such as fluorine, chlorine or bromine, iodine or a hydrocarbon radical such as lower alkyl, e.g., methyl, ethyl, isopropyl and t-butyl, and n is an integer from 1 to 4."

The above procedures present shortcomings in the preparation of phthalocyanines. The use of acid presents a shortcoming for both environmental and safety concerns, particularly in commercial scale procedures. Salt milling avoids the use of acid, but requires extensive washing of the milled material to remove salts, which can otherwise cause high dark decay in a photoconductor. Procedures which first contact the titanyl fluorophthalocyanine with a solvent such as methanol or tetrahydrofuran, having a $\text{gamma}_c$ hydrogen bonding parameter value greater than 9.0 cause a significant reduction in near infrared sensitivity.

It is therefore desirable to provide a method for producing a crystalline phthalocyanine composition which has good photogeneration characteristics when used in an electrophotgraphic element, but is less expensive than titanyl fluorophthalocyanine. It is further desirable that the method avoid deleterious contact with high $\text{gamma}_c$ hydrogen bonding parameter solvents, and not require the use of acid or of salt milling media.

SUMMARY OF THE INVENTION

The invention, in its broader aspects, provides phthalocyanine compositions and prepartion methods. In a method, first, a phthalocyanine mixture is synthesized that has a plurality of differently substituted phthalocyanines selected from the group consisting of compounds having the general structure:

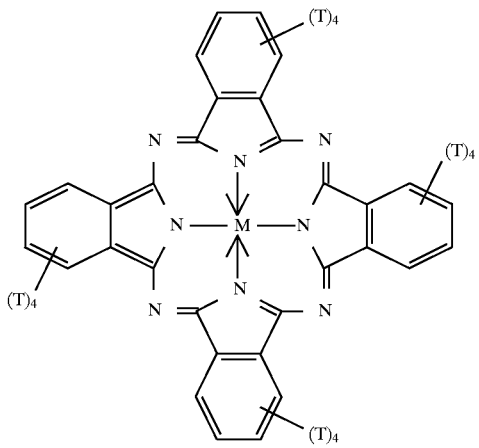

wherein:

M represents a pair of hydrogen atoms or a covalent or coordinate bonded moiety including a metal atom. Each T substituent is independently selected from the group consisting of H, F, Cl, Br, I, and alkyl having from 1 to 18 carbons. There are at least two different T substituents. The smallest T substituent has a van der Waal's radius that differs from the radius of the largest T substituent by less than about 50 percent of the radius of the smallest substituent. The amorphousness of the phthalocyanine mixture is then increased. The amorphous mixture is then contacted with organic solvent having a $\text{gamma}_c$ hydrogen bonding parameter of less than 8.0. Prior to the contacting, the amorphous mixture is excluded from contact with organic solvent having a $\text{gamma}_c$ hydrogen bonding parameter greater than 9.0.

It is an advantageous effect of at least some of the embodiments of the invention that a method is provided for producing a crystalline non-uniformly substituted phthalocyanine which method avoids first contact with high $\text{gamma}_c$ hydrogen bonding parameter solvents, and does not require the use of acid or of salt milling media. New phthalocyanine compositions are produced in that method, which allows for improved electrophotographic elements.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

The figures are x-ray diffraction spectra that exhibits peaks of the Bragg angle $2\theta$ with respect to x-rays of Cu Kα at a wavelength of 1.541 Å, for the phthalocyanines of the Preparations, Examples, and Comparative Examples as follows.

DESCRIPTION OF PARTICULAR EMBODIMENTS

Figure 1:
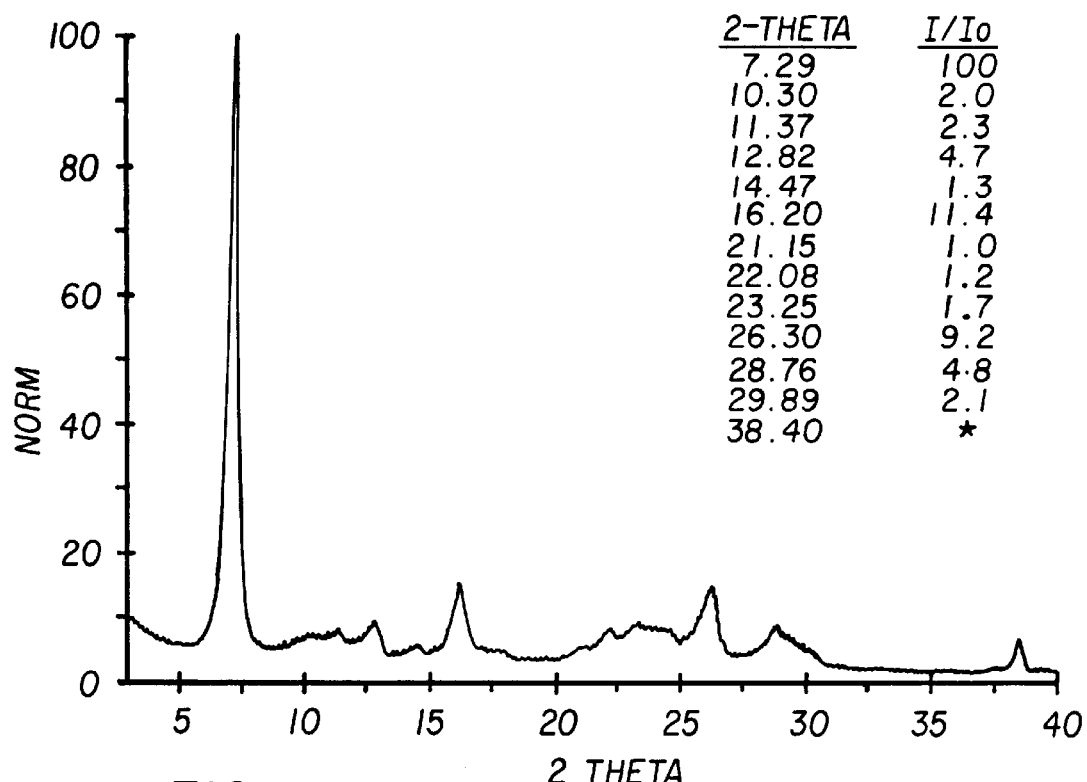
FIGS. 1–11: PREPARATIONS 1–11, respectively.

In the methods of the invention, a mixture of nonuniformly substituted crude phthalocyanines (also referred to herein as "crude pigment mixture", (the words "pigment" and "phthalocyanine" are used interchangeably herein) is converted to a substantially amorphous state, i.e., low crystallinity, The resulting "amorphous pigment mixture" is treated to provide a composition of matter of the invention, a high crystallinity phthalocyanine product. This high crystallinity product is used in the charge generation layer of an electrophotographic element of the invention. In a particular embodiment of the invention, the crude pigment mixture is converted to the substantially amorphous state by dry milling to provide another composition of matter of the invention: a "dry milled amorphous pigment mixture". The dry milled amorphous pigment mixture can be treated to provide a high crystallinity product of the invention.

As synthesized, phthalocyanine pigments normally have a particle size that is too large for them to be effectively used in electrophotographic applications. In this condition, the phthalocyanine pigment is commonly referred to in the art as "crude" pigment. Such crude pigments normally have a particle size in excess of 10 micrometers, often a particle size of at least 50 micrometers, and in some cases, a particle size of 1 millimeter or larger. The particle size referred to herein is the largest dimension of the particle and can be readily determined from electron photomicrographs using techniques well known to those skilled in the art. The pigment particles have a variety of shapes, e.g., elongated, needle-like, spherical, regular or irregular.

The crude phthalocyanine mixture used in the invention includes a plurality of differently substituted phthalocyanines selected from the group consisting of compounds having the general structure:

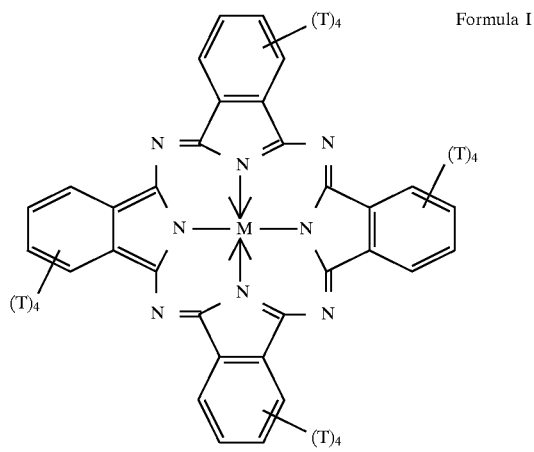

Formula I and the products of hydrolysis and oxidation of these compounds. M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb. In currently preferred embodiments of the invention, M is a divalent moiety selected from the group consisting of divalent metal atoms, monosubstituted trivalent metal atoms, disubstituted tetravalent metal atoms. Suitable substituents include Cl, Br, I, F, OH, oxy, and alkoxy having from 1 to 6 carbons. Examples of suitable divalent metals include: Cu, Zn, Fe, Co, Ni, Ru, Rh, Pd, Pt, Mn, and Sn. Examples of suitable monosubstituted trivalent metals include: Al—Cl, Al—Br, In—Cl, In—Br, In—I, Ga—Cl, and Ga—Br. Examples of suitable disubstituted tetravalent metals include: $SiCl_2$, $SiBr_2$, $SiF_2$, $SnCl_2$, $SnBr_2$, $SnF_2$, $GeCl_2$, $GeBr_2$, $GeF_2$, $Si(OH)_2$, $Ge(OH)_2$, and vanadium oxide. It is highly preferred that M be the same for each of the different phthalocyanines in the mixture. Many phthalocyanines hydrolyze or oxidize quickly under ambient conditions such that M is changed. The mixture of differently substituted phthalocyanines is inclusive of such hydrolyzed and oxidized derivatives. A specific example of such materials is oxytitanyl phthalocyanine.

Each T substituent is independently selected from the group consisting of H, F, Cl, Br, I, and alkyl having from 1 to 18 carbons, preferably from 1 to 6 carbons. The phthalocyanines of Formula I include at least two different substituents. A specific example of a non-uniformly substituted phthalocyanine mixture includes titanyl 2,9,16,23-tetrafluorophthalocyanine, titanyl 2,9,16-trifluorophthalocyanine, titanyl 2, 9-difluorophthalocyanine, titanyl 2,16-difluorophthalocynanine, 2-monofluorophthalocyanine, and unsubstituted titanyl phthalocyanine.

In particular embodiments of the invention, (also referred to herein as "limited radii" compositions and methods) the different substituents have van der Waal's radii differing by less than about 50 percent of the radius of the smallest substituent. Van der Waal's radii for various moieties are presented in Table 1 along with ratio's of van der Waal's radius to the van der Waal's radius of hydrogen.

TABLE 1

| Moiety | van der Waal's radius (in Å) | van der Waal's radius/van der Waal's radius for —H |
| --- | --- | --- |
| —H | 1.20 | 1 |
| —F | 1.35 | 1.13 |
| —Cl | 1.80 | 1.5 |
| —Br | 1.95 | 1.63 |
| —$CH_3$ | 2.00 | 1.67 |
| —I | 2.11 | 1.76 |

Examples of pairs of moieties that differ by less than about 50 percent of the radius of the smaller moiety are:

—H (van der Waal's radius=1.2°) and —F (van der Waal's radius=1.35); and

—F (van der Waal's radius=1.35) and —Cl (van der Waal's radius=1.80).

The crude non-uniformly substituted phthalocyanine mixture can be synthesized by a number of well-known procedures, for example, reacting a metal halide and phthalonitriles. This kind of procedure is described in U.S. Pat. No. 4,701,396, in which titanium tetrachloride is reacted with a mixture of phthalonitriles. It is convenient to perform that reaction at an elevated temperature, for example, in the range of about 190° C. to about 230° C., to increase the reaction rate. The mixture of phthalonitriles includes a first phthalonitrile having the general structure:

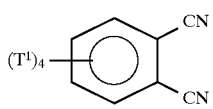

and a second phthalonitrile having the general structure:

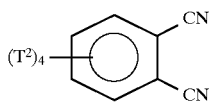

The first and second phthalonitriles are differently substituted. $T^1$ and $T^2$ substituents are independently selected from the group consisting of H, F, Cl, Br, I, and alkyl having from 1 to 18 carbons, preferably from 1 to 6 carbons. The number of substituents other than H, on the first or second phthalnitrile or both, is independently from one to four. Each $T^1$ to $T^2$ can be the same or different. In some embodiments of the invention, the van der Waal's radius of $T^2$ is less than about 50 percent larger than the radius of T. The first phthalonitrile is also referred to herein as "$T^1$-phthalonitrile" and "$T^1$-ph". The second phthalonitrile is also referred to herein as "$T^2$-phthalonitrile" and "$T^2$-ph".

The non-uniformly substituted phthalocyanine mixture can include additional phthalonitriles. These materials can be represented by formulas like the immediately preceding two formulas, with the exception that "$T^1$" or "$T^2$" would be replaced by "$T^3$", "$T^4$", . . . etc. In limited radii compositions, the "$T^{2+}$" substituents of the additional substituted phthalonitriles ($T^3$, $T^4$, . . . ) represent moieties having van der Waal's radii equal in size or larger than the van der Waal's radius of $T^1$ and equal in size or smaller than the van der Waal's radius of $T^2$.

The composition of the non-uniformly substituted phthalocyanine mixture (and as discussed below the electrophotographic properties of resulting electrophotographic elements) can be manipulated by varying the mole ratio of the starting phthalonitriles. The approximate composition of a non-uniformly substituted phthalocyanine mixture can be selected before the mixture is prepared. The selection is based on theory and two simplifying assumptions: 1) that the starting materials react equally, and 2) that the products have the same solubility in the reaction solvent. It would be highly unlikely if both of these assumptions were correct and actual results strongly suggest that one or both assumptions are incorrect; however, an approximate composition can be predicted. This is surprising and very useful in preparing electrophotographic elements to meet particular requirements.

The theoretical distribution of the non-uniformly substituted phthalocyanine products of the mixture can be estimated, for any number of reactants, according the general formula:

$$(xa+yb+ \ldots w\alpha)^4$$

where x, y, . . . w are mole percent and a represents $T^1$-ph, b represents $T^2$-ph, and so on. If two different phthalonitriles are used as reactants, this formula can be rewritten as:

$$(xa+yb)^4$$

which yields the expression:

$$x^4(a^4)+4x^3y(a^3b)+6x^2y^2(a^2b^2)+4xy^3(ab^3)+y^4(b^4)$$

x is the molar ratio of $T^1$-phthalonitrile and y is the molar ratio of $T^2$-phthalonitrile. $a^4$ represents a phthalocyanine molecule with four $T^1$ substituents. $a^3b$ represents a phthalocyanine molecule with three $T^1$ substituents and one $T^2$ substituent. $a^2b^2$ represents a phthalocyanine molecule with two $T^1$ substituents and two $T^2$ substituents. $ab^3$ represents a phthalocyanine molecule with one $T^1$ substituent and three $T^2$ substituents. $b^4$ represents a phthalocyanine molecule with four $T^4$ substituents. For example, with a 50%:50% mixture of $T^1$-phthalonitrile and $T^2$-phthalonitrile, the prediction is: 6% $a^4$, 25% $a^3b$, 38% $a^2b^2$, 25% $ab^3$, and 6% $b^4$. (All percentages herein are in moles unless specifically indicated otherwise.) For a 25%:75% mixture of $T^1$-phthalonitrile and $T^2$-phthalonitrile, the prediction is: 1% $a^4$, 5% $a^3b$, 21% $a^2b^2$, 42% $ab^3$, and 32% $b_4$.

After the crude non-uniformly substituted phthalocyanine mixture has been prepared, it is rendered amorphous. The particle size is also reduced to a particle size that does not exceed about 0.2 micrometers, typically a particle size of about 0.01 to 0.2 micrometers and often about 0.05 to 0.1 micrometers.

The crystallographic characteristics discussed herein, i.e., amorphousness and crystallinity, are based upon X-ray diffraction spectra at the Bragg angle 2-theta using Cu Kα X-radiation at a wavelength of 1.541 Å (also referred to herein as "Bragg angle") and are ±0.2° unless otherwise indicated. Suitable X-ray diffraction techniques are described, for example, in Engineering Solids, T. S. Hutchinson and D. C. Baird, John Wiley and Sons, Inc., 1963 and X-ray Diffraction Procedures for Polycrystalline and Amorphous Materials, 2nd Ed., John Wiley and Sons, Inc., 1974.

Dry milling is the preferred procedure for rendering the crude pigment mixture amorphous. Other techniques can be used to produce the amorphous pigment mixture, however, a number of characteristics of the pigment produced will vary. Acid pasting and salt milling are examples of alternative techniques for rendering the crude pigment amorphous. These procedures have the shortcomings previously discussed. In rendering the pigment mixture amorphous, the particle size is reduced to less than about 0.2 micrometers. A convenient particle size is from about 0.01 to 0.2 micrometers, or from about 0.05 to 0.1 micrometers. The pigment particles can have a variety of shapes, e.g., elongated, needle-like, spherical, regular or irregular.

In dry milling, the crude pigment mixture is mechanically ground in the dry state under shear conditions that break up particle agglomerates, reduce the particle size, and render the mixture less crystalline, i.e. more amorphous. It is preferred that dry milling be continued until the pigment mixture is rendered substantially or fully amorphous. The term "fully amorphous", as used herein, refers to a crystalline/amorphous state in which the well defined peaks of the crude phthalocyanine are replaced by a very high baseline response modulated by a few very broad, 5°–10° or wider peaks.

The dry milling procedure is carried out in the substantial absence of any solvent, or polymeric binder, or salt; that is, if there is any of these materials present, the amount is so small as to have no effect, or at least no adverse effect, on the pigment particles.

Milling apparatus capable of providing the necessary shear are well known and include, for example, conventional ball mills, roll mills, paint shakers, vibrating mills, and the apparatus described in U.S. Pat. Nos. 4,555,467 and 4,785, 999. The shear employed is varied, as is well known to those skilled in the art, depending upon such factors as the type of milling apparatus, milling aids such as steel balls, and the crude pigment mixture used. The energy applied in the first milling stage generally does not exceed about 5 watts, and is typically from about 3 to 5 watts. Enough energy is applied to convert the crude pigment mixture to the low crystallinity pigment mixture.

The milling apparatus used during the dry milling stage may or may not require the use of particulate milling aids: materials added to the pigment particles to increase shear and decrease milling time. Particulate milling aids suitable for use in the claimed invention are materials which can be easily removed from the milled pigment mixture. For example, the salts described as milling aids in U.S. Pat. No. 5,055,368 are not desirable for use as particulate milling aids in the claimed invention, because the salts themselves are degraded to very small size by milling and must be removed by extensive washing. Examples of preferred particulate milling aids are steel shot, ceramic, glass, and zirconia media. These aids typically are available in sizes from about 0.5 to about 5 millimeters in diameter. Typically, the concentration of the pigment mixture during milling is from about 2 to 25 weight percent relative to the total weight of the pigment mixture and the milling media.

The dry milling time, will vary greatly depending upon a number of factors such as relative proportions of pigment mixture and milling aid and the specific milling equipment used. Generally, a suitable time for the dry milling stage may be as much as 240 hours with typical times being in the range of from about 0.5 to 120 hours.

Milling tends to result in the liberation of heat, which would raise the temperature of the milled composition. It is desirable that the milling apparatus include temperature regulating means which can help increase or decrease the temperature up to a temperature below the decomposition temperature of the phthalocyanine pigments, or preferably in the range of about 0° to about 150° C., or more preferably from about 40° C. to about 100° C.

The milling can be performed, for example, in a Sweco Vibro Energy grinding mill manufactured by Sweco, Inc. of Florence, Ky. Stainless steel beads, 2 mm in diameter, are added as a milling media on a 90 weight/weight percent basis relative to the weight of the pigment mixture. The pigment mixture is milled for a time period of from 12 to 96 hours at temperatures within the range of 25° C. to 60° C.

The amorphous pigment mixture produced by dry milling has a photosensitivity, especially to red and near-infrared radiation, comparable to that of the corresponding acid pasted or salt milled material.

The high crystallinity nonuniformly substituted phthalocyanine product is prepared by contacting the amorphous pigment mixture with an organic solvent having a $gamma_c$ hydrogen bonding parameter value less than 9.0, or preferably less than 8.0, before the pigment mixture comes into contact with any organic solvent having a $gamma_c$ hydrogen bonding parameter value greater than 9.0. Many of the crude non-uniformly substituted phthalocyanines of this invention have distinct crystallographic structures depending on the molar ratio of the starting phthalonitriles. Surprisingly, when these materials are dry milled and further contacted with solvents with hydrogen bonding parameter $gamma_c$ lower than 9.0, preferably lower than 8, before contact with organic solvents with hydrogen bonding parameter higher than 9.0, a unique crystallographic structure is obtained, exhibiting major peaks of the Bragg angle 2-theta with respect to X-rays of Cu K$\alpha$ at a wavelength of 1.541 A at 7.5, 10.1, 12.7, 13.2, 14.9, 15.9, 17.4, 18.6, 22.4, 25.6, and 28.8 (all ±0.2 degree). The pigment so obtained exhibits substantially lower dark decay than the crude materials, as well as improved electrophotographic sensitivity.

On the other hand when the crude non-uniformly substituted fluorophthalocyanines of this invention are dry milled, acid pasted or salt milled, followed by contact with organic solvents with hydrogen bonding parameter $gamma_c$ higher than 9.0 the materials so obtained exhibit dark decay substantially higher than that of the crude pigments.

Unpredictably, the high crystallinity crystal products of the invention exhibit distinctive crystallograms reflecting a single crystal species rather than a mixture of different phthalocyanines. The crystallogram of a highly crystalline product of the invention is different than the crystallograms of individual highly crystalline phthalocyanines prepared in the same manner. The crystallogram is also different than the crystallogram of a physical mixture of different phthalocyanines prepared in the same manner. This result is surprising, particularly considering the large number of phthalocyanines present in the product. The highly crystalline products of the invention can provide electrophotographic elements that are very fast, and have reasonably low dark decay.

$Gamma_c$ hydrogen bonding parameter values of organic solvents can be determined by the method reported in "A Three-Dimensional Approach to Solubility", J. D. Crowley, G. S. Teague, and J. W. Lowe, Journal of Paint Technology, Vol. 38, No. 496, May 1966, pp. 269–280 and further described in CRC Handbook of Solubility Parameters and Other Cohesion Parameters, A. Barton, CRC Press, Boca Raton, Fla., 1983, pp. 174 and 179–180 and in the ASTM D3132 standard test method. The method comprises measuring the effect of the solvent on deuterated methanol in terms of the frequency of the infrared radiation absorbed by the O-D bond of deuterated methanol and comparing that effect to the effect of benzene on the same bond. The value of the $gamma_c$ hydrogen bonding parameter for the solvent being tested is then determined in accordance with the equation:

$$gamma_c\{(nu_{benzene}) - (nu_{solvent})\}/10$$

where "$nu_{benzene}$" is the wave number (expressed as cm$^{-1}$) of the infrared radiation absorbed by the O-D bond of deuterated methanol in contact with benzene, and "$nu_{solvent}$" is the wave number of the infrared radiation absorbed by the O-D bond of deuterated methanol in contact with the solvent being tested. $Gamma_c$ hydrogen bonding parameter values of numerous organic solvents have been determined. A list for some common solvents is presented in Table A.

TABLE A

| Solvent | Gamma$_c$ hydrogen bonding parameter value |
| --- | --- |
| benzene | 0.0 |
| dichloromethane | 1.5 |
| 1,1,2-trichloroethane | 1.5 |
| chlorobenzene | 1.5 |
| dichloropropane | 1.5 |
| chloroform | 1.5 |
| ethylene chloride | 1.5 |
| toluene | 4.5 |
| xylene | 4.5 |
| acetonitrile | 6.3 |
| methyl benzoate | 6.3 |
| anisole | 7.0 |
| diethyl ketone | 7.7 |
| methyl ethyl ketone | 7.7 |
| methyl isobutyl ketone | 7.7 |
| acetone | 9.7 |
| butylrolactone | 9.7 |
| dioxane | 9.7 |
| tetrahydrofuran | 9.9 |
| cyclohexanone | 11.7 |
| N,N-dimethylformamide | 11.7 |

TABLE A-continued

| Solvent | Gamma$_c$ hydrogen bonding parameter value |
|---|---|
| 2-ethoxyethanol | 13.0 |
| ethanol | 18.7 |
| methanol | 18.7 |
| butanol | 18.7 |
| pyridine | 18.1 |
| ethylene glycol | 20.6 |

Any convenient procedure can be used to treat the amorphous pigment mixture with an organic solvent having a gamma$_c$ hydrogen bonding parameter value less than 8.0. For example, the pigment mixture can be: contacted with vapors of the solvent, mixed well with liquid solvent, or milled in mixture with the solvent and a milling aid such as steel shot. (Milling in the presence of a solvent is also referred to herein as "wet milling".) Wet milling is a convenient procedure, since it assures adequate mixing. A suitable duration for wet milling is from about 10 minutes to about 96 hours. In some embodiments of the invention, convenient times are from about 30 minutes to about 90 minutes.

If it is not objectionable to retain a small amount of solvent having a gamma$_c$ value less than 8.0 in a coating solution composition, the most convenient procedure can be milling the amorphous pigment mixture with the solvent, a desired polymeric binder, and any desired milling aid. The proportions of amorphous pigment mixture and binder can be adjusted so that a desired coating composition can be prepared by removal of any milling aid and dilution with the primary solvent for the coating composition (generally a solvent, such as tetrahydrofuran, which has a gamma$_c$ hydrogen bonding parameter value in excess of 9.0.

For the purpose of preserving high photosensitivity of the highly crystalline product, it does not matter whether the highly crystalline product remains in contact with some of the solvent having a gamma$_c$ value less than 8.0 or is completely separated from such solvent after the treatment. In either case, the highly crystalline product provides the advantage of being able to withstand contact with a solvent having a gamma$_c$ value greater than 9.0 without appreciable degradation in photosensitivity.

The amount of solvent having a gamma$_c$ value less than 8.0 that is brought into contact with the amorphous pigment mixture is not critical, however, the amount should preferably be large enough to allow continuous contact of all surfaces of the amorphous phalocyanine particles with the solvent during the treatment in order to maximize treatment uniformity and efficiency. Agitating or stirring a dispersion of the amorphous pigment mixture particles in liquid solvent during the treatment, facilitates contact of all surfaces of the particles with the solvent. It appears that solvents with gamma$_c$ values less than 7.0 enable more efficient treatment (in general, the lower the gamma$_c$ value, the more efficient the treatment). It is therefore preferred that the organic solvent having a gamma$_c$ hydrogen bonding parameter value less than 8.0, that is employed for the treatment, be an organic solvent having a gamma$_c$ hydrogen bonding parameter value less than 7.0.

The duration of the contact between the amorphous pigment mixture and the solvent having a gamma$_c$ value less than 8.0, necessary to maximize the beneficial effect of the treatment, will vary depending upon a variety of factors including: the nature of the pigment mixture and the solvent, particle size and shape, the procedure employed to effect the contact, and temperature. It is generally convenient to convert the amorphous pigment mixture to the highly crystalline product at room temperature; however, elevated temperatures can be used to speed conversion. The following are examples of conversion procedures that are convenient for some embodiments of the invention. The amorphous pigment mixture can be mixed with a liquid organic solvent having a gamma$_c$ value less than 8.0 and ultrasonically agitated at 60° C. for 2 hours. The amorphous pigment mixture can be wet milled with a liquid organic solvent having a gamma$_c$ value less than 8.0 for 2 days without any external application of heat.

While the reasons or mechanism for the beneficial effect of the contact with solvent having a gamma$_c$ value less than 8.0 are not understood, it does appear that the treatment establishes a certain crystalline structure in the pigment mixture which is not adversely affected by subsequent contact with an organic solvent having a gamma$_c$ hydrogen bonding parameter value greater than 9.0.

The electrophotographic elements of the invention incorporate the highly crystalline product and have greater photosensitivity than similarly prepared elements having similarly treated titanyl fluorophthalocyanine. In preparing the elements, the highly crystalline product, binder and any desired addenda, are dissolved or dispersed together in a liquid to form an electrophotographic coating composition which is then coated over an appropriate underlayer. The liquid is then allowed or caused to evaporate to form the charge generation layer of the invention.

The electrophotographic elements of the invention can be of various types, including both those commonly referred to as single layer or single-active-layer elements and those commonly referred to as multiactive, or multi-active-layer elements. All of the electrophotographic elements of the invention have multiple layers, since each element has at least an electrically conductive layer and one photogenerating (charge generation) layer, that is, a layer which includes, as a charge generation material, a composition of matter including the high and low speed pigments of the invention.

In the coating composition, the optimum ratio of phthalocyanine highly crystalline product to binder or of highly crystalline product and charge transport material to binder can vary widely, depending on the particular materials employed. In general, useful results are obtained when the total concentration of both phthalocyanine and charge transport material in a layer is within the range of from about 0.01 to about 90 weight percent, based on the dry weight of the layer. In a preferred embodiment of a single active layer electrophotographic element of the invention, the coating composition contains from about 10 to about 70 weight percent of an charge-transport agent and from 0.01 to about 20 weight percent of the highly crystalline product of the invention. In a preferred embodiment of a multiple active layer electrophotographic element of the invention, the coating composition contains from about 0 to about 50 weight percent of a charge-transport agent and from 0.01 to about 80 weight percent of highly crystalline product of the invention.

Single-active-layer elements are so named because they contain only one layer that is active both to generate and to transport charges in response to exposure to actinic radiation. Such elements have an additional electrically conductive layer in electrical contact with the photoconductive layer. In single-active-layer elements of the invention, the photoconductive layer contains highly crystalline product of the invention as charge-generation material to generate electron/hole pairs in response to actinic radiation and an charge-transport material, which is capable of accepting the charges generated by the charge-generation material and transporting them through the layer to effect discharge of the initially uniform electrostatic potential. The charge-transport agent and phthalocyanine highly crystalline product of the invention are dispersed as uniformly as possible in the photoconductive layer. The photoconductive layer also contains an electrically insulative polymeric film-forming binder. The photoconductive layer is electrically insulative except when exposed to actinic radiation.

Multiactive layer elements are so named because they contain at least two active layers, at least one of which is capable of generating charge, that is, electron/hole pairs, in response to exposure to actinic radiation and is therefore referred to as a charge-generation layer (CGL), and at least one of which is capable of accepting and transporting charges generated by the charge-generation layer and is therefore referred to as a charge-transport layer (CTL). Such elements typically comprise at least an electrically conductive layer, a CGL, and a CTL. Either the CGL or the CTL is in electrical contact with both the electrically conductive layer and the remaining CTL or CGL. The CGL contains the highly crystalline product of the invention as charge-generation material and a polymeric binder. The CTL contains a charge-transport agent and a polymeric binder.

Single-active-layer and multiactive layer electrophotographic elements and their preparation and use in general, are well known and are described in more detail, for example, in U.S. Pat. Nos. 4,701,396; 4,666,802; 4,578,334; 4,719,163; 4,175,960; 4,514,481 and 3,615,414.

In preparing the electrophotographic elements of the invention, the components of the photoconductive layer (in single-active-layer elements) or CGL (in multiactive layer elements), including binder and any desired addenda, are dissolved or dispersed together in a liquid to form an electrophotographic coating composition which is then coated over an appropriate underlayer, for example, a support or electrically conductive layer. The liquid is then allowed or caused to evaporate from the mixture to form the permanent photoconductive layer or CGL. The highly crystalline product product can be mixed with the solvent solution of polymeric binder immediately or can be stored for some period of time before making up the coating composition.

The polymeric binder used in the preparation of the coating composition can be any of the many different binders that are useful in the preparation of electrophotographic layers. The polymeric binder is a film-forming polymer having a fairly high dielectric strength. In a preferred embodiment of the invention, the polymeric binder also has good electrically insulating properties. The binder should provide little or no interference with the generation and transport of charges in the layer. The binder can also be selected to provide additional functions. For example, adhering a layer to an adjacent layer; or, as a top layer, providing a smooth, easy to clean, wear-resistant surface.

Representative binders are film-forming polymers having a fairly high dielectric strength and good electrically insulating properties. Such binders include, for example, styrene-butadiene copolymers; vinyl toluene-styrene copolymers; styrene-alkyd resins; silicone-alkyd resins; soya-alkyd resins; vinylidene chloride-vinylchloride copolymers; poly(-vinylidene chloride); vinylidene chloride-acrylonitrile copolymers; vinyl acetate-vinyl chloride copolymers; poly(vinyl acetals), such as poly(vinyl butyral); nitrated polystyrene; poly(methylstyrene); isobutylene polymers; polyesters, such as poly{ethylene-coakylenebis(alkyleneoxyaryl) phenylenedicarboxylate}; phenol-formaldehyde resins; ketone resins; polyamides; polycarbonates; polythiocarbonates;poly{ethylen-co-isopropyliden-2,2-bi s(ethylenoxyphenylene)-terephthalate}; copolymers of vinyl haloacrylates and vinyl acetate such as poly(vinyl-m-bromobenzoate-covinyl acetate); chlorinated poly(olefins), such as chlorinated poly (ethylene); cellulose derivatives such as cellulose acetate, cellulose acetate butyrate and ethyl cellulose; and polyimides, such as poly{1,1,3-trimethyl-3-(4'-phenyl)-5-indane pyromellitimide}. Examples of binder polymers which are particularly desirable from the viewpoint of minimizing interference with the generation or transport of charges include: bisphenol A polycarbonates and polyesters such as poly[(4,4'-norbornylidene)diphenylene terephthalate-co-azelate].

Suitable organic solvents for forming the polymeric binder solution can be selected from a wide variety of organic solvents, including, for example, aromatic hydrocarbons such as benzene, toluene, xylene and mesitylene; ketones such as acetone, butanone and 4-methyl-2-pentanone; halogenated hydrocarbons such as dichloromethane, trichloroethane, methylene chloride, chloroform and ethylene chloride; ethers including ethyl ether and cyclic ethers such as dioxane and tetrahydrofuran; other solvents such as acetonitrile and dimethylsulfoxide; and mixtures of such solvents. The amount of solvent used in forming the binder solution is typically in the range of from about 2 to about 100 parts of solvent per part of binder by weight, and preferably in the range of from about 10 to 50 parts of solvent per part of binder by weight.

Polymeric binders useful for the CGL or photoconductor layer can also be used in producing a CTL. Any charge transport material can be utilized in elements of the invention. Such materials include inorganic and organic (including monomeric organic, metallo-organic and polymeric organic materials); for example, zinc oxide, lead oxide, selenium, phthalocyanine, perylene, arylamine, polyarylalkane, and polycarbazole materials, among many others. The CTL can be solvent coated or can be produced in some other manner, for example, by vacuum deposition.

CGL's and CTL's in elements of the invention can optionally contain other addenda such as leveling agents, surfactant, plasticizer, sensitizers, contrast control agents, and release agents, as is well known in the art.

Various electrically conductive layers or supports can be employed in electrophotographic elements of the invention, for example, paper (at a relative humidity above 20 percent) aluminum-paper laminates; metal foils such as aluminum foil, zinc foil, and the like; metal plates such as aluminum, copper, zinc, brass and galvanized plates; vapor deposited metal layers such as silver, chromium, vanadium, gold, nickel, aluminum and the like; and semiconductive layers such as cuprous iodide and indium tin oxide. The metal or semiconductive layers can be coated on paper or conventional photographic film bases such as poly(ethylene terephthalate), cellulose acetate, polystyrene, etc. Such conducting materials as chromium, nickel, etc. can be vacuum-deposited on transparent film supports in sufficiently thin layers to allow electrophotographic elements so prepared to be exposed from either side.

Electrophotographic elements of the invention can include various additional layers known to be useful in electrophotographic elements in general, for example, subbing layers, overcoat layers, barrier layers, and screening layers.

The following Examples and Comparative Examples are presented to further illustrate some preferred modes of practice of the invention.

Melting points were determined on a Thomas-Hoover melting point apparatus and are uncorrected. $^1$H NMR spectra were recorded either on a General Electric QE-300 spectrophotometer or on a Varian Gemini-200 spectrophotometer. UV-visible-near, infrared absorption spectra were recorded on a Perkin-Elmer Lambda 9 spectrophotometer. Infrared spectra were recorded on a Beckman IR 4250 instrument or a Perkin-Elmer 298 infrared spectrophotometer. Microanalyses were performed on a Perkin-Elmer 240 degree C, H, and N Analyzer. All X-ray diffraction analyses discussed herein were conducted with Cu Kα radiation at Bragg angles 2-theta (±0.2°). Unless otherwise indicated, all starting materials were commercially obtained. Visible-near infrared absorption spectra were recorded on a Perkin Elmer spectrophotometer.

Preparation 1: Non-uniformly Substituted Titanyl Fluorophthalonitrile: 25% Fluorophthalonitrile 4-Fluorophthalocyanine (29.2 grams), unsubstituted phthalonitrile (76.8 grams), titanium tetrachloride (76 grams), and 640 ml of 1-chloronaphthalene were mixed together in a 1000 ml three-necked round-bottomed flask. The flask was equipped with a temperature controller probe, an air driven teflon paddle stirrer, a condenser. The mixture was heated to 205° C.±5° C. for two hours, then cooled to about 160° C. The solid was filtered, and rinsed with 1-chloronaphnalene; then washed with acetone, then methanol, then acetone again, then methanol. The crude pigment was then boiled five times, with filering in between, until the filtrate was neutral. The solid was rinsed again with acetone, and methanol, and dried in vacuo at 70° C. overnight. Yield was 94% of theoretical.

The x-ray diffraction spectrum (FIG. 1) exhibits peaks of the Bragg angle at 7.3°, 12.8°, 16.2°, 26.3°, 28.8° (all ±0.2°).

Preparation 2: Non-uniformly Substituted Titanyl Fluorophthalocyanine: 30% Fluorophthalonitrile 4-Fluorophthalonitrile (11 grams), unsubstituted phthalonitrile (22.4 grams), titanium tetrachloride (23.8 grams), and 200 ml of 1-chloronaphthalene were mixed together in a 500 ml three-necked round-bottomed flask. The procedure of Preparation 1 was followed. Yield was 77% of theoretical.

Figure 2:
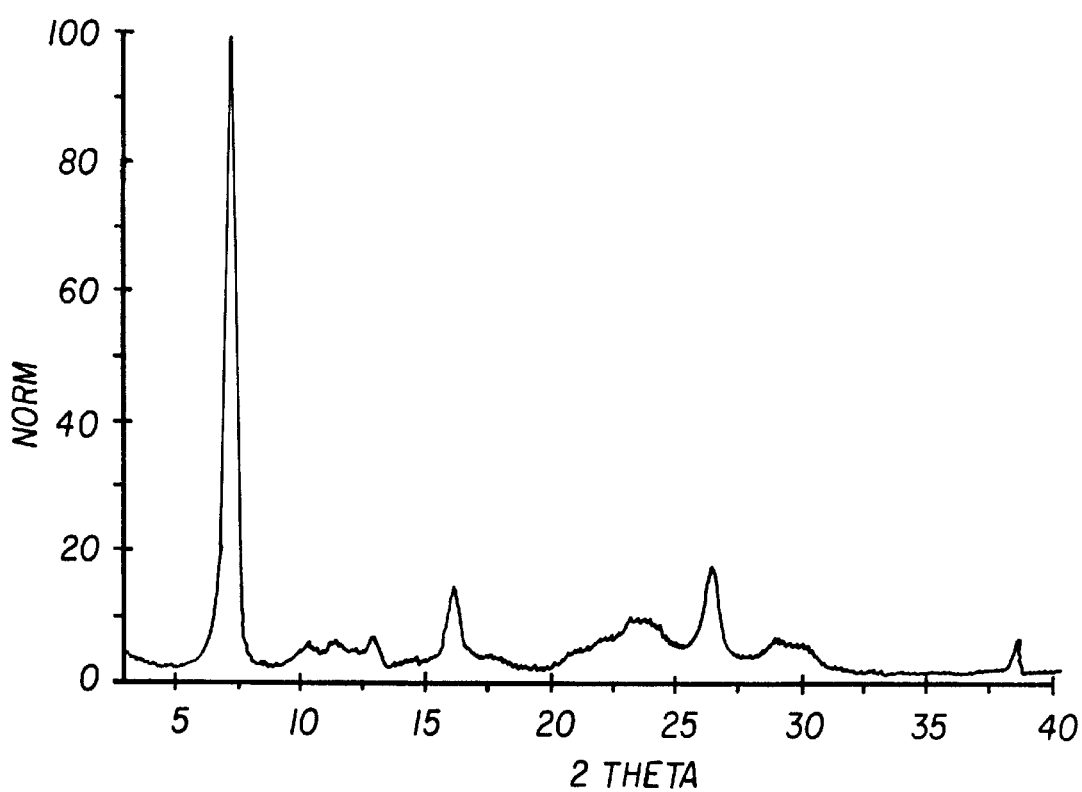

The x-ray diffraction spectrum (FIG. 2) exhibits major peaks of the Bragg angle at 7.4°, 16.2°, and 26.4° (all ±0.2°).

Preparation 3: Non-uniformly Substituted Titanyl Fluorophthalocyanine: 40% Fluorophthalonitrile 4-Fluorophthalonitrile (14.6 grams), unsubstituted phthalonitrile (19.2 grams), titanium tetrachloride (23.8 grams), and 200 ml of 1-chloronaphthalene were mixed together in a 500 ml three-necked round-bottomed flask. The procedure of Preparation 2 was followed. Yield was 81% of theoretical.

Figure 3:
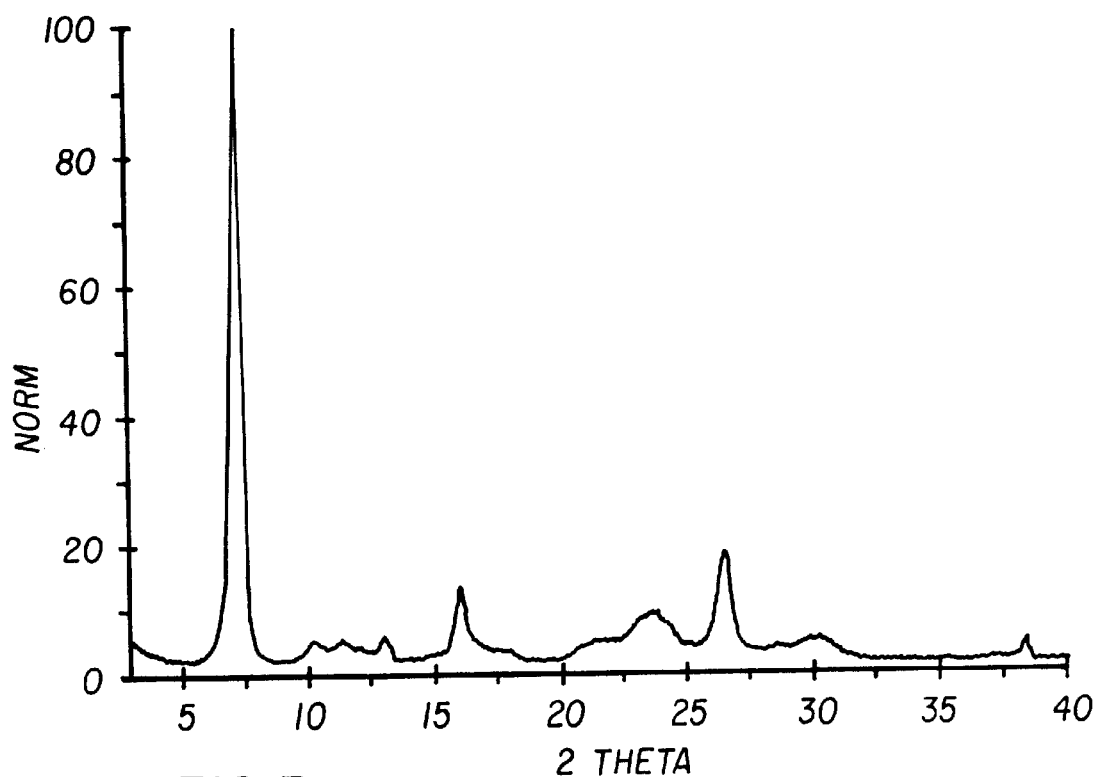

The x-ray diffraction spectrum (FIG. 3) exhibits major peaks of the Bragg angle at 7.5°, 16.2°, and 26.6° (all ±0.2°).

Preparation 4: Non-uniformly Substituted Titanyl Fluorophthalocyanine: 45% Fluorophthalonitrile 4-Fluorophthalonitrile (16.4 grams), unsubstituted phthalonitrile (17.6 grams), titanium tetrachloride (23.8 grams), and 200 ml of 1-chloronaphthalene were mixed together in a 500 ml three-necked round-bottomed flask. The procedure of Preparation 2 was followed. Yield was 80% of theoretical.

Figure 4:
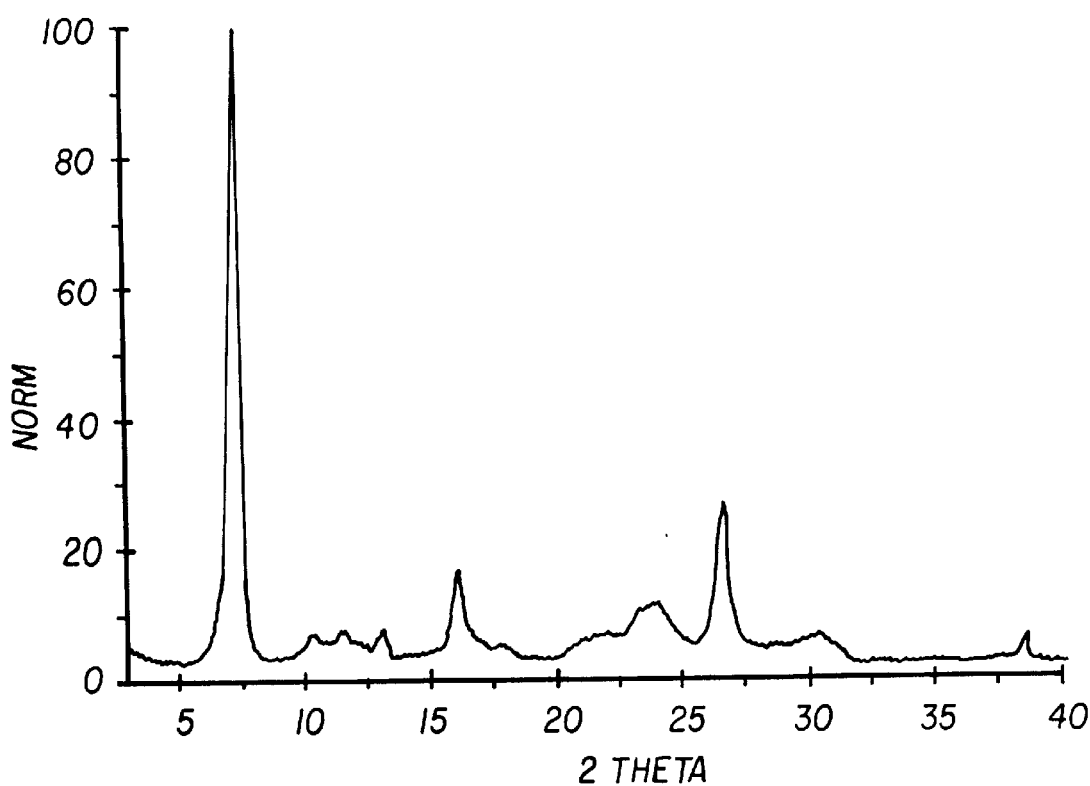

The x-ray diffraction spectrum (FIG. 4) exhibits major peaks of the Bragg angle at 7.5°, 16.2°, 23.9°, and 26.7° (all ±0.2°).

Preparation 5: Non-uniformly Substituted Titanyl Fluorophthalocyanine: 50% Fluorophthalonitrile 4-Fluorophthalonitrile (58.4 grams), unsubstituted phthalonitrile (51.2 grams), titanium tetrachloride (76 grams), and 640 ml of 1-chloronaphthalene were mixed together in a 1000 ml three-necked round-bottomed flask. The procedure of Preparation 1 was followed.

Figure 5:
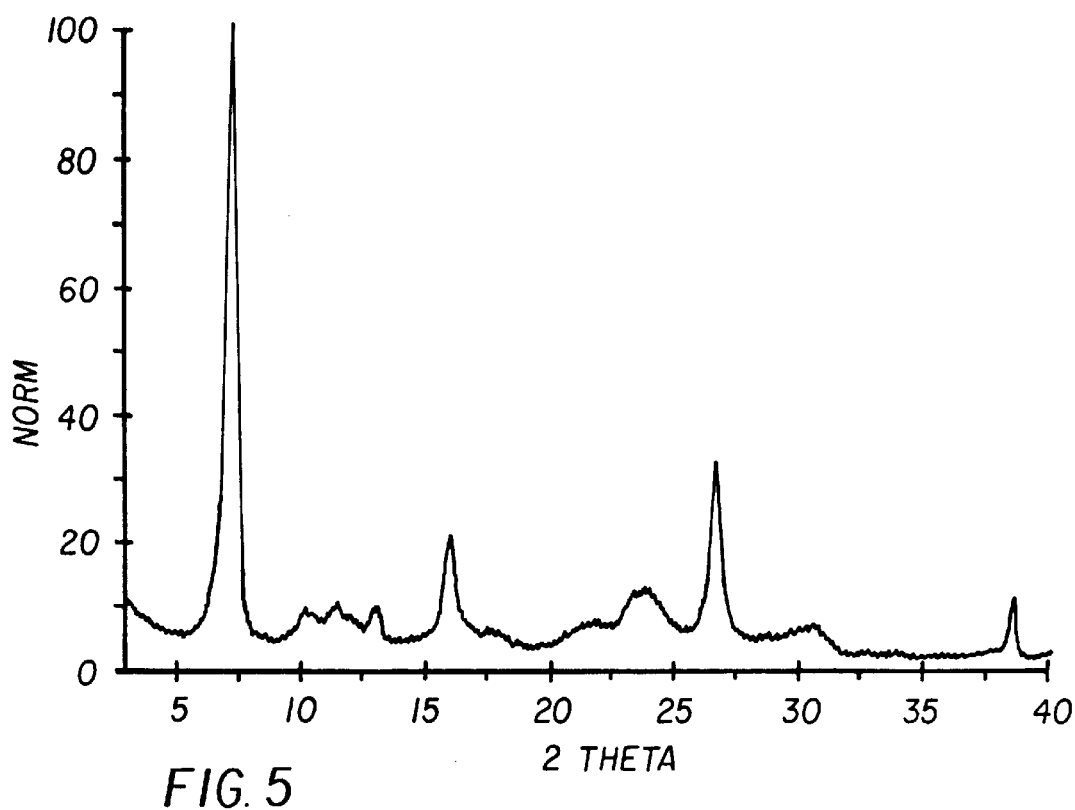

The x-ray diffraction spectrum (FIG. 5) exhibits major peaks of the Bragg angle at 7.3°, 16.0°, 23.6°, 26.6° (all ±0.2°).

Preparation 6: Non-uniformly Substituted Titanyl Fluorophthalocyanine: 55% Fluoroththalonitrile 4-Fluorophthalonitrile (20.1 grams), unsubstituted phthalonitrile (14.4 grams), titanium tetrachloride (23.8 grams), and 200 ml of 1-chloronaphthalene were mixed together in a 500 ml three-necked round-bottomed flask. The procedure of Preparation 2 was followed. Yield was 82% of theoretical.

Figure 6:
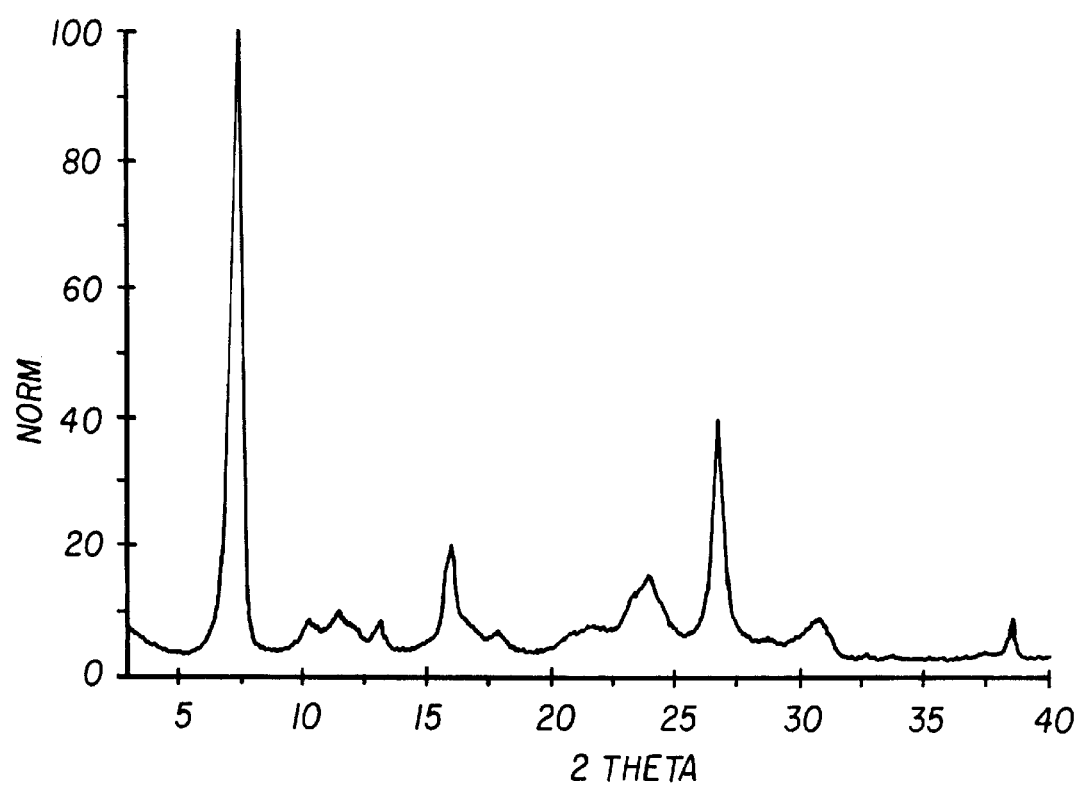

The x-ray diffraction spectrum (FIG. 6) exhibits major peaks of the Bragg angle at 7.5°, 16.2°, 23.4°, 24.0°, 26.8°, and 30.9° (all ±0.2°).

Preparation 7: Non-uniformly Substituted Titanyl Fluorophthalocyanine: 60% Fluorophthalonitrile 4-Fluorophthalonitrile (21.9 grams), unsubstituted phthalonitrile (12.8 grams), titanium tetrachloride (23.8 grams), and 200 ml of 1-chloronaphthalene were mixed together in a 500 ml three-necked round-bottomed flask. The procedure of Preparation 2 was followed. Yield was 80% of theoretical.

Figure 7:
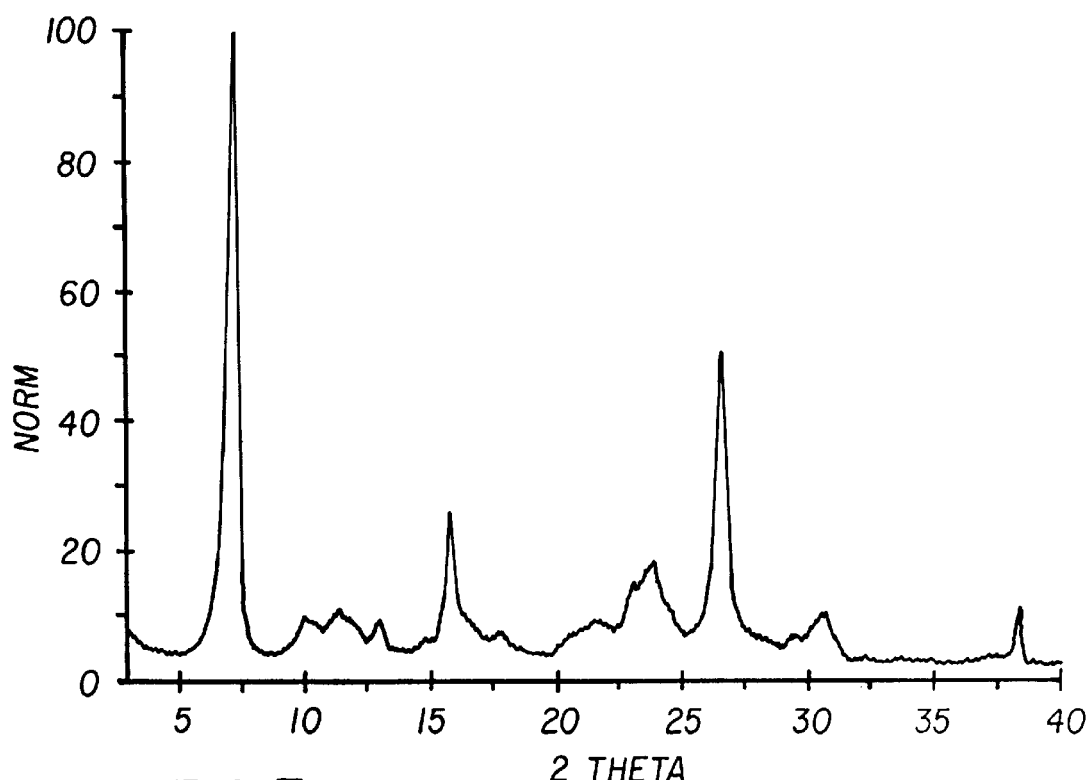

The x-ray diffraction spectrum (FIG. 7) exhibits major peaks of the Bragg angle at 7.4°, 16.0°, 23.3°, 24.1°, 26.7°, and 30.8° (all ±0.2°).

Preparation 8: Non-uniformly Substituted Titanyl Fluorophthalocyanine: 65% Fluorophthalonitrile 4-Fluorophthalonitrile (23.7 grams), unsubstituted phthalonitrile (11.2 grams), titanium tetrachloride (23.8 grams), and 200 ml of 1-chloronaphthalene were mixed together in a 500 ml three-necked round-bottomed flask. The procedure of Preparation 2 was followed. Yield was 82% of theoretical.

Figure 8:
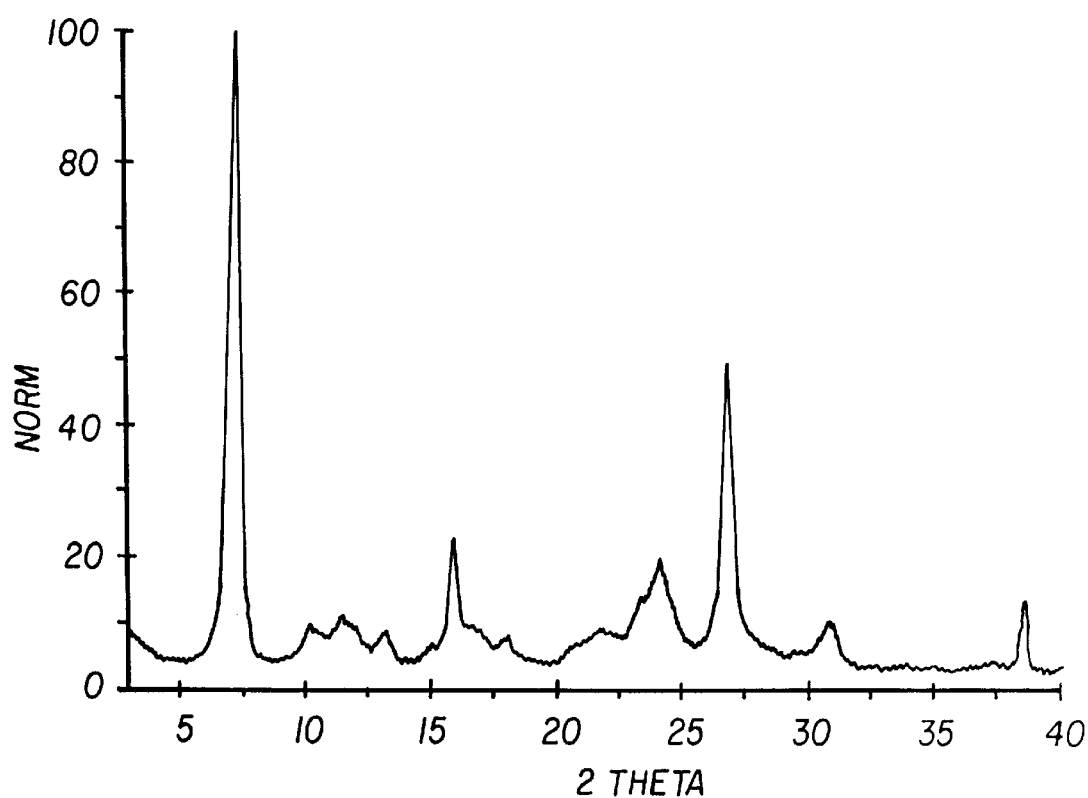

The x-ray diffraction spectrum (FIG. 8) exhibits major peaks of the Bragg angle at 7.4°, 11.6°, 16.0°, 23.4°, 24.1°, 26.8°, and 31.0°(all ±0.2°).

Preparation 9: Non-uniformly Substituted Titanyl Fluorophthalocyanine: 75% Fluorophthalonitrile 4-Fluorophthalonitrile (65.7 grams), unsubstituted phthalonitrile (19.2 grams), titanium tetrachloride (57 grams), and 480 ml of 1-chloronaphthalene were mixed together in a 1000 ml three-necked round-bottomed flask. The procedure of Preparation 1 was followed. Yield was 82% of theoretical.

Figure 9:
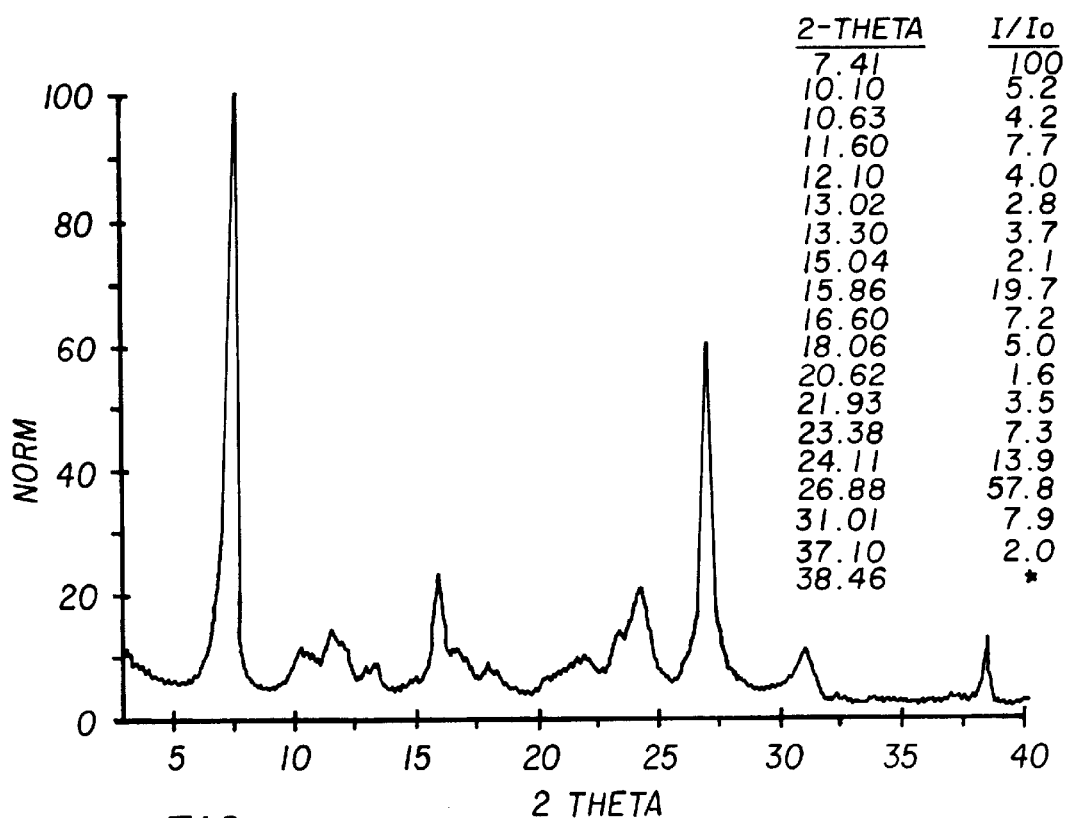

The x-ray diffraction spectrum (FIG. 9) exhibits major peaks of the Bragg angle at 7.4°, 10.1°, 11.6°, 15.9°, 16.6°, 18.1°, 23.4°, 24.1°, 26.9°, and 31.0° (all ±0.2°).

Preparation 10: Non-uniformly Substituted Titanyl Fluoro/4-Chlorophthalocyanine: 50/50 molar ratio 4-Fluorophthalonitrile (7.31 grams), 4-chlorophthalonitrile (8.13 grams), titanium tetrachloride (5.5 ml), and 125 ml of 1,2,4-trichlorobenzene were mixed together at room temperature, refluxed at 208° C. for three hours, cooled to room temperature, diluted with 100 ml of methanol and filtered, with methanol and acetone washings. The dried solid was boiled in 800 ml of water and filtered until pH paper indicated the filtrate was neutral. Yield was 8.19 grams.

Figure 10:
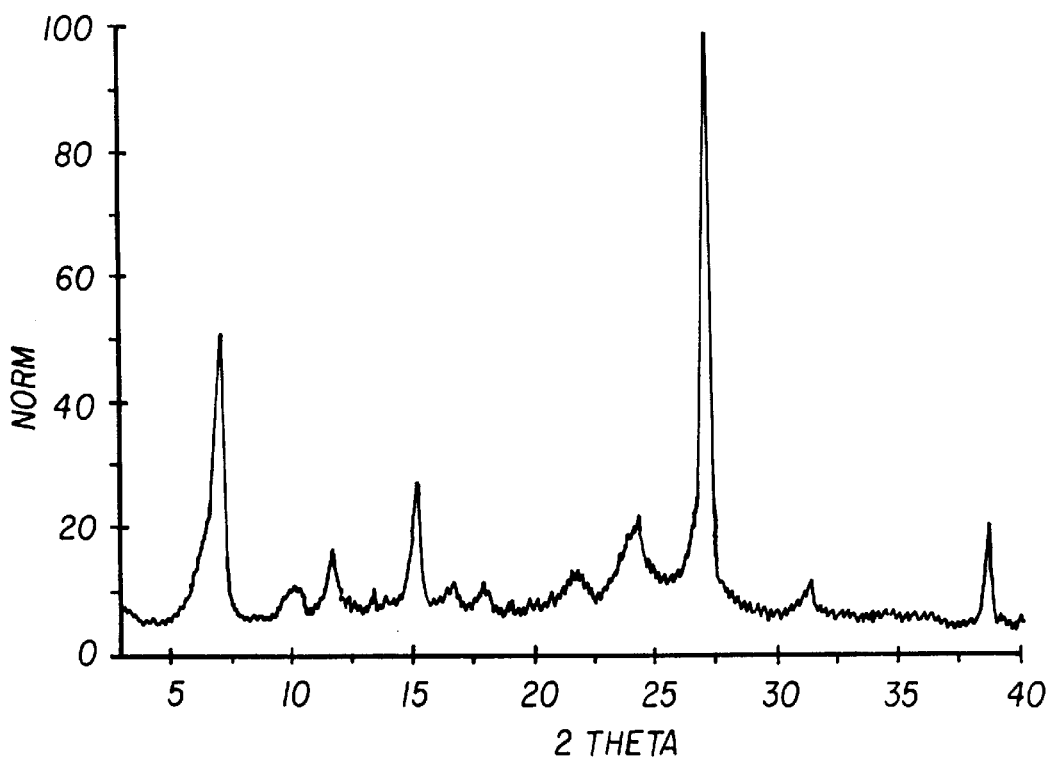

The x-ray diffraction spectrum (FIG. 10) exhibited major peaks of the Bragg angle at 7.1°, 11.7°, 15.1°, 17.8°, 24.1°, 27.0°, and 31.3° (all ±0.2°).

Preparation 11: Non-uniformly Substituted Chlorogallium Fluorophthalocyanine: 50/50 molar ratio 4-Fluorophthalonitrile (73 grams), unsubstituted phthalonitrile (64 grams), gallium trichloride (50 grams), and 1000 ml of 1-chloronaphthalene were mixed together at room temperature under nitrogen, heated at 210° C.±10° C. for three hours, cooled to room temperature, and filtered. The crude pigment was then washed with additional 1-chloronaphthalene and acetone until the filtrate ran clear; yielding 85.5 grams of a dark blue powder.

Figure 11:
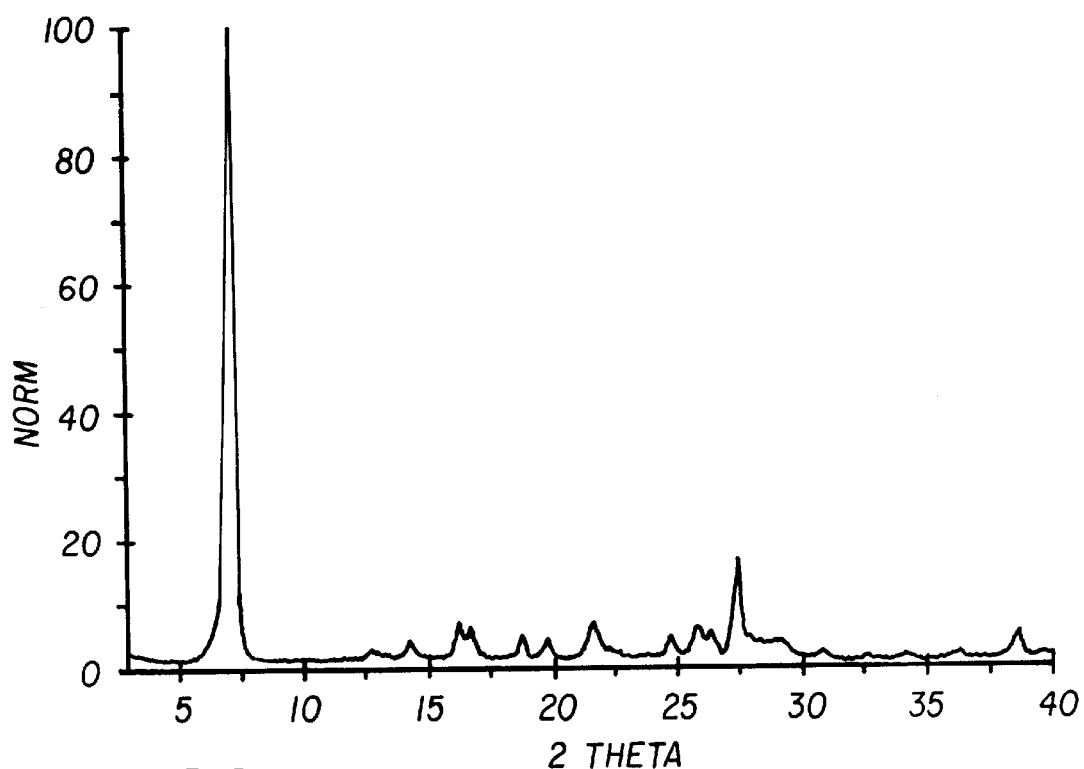

The x-ray diffraction spectrum (FIG. 11) exhibits major peaks of the Bragg angle at 7.2°, 16.3°, 16.8°, 21.7°, and 27.4° (all ±0.2°).

Comparative Preparation 1: Unsubstituted Titanyl Phthalocyanine

Phthalonitrile (1100 grams) and titanium tetrachloride (813 grams) were suspended in 6800 ml of 1-chloronaphthalene and heated to 215°–220° C. and maintained for 2.5 hours at this temperature. The reaction mixture was cooled to 140° C., and the dark solid was collected, and washed with acetone, and methanol. After drying, the dark blue solid (1090 grams) was refluxed twice in 10 liters of distilled water for two hours, filtered hot each time, and washed with acetone to yield crude titanyl phthalocyanine.

Figure 12:
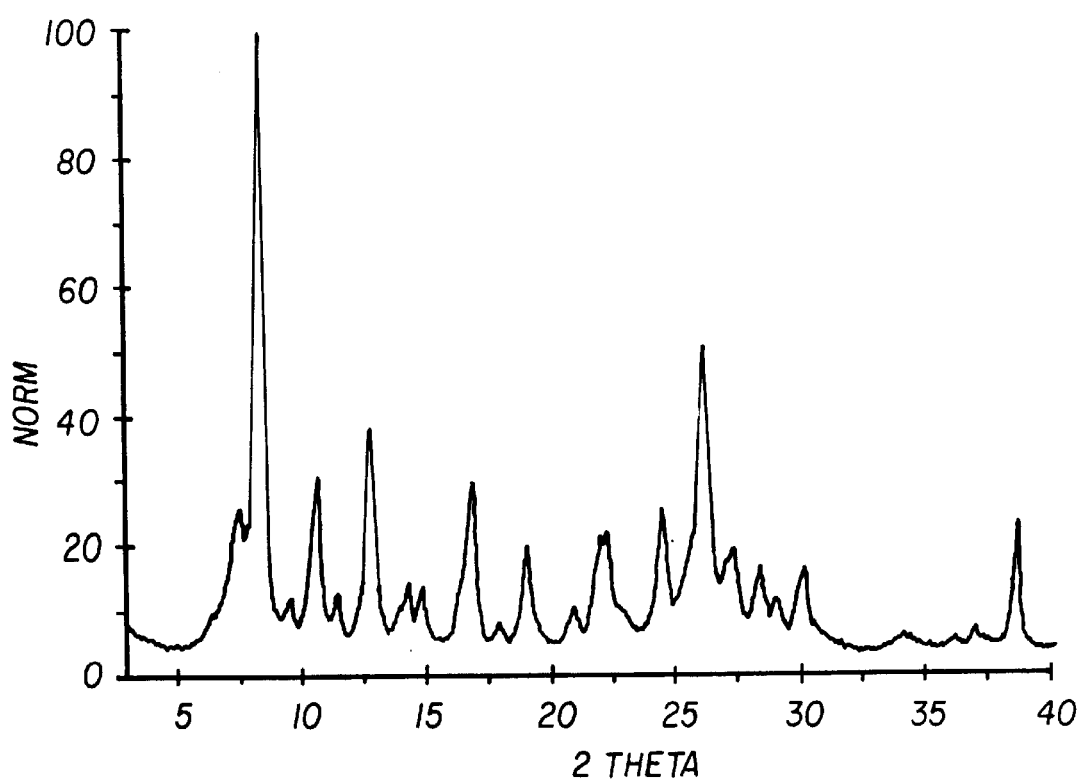
FIGS. 12–16: COMPARATIVE PREPARATIONS 1–5, respectively.

The x-ray diffraction spectrum (FIG. 12) exhibits major peaks of the Bragg angle at 7.5°, 8.3°, 10.5°, 12.7°, 14.2°, 14.6°, 18.9°, 22.1°, 24.3°, 26.1°, and 29.9° (all ±0.2°).

Comparative Preparation 2: Uniformly Substituted Titanyl 4-Fluorophthalocyanine

4-Fluorophthalonitrile (38.7 grams, 0.267 mole) and titanium tetrachloride (20.7 grams, 0.134 mole) were suspended in 200 ml of 1-chloronaphthalene and heated to 205°–210° C. and maintained for 2 hours at this temperature. The reaction mixture was cooled slightly, and the dark solid was collected and washed with acetone and methanol. The dark blue solid (34 grams) was refluxed for two hours in distilled water several times until the filtrate was neutral. The pigment was then rinsed with acetone and methanol and dried to yield crude titanyl tetrafluorophthalocyanine.

Figure 13:
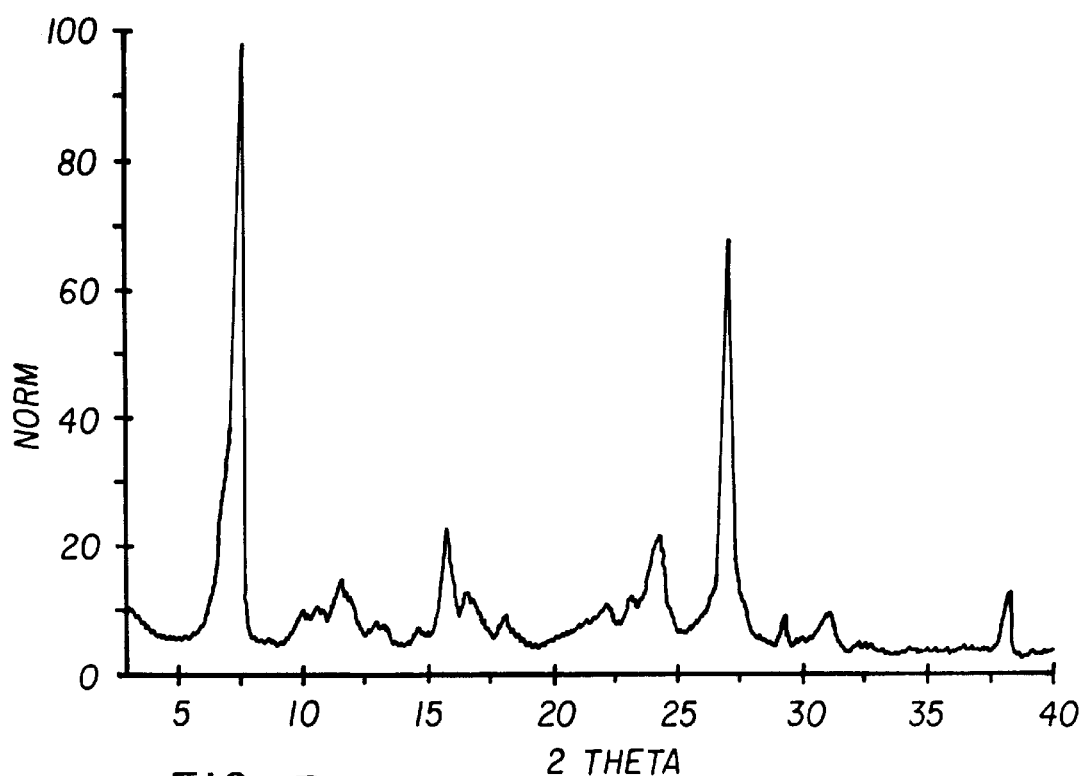

The x-ray diffraction spectrum (FIG. 13) exhibits major peaks of the Bragg angle at 7.3°, 10.6°, 11.5°, 11.8°, 15.7°, 16.6°, 17.0°, 18.2°, 22.1°, 23.2°, 24.3°, 27.0°, and 31.2° (all ±0.2°)

Comparative Preparation 3: Mixed Titanyl Fluoro/ Methyl Phthalocyanine, 50:50 Molar Ratio 4-Fluorophthalonitrile (14.6 grams, 0.10 mole), and 4-Methylphthalonitrile (14.2 grams, 0.10 mole) in 250 mL of 1-chloronaphthalene were treated with titanium tetrachloride (11 mL, 0.10 mole) at room temperature, heated at 220° C.±5° C. for three hours, cooled to 170° C., and filtered, with methanol washings. The dried solid was boiled repeatedly in water until the filtrate was neutral. The yield of dark blue powder was 16.5 grams.

Figure 14:
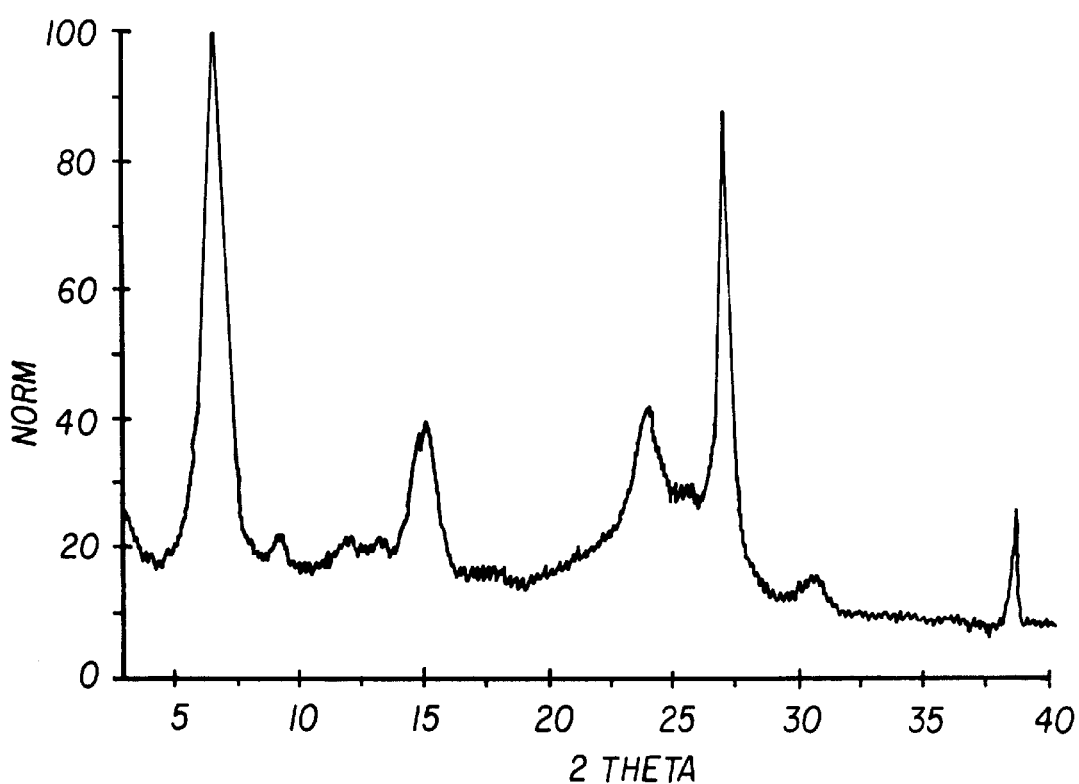

The x-ray diffraction spectrum (FIG. 14) exhibits major peaks of the Bragg angle at 6.6°, 9.3°, 14.8°, 15.3°, 23.9°, 26.9°, and 30.5° (all ±0.2°). These peaks are relatively very broad, suggesting a material that is relatively amorphous. This is unexpectedly different from the examples of this invention where the coreacting phthalonitriles are unsubstituted phthalonitrile, and halogen substituted phthalonitriles such as fluorophthalonitriles.

Comparative Preparation 4: Non-uniformly Substituted Methylphthalocyanine 50:50 molar ratio 4-Methylphthalonitrile (14.2 grams, 0.10 mole) and phthalonitrile (12.8 grams, 0.10 mole) were reacted with titanium tetrachloride (11 mL, 0.10 mol) in 250 mL of 1-chloronaphthalene according to the procedures of Comparative Preparation 3. The yield of the final dark blue product was 11.6 grams.

Figure 15:
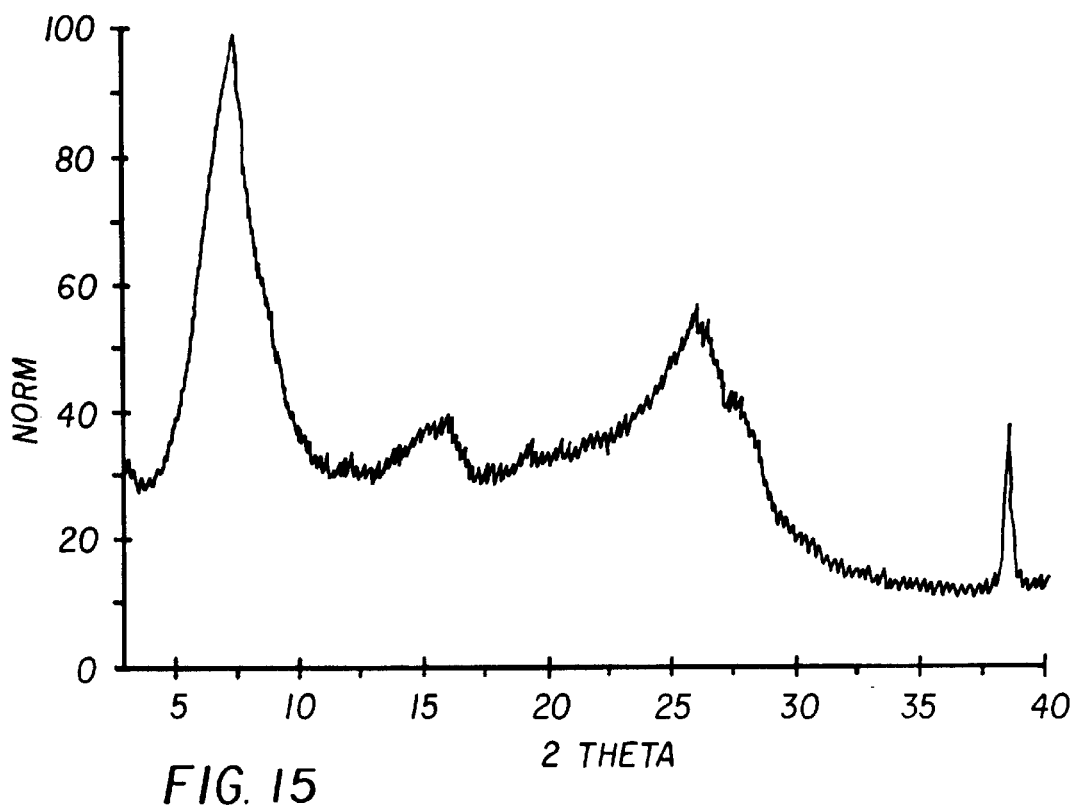

The x-ray diffraction spectrum (FIG. 15) exhibits major peaks of the Bragg angle at 7.4°, 11.9°, 15.6°, and 26.1° (all ±0.2°). Surprisingly those peaks are very broad and indicative of an amorphous material. This is significantly different from the examples of this invention. The crude materials of this invention are all crystalline material.

Comparative Preparation 5: Uniformly Substituted Chlorogallium Phthalocyanine

Phthalonitrile (128 grams) and gallium trichloride (50 grams) were suspended in 1000 ml of 1-chloronaphthalene at room temperature under nitrogen and heated to 210° C.±5° C. and maintained for three hours at this temperature. The reaction mixture was cooled, and the dark solid was collected and washed with acetone and methanol. The dark blue solid weight was 68.2 grams.

Figure 16:
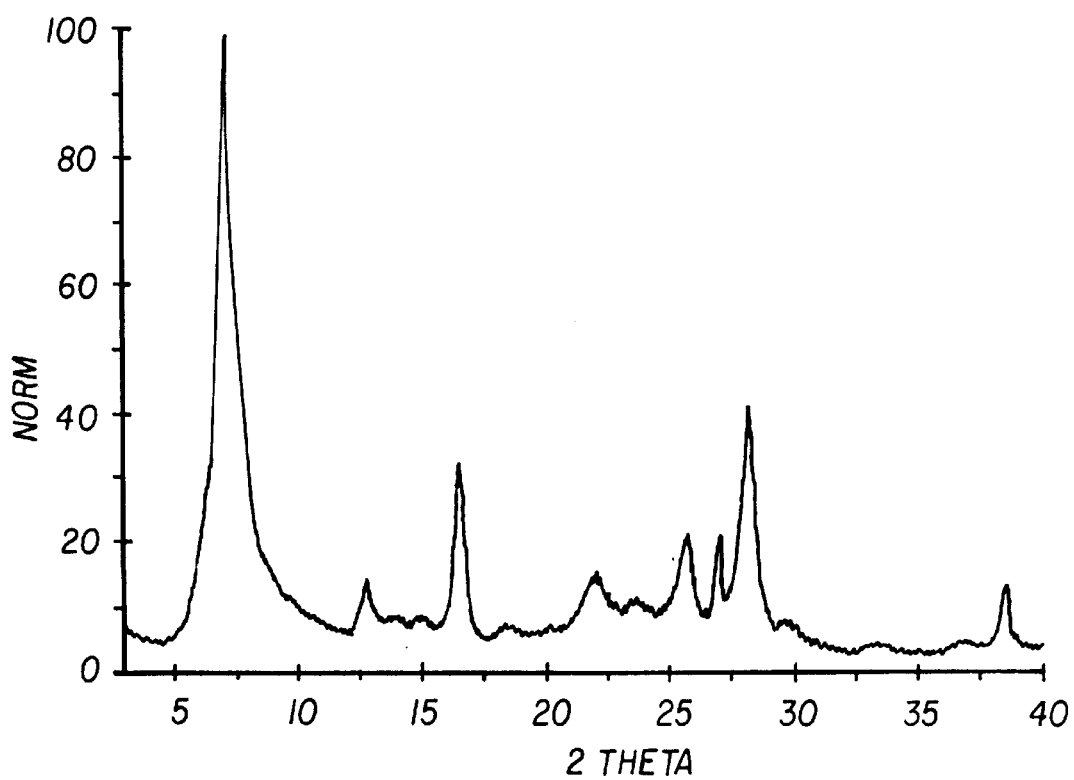
Figure 17:
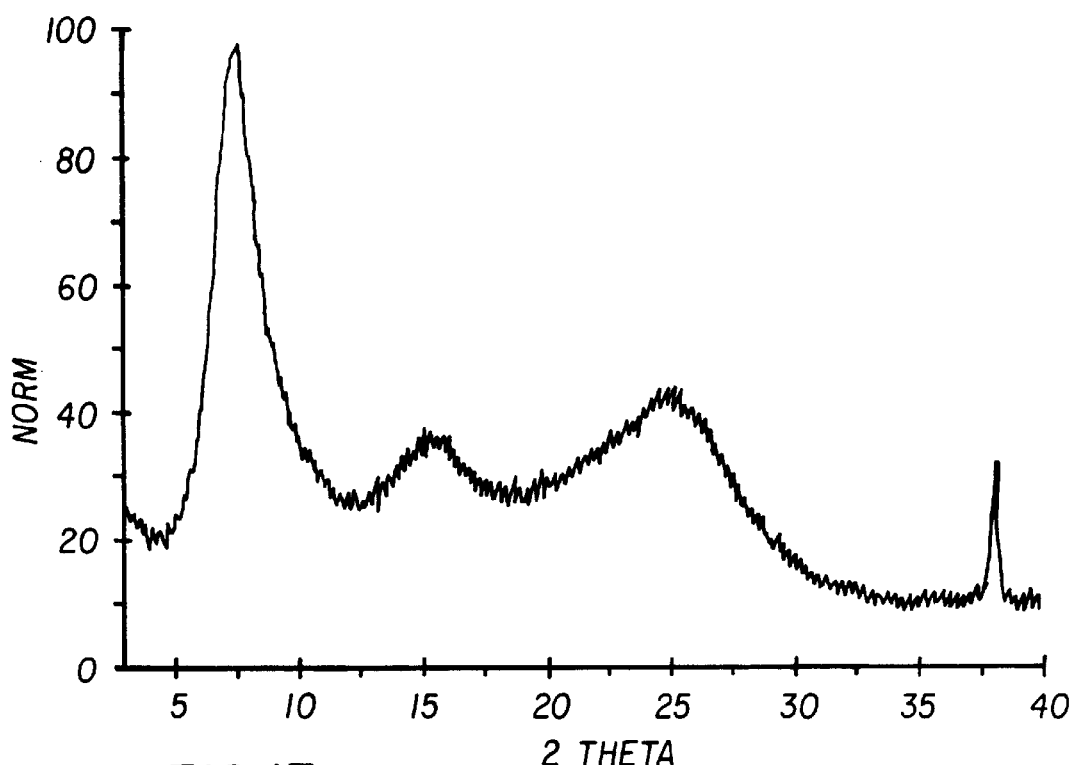
FIGS. 17–26: EXAMPLES 1–10, respectively.
Figure 18:
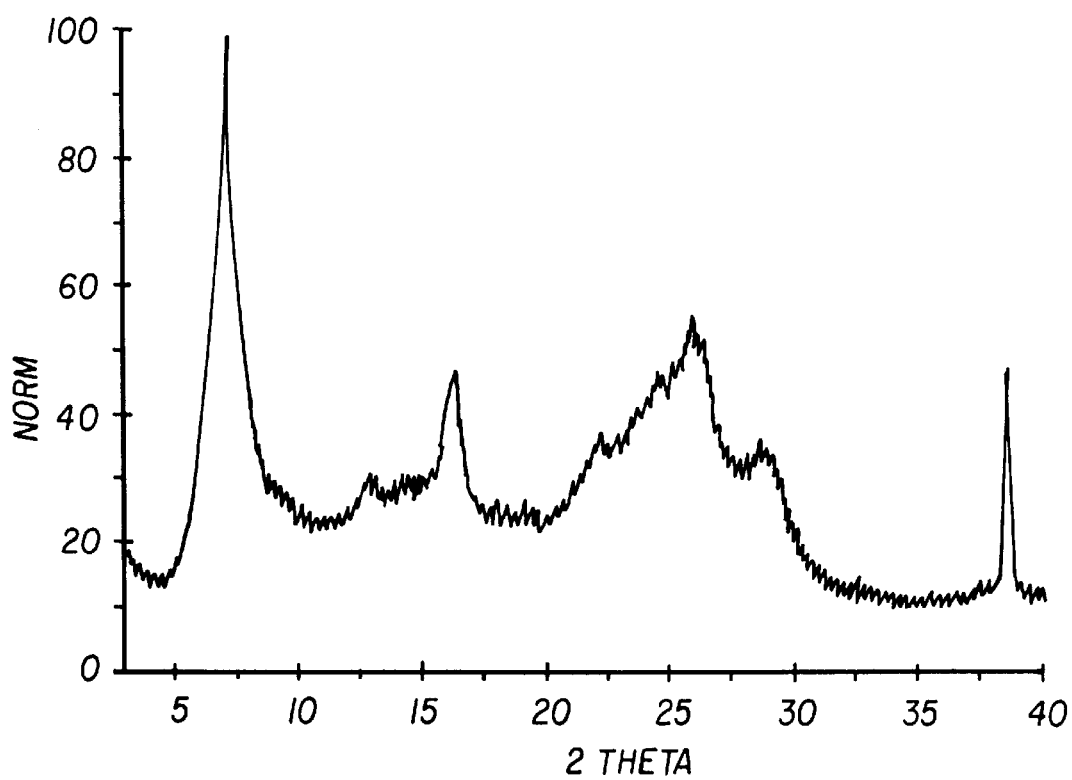
Figure 19:
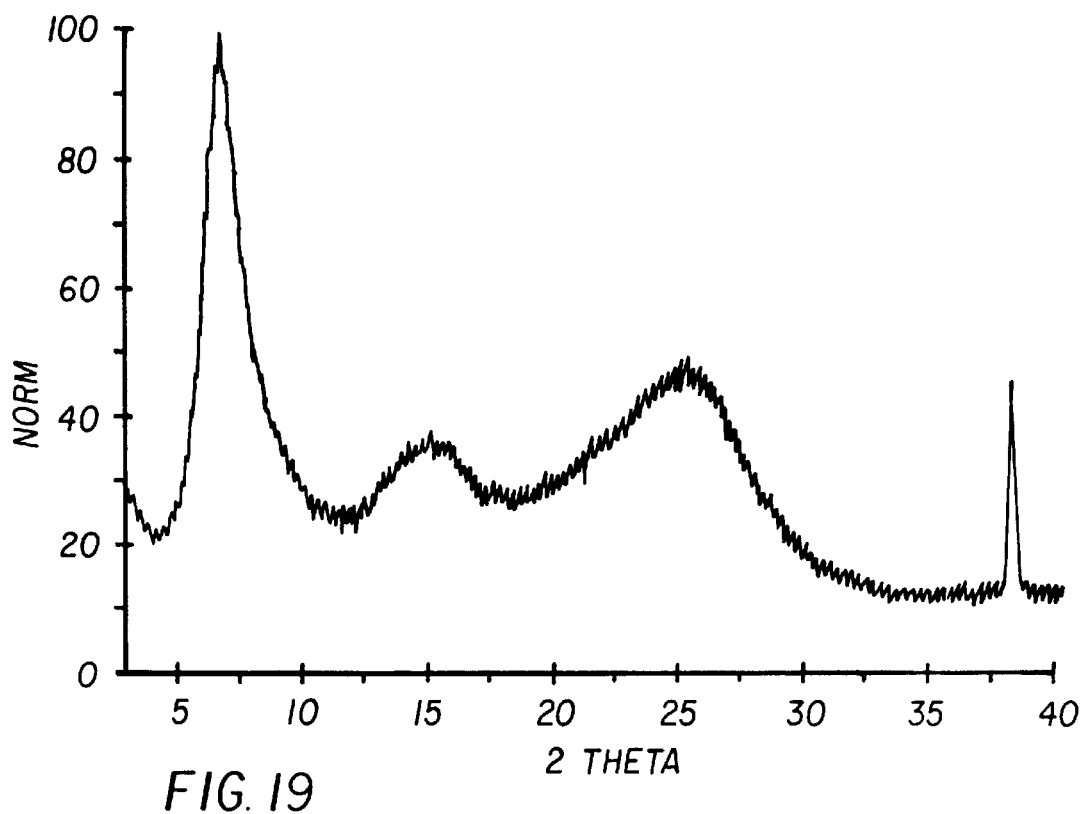
Figure 20:
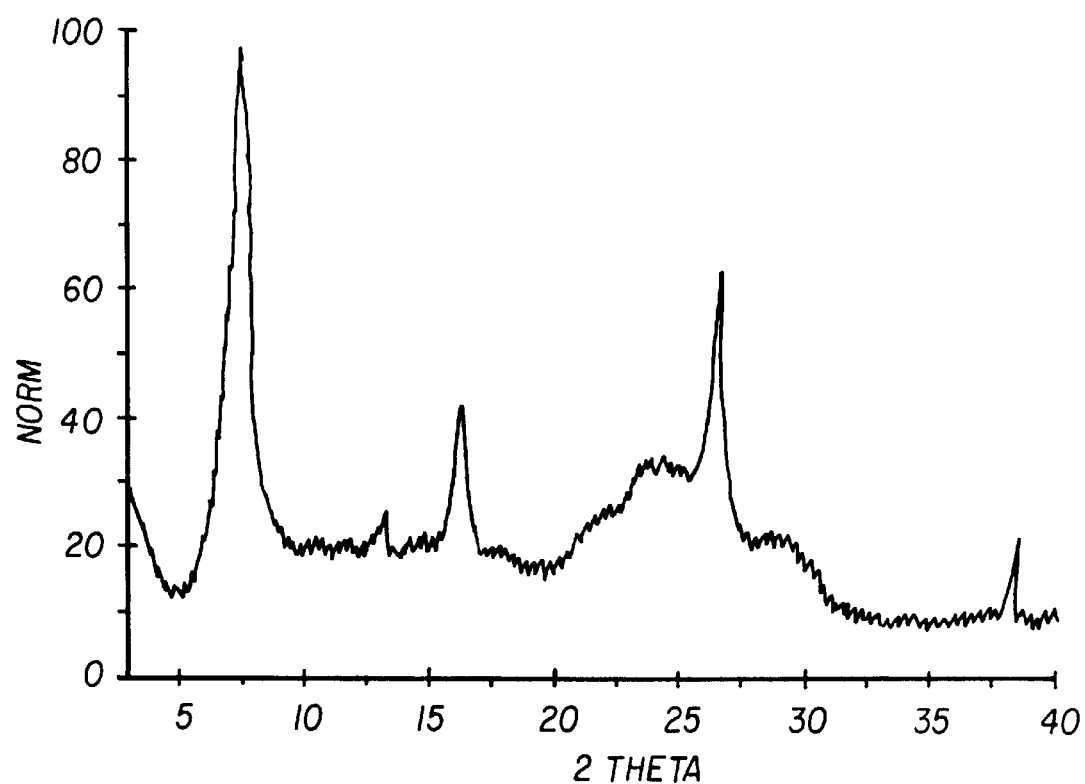
Figure 21:
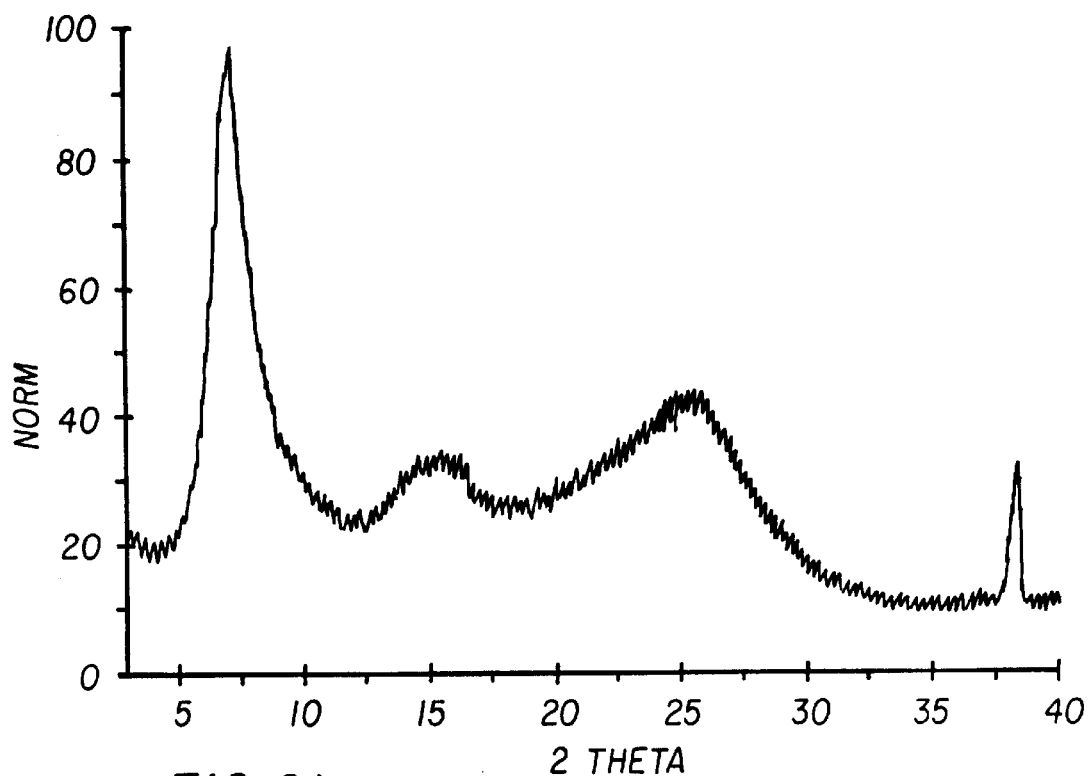
Figure 22:
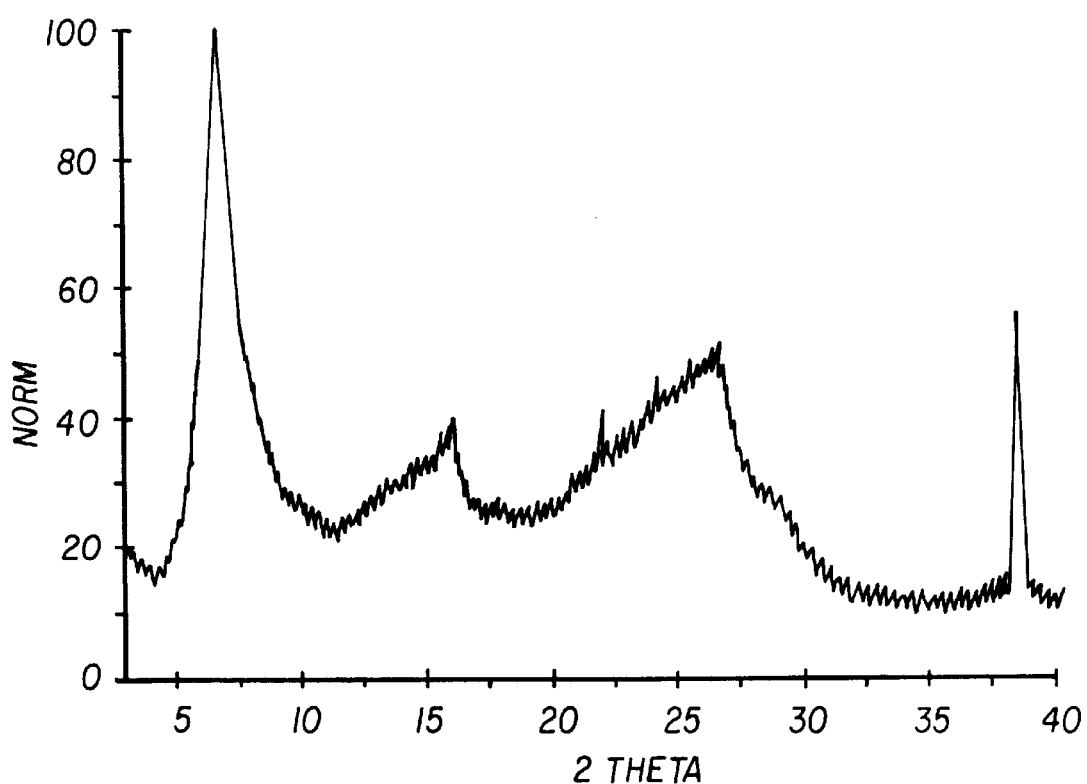
Figure 23:
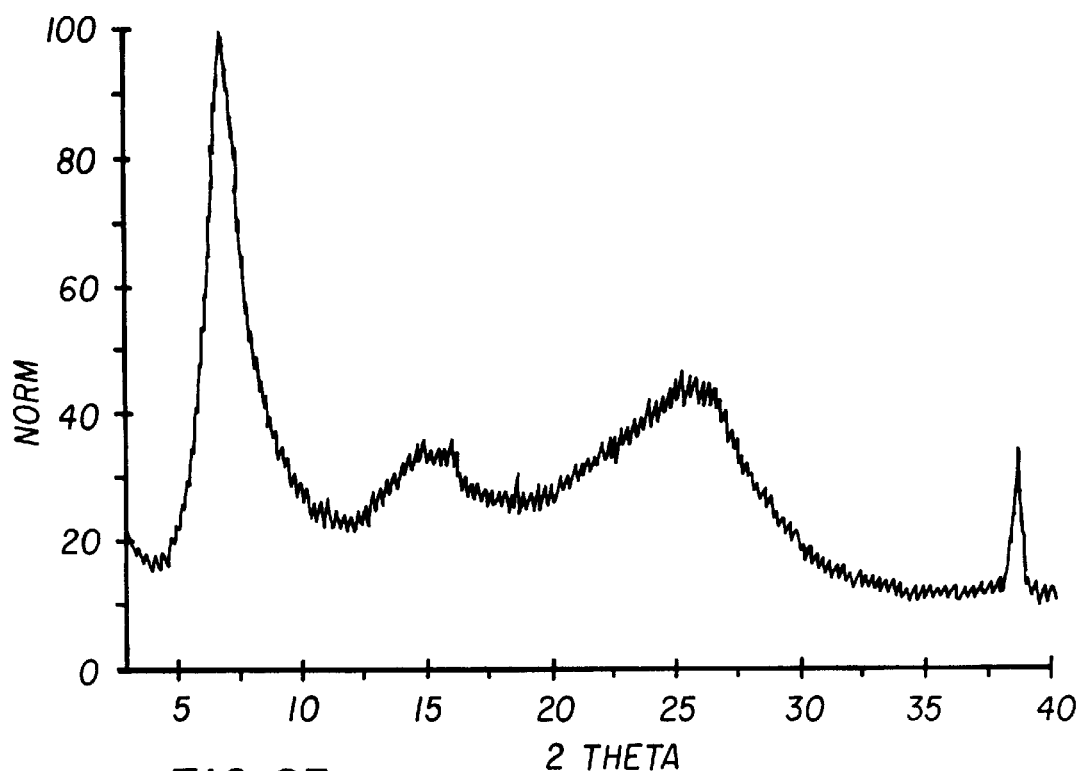
Figure 24:
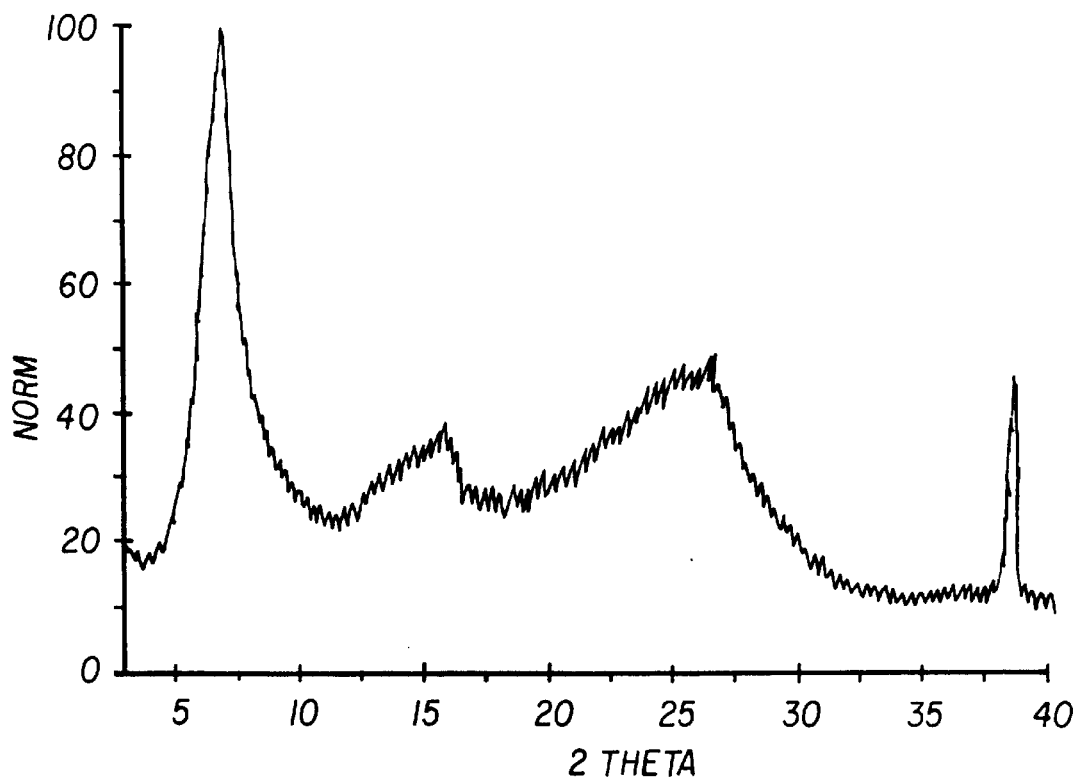
Figure 25:
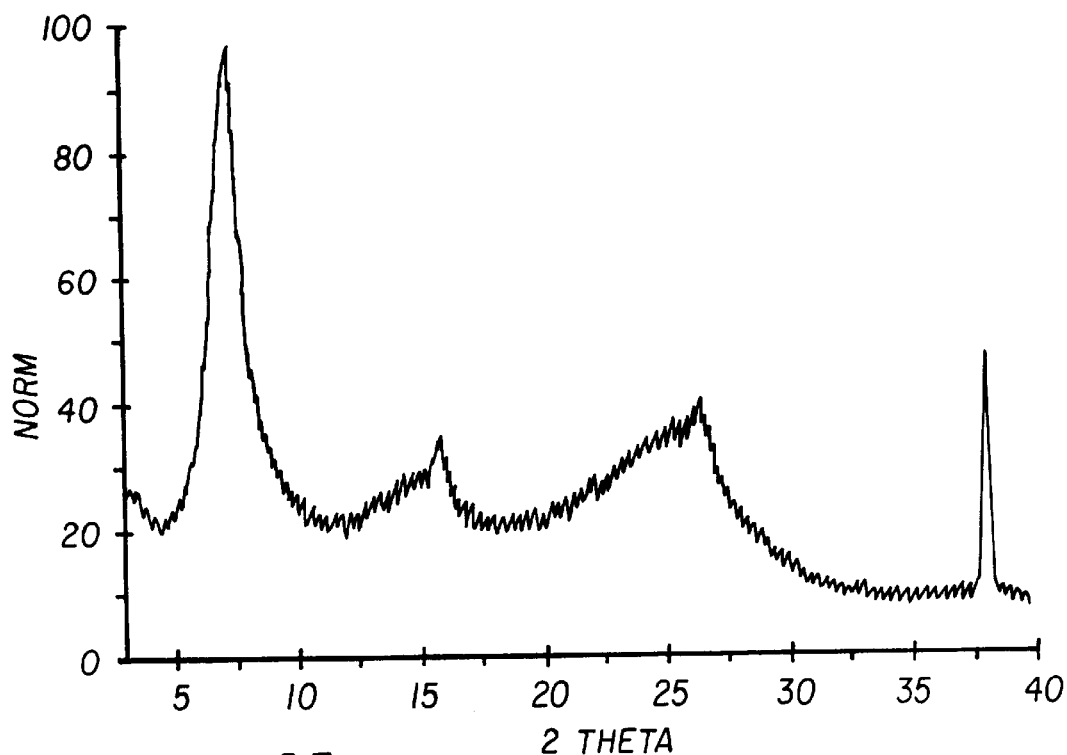

The x-ray diffraction spectrum (FIG. 16 exhibits major peaks of the Bragg angle at 7.1°, 12.8°, 16.6°, 21.9°, 25.9°, 27.1°, and 28.2° (all ±0.2°).

EXAMPLES 1–9

Dry Milling of Non-uniformly Substituted Titanyl Fluorophthalocyanine of Various Molar Ratios Ten grams of each of the preparations above were respectively mixed in a 16 oz jars with 300 grams of 3 mm steel beads. The pigment samples were thus milled using a Sweco Vibro Energy grinding mill manufactured by Sweco, Inc. of Florence, Ky. for 48 hours. The pigment particles were completely fused coating the stainless steel beads, and agglomerating at the bottom of the jar in one big mass. The mass was broken down, and samples taken for X-Ray diffraction analysis. Diffraction spectra are shown in FIGS. 17–25, respectively, for the various samples. The peaks for all the samples are similar and very broad, indicating very amorphous structures.

EXAMPLE 10

Figure 26:
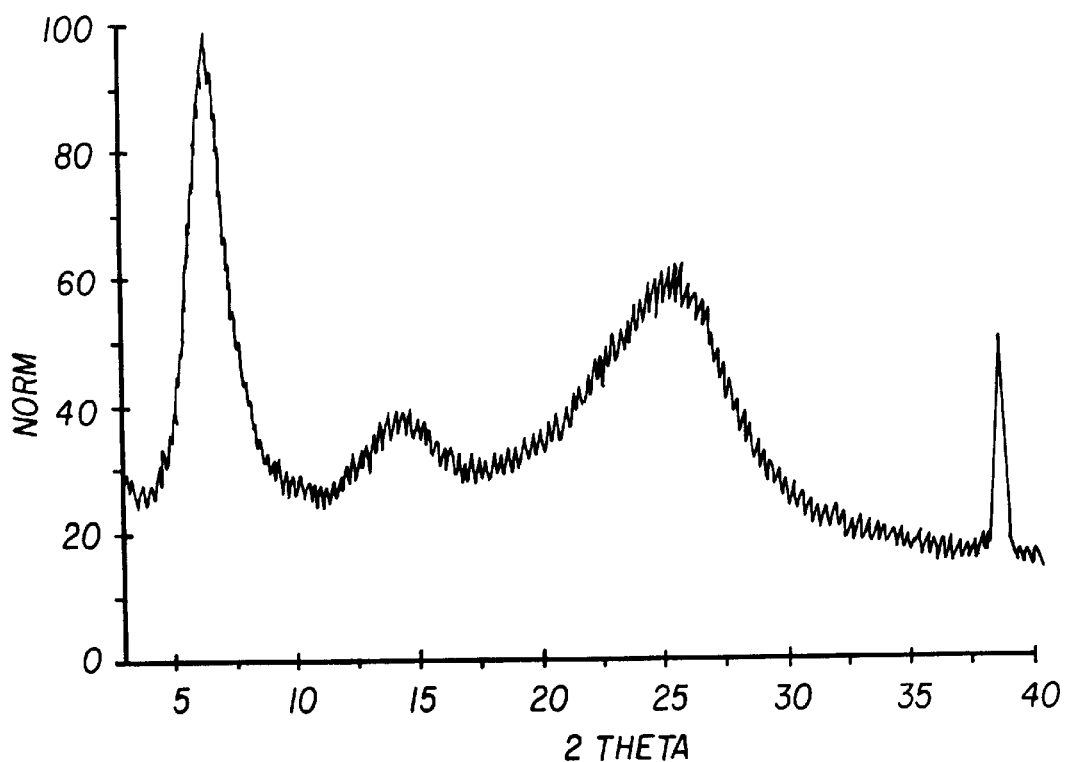

Dry Milling of Non-uniformly Substituted Titanyl Fluoro/Chlorophthalocyanine: 50/50 Molar Ratio Ten grams of preparation were mixed in a 16 oz jar with 300 grams of 3 mm steel beads, according to the procedure of Example 1–9. The diffraction spectrum for the resulting product is shown in FIG. 26. The peaks are very broad, indicating very amorphous structure.

Comparative Example 1

Dry milling of Uniformly Substituted Titanyl Fluorophthalocyanine

Figure 27:
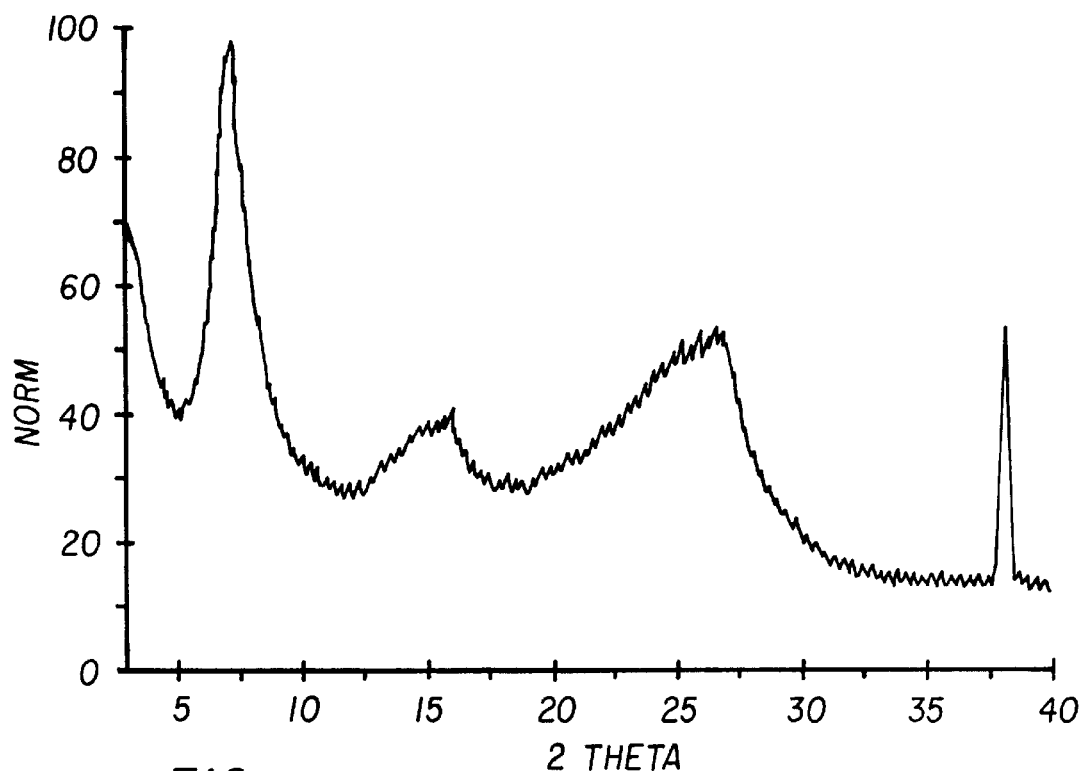
FIGS. 27–30: COMPARATIVE EXAMPLES 1–4, respectively.

Ten grams of crude titanyl fluorophthalocyanine pigment were milled in conditions comparable to those of Examples 1–9. The X-ray diffraction spectrum is shown in FIG. 27. The peaks are very broad, consistent with an amorphous material.

Comparative Example 2

Dry milling of Unsubstituted Titanyl Phthalocyanine

Figure 28:
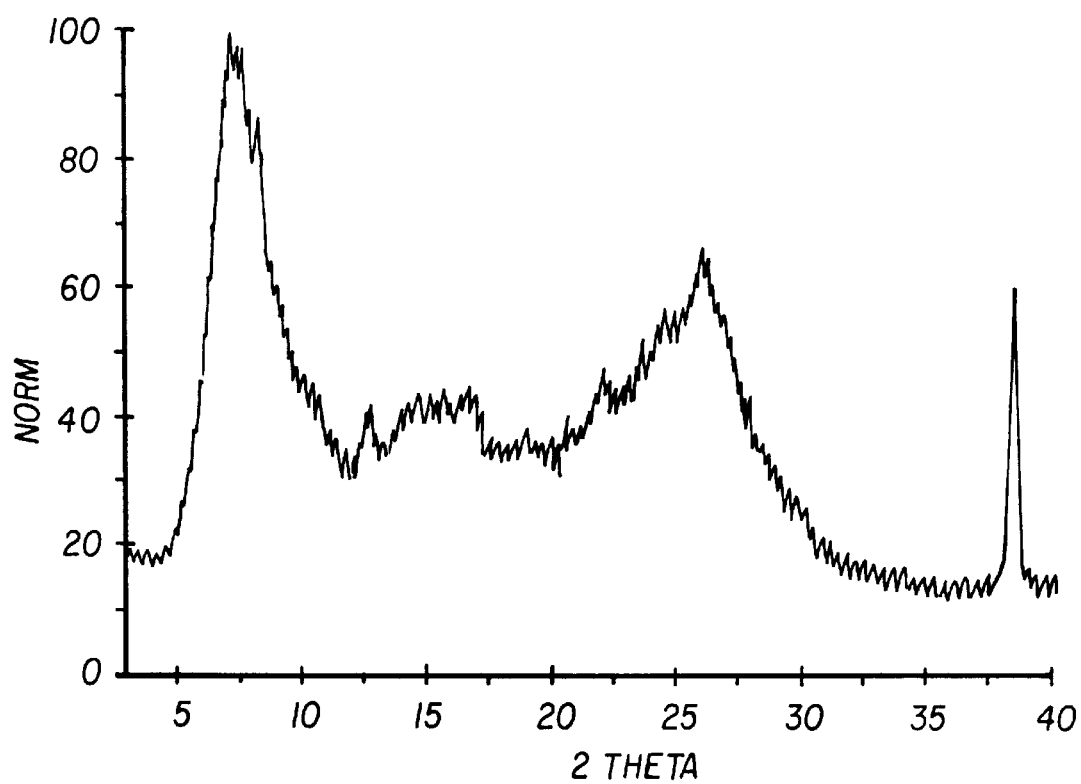

Ten grams of crude titanyl phthalocyanine pigment were milled according to the procedure of Examples 1–9. The X-Ray diffraction spectrum is shown in FIG. 28. The peaks are very broad, and consistent with an amorphous material.

Comparative Example 3

Figure 29:
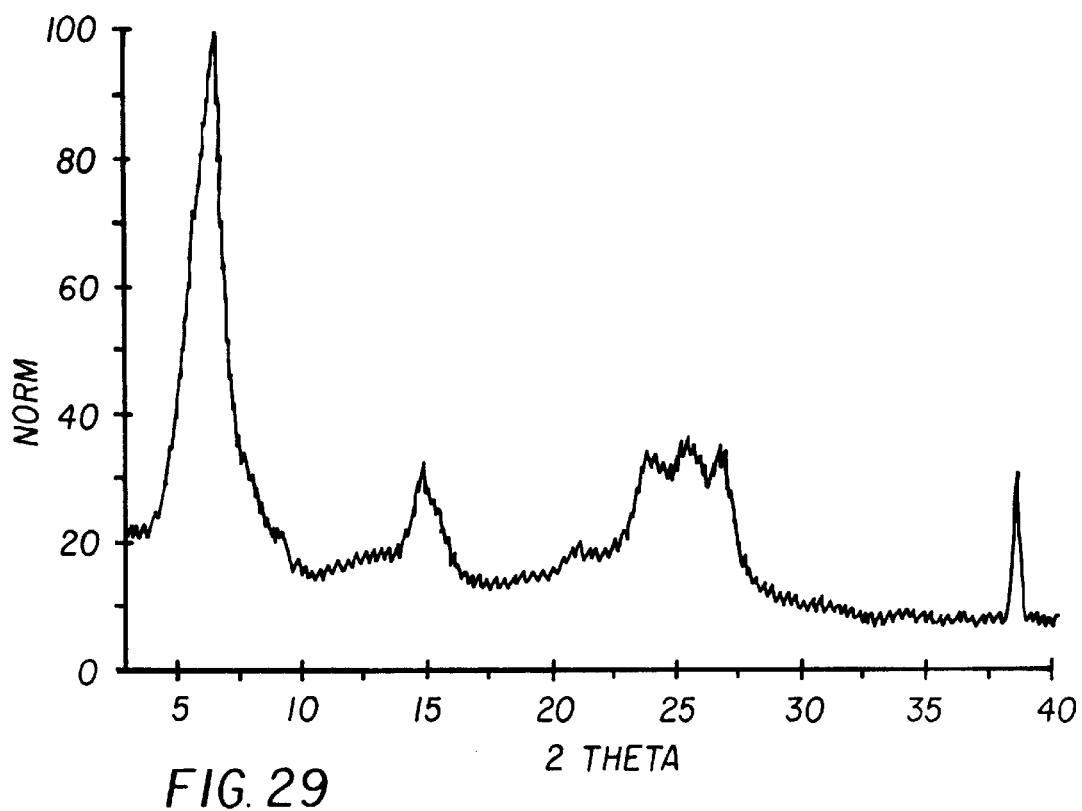

Dry Milling of Mixed Titanyl Fluoro/Methyl Phthalocyanine 50:50 Molar Ratio The sample of Comparative Preparation 3 was treated as in Examples 1–9. The X-ray diffraction spectrum is shown in FIG. 29. The peaks are very broad, and consistent with an amorphous material; however, surprisingly, the milled material is not very different from the unmilled sample.

Comparative Example 4

Figure 30:
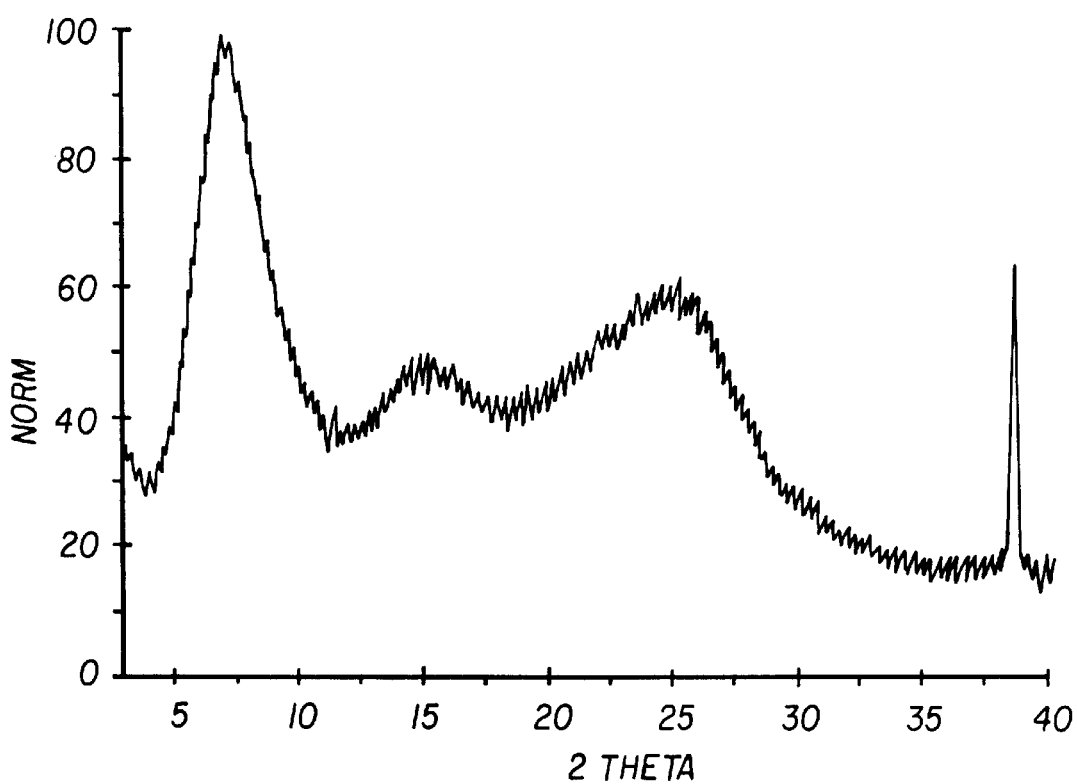

Dry Milling of Non-uniformly Substituted Titanyl Methyl Phthalocyanine 50:50 Molar Ratio The sample of Comparative Example 4 was treated as in Examples 1–9. The X-Ray diffraction spectrum is shown in FIG. 30. The peaks are very broad, and consistent with an amorphous material; however the milled material is very slightly different from the unmilled material.

EXAMPLE 11

Dichloromethane Treatment of Non-uniformly Substituted Titanyl Fluorophthalocyanine: 25% Fluorophthalonitrile Six grams of the dry milled pigment of Example 1 were mixed with dichloromethane (about 300 grams) and with about half the original stainless steel beads and put back on the Sweco mill for 24 hours. The beads were then filtered off, and the pigment isolated and dried.

Figure 31:
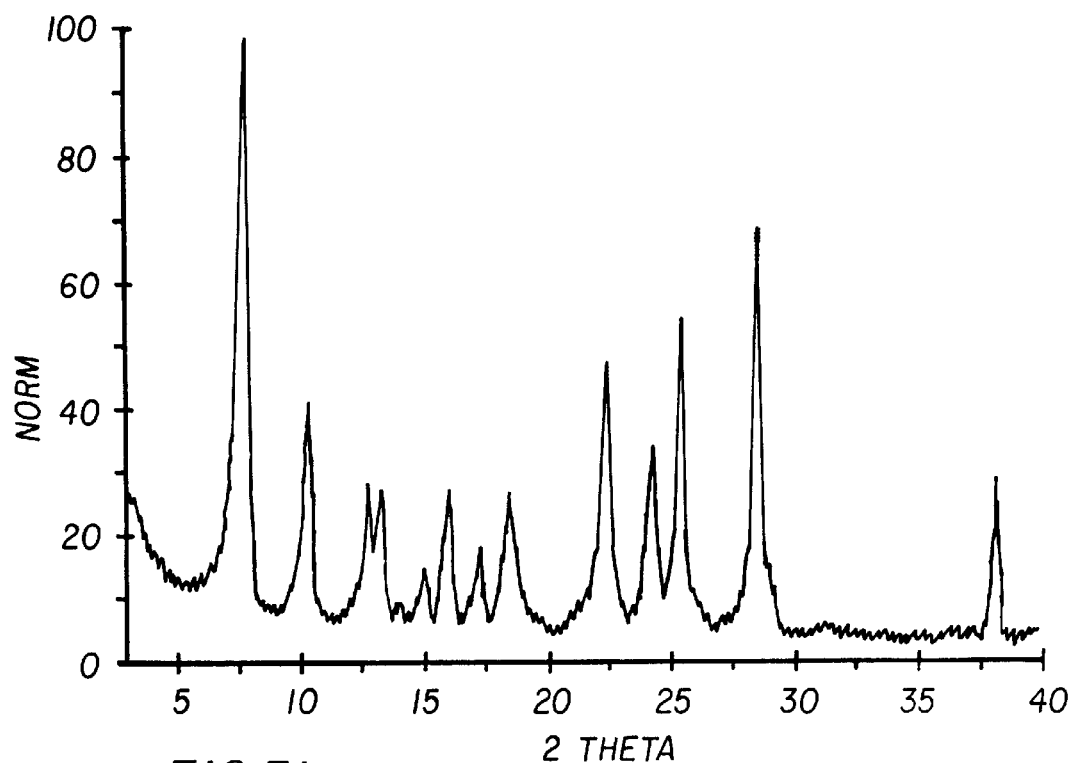
FIGS. 31–40: EXAMPLE 11–20, respectively.

The x-ray diffraction spectrum (FIG. 31) exhibits major peaks of the Bragg angle at 7.4°, 10.1°, 12.6°, 13.1°, 15.0°, 16.0°, 17.3°, 18.4°, 22.4°, 24.2°, 25.4°, and 28.6° (all ±0.2°).

EXAMPLE 12

Figure 32:
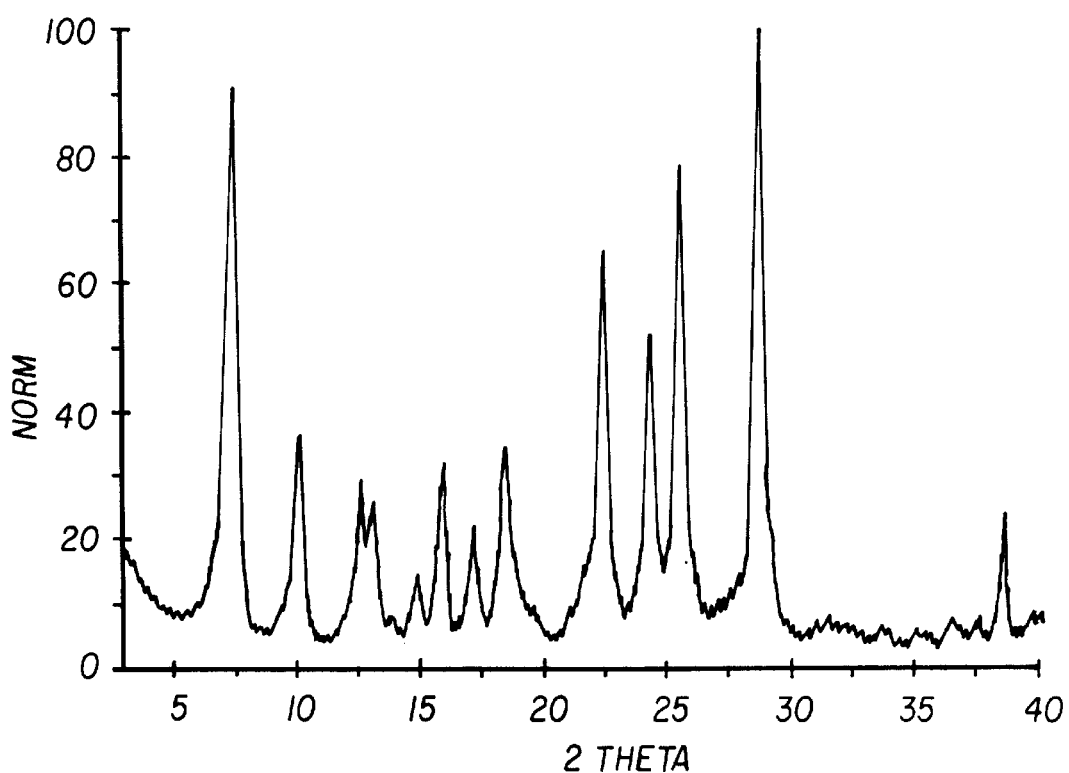

Dichloromethane Treatment of Non-uniformly Substituted Titanyl Fluorophthalocyanine: 30% Fluorophthalonitrile The procedure of Example 11 was used. The x-ray diffraction spectrum (FIG. 32) exhibits major peaks of the Bragg angle at 7.4°, 10.1°, 12.6°, 13.1°, 15.0°, 15.9°, 17.3°, 18.4°, 18.9°, 21.6°, 22.4°, 24.2°, 25.4°, and 28.7° (all ±0.2°).

EXAMPLE 13

Figure 33:
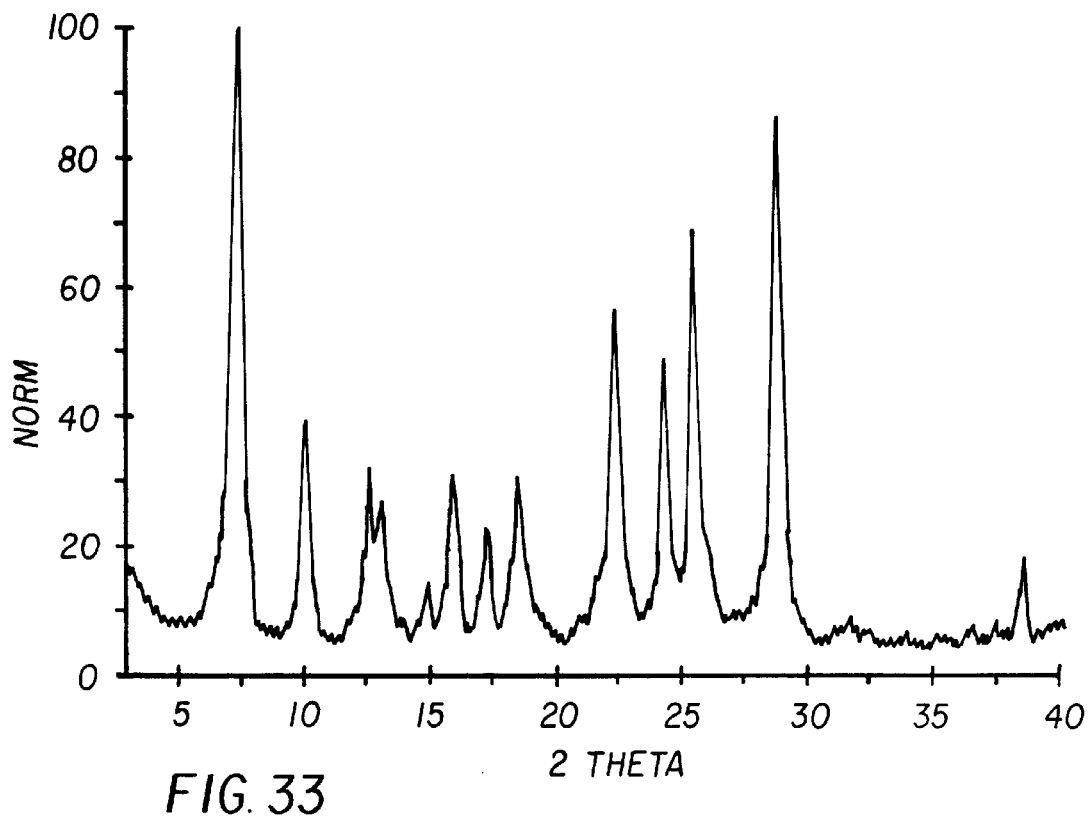

Dichloromethane Treatment of Non-uniformly Substituted Titanyl Fluorophthalocyanine: 40% Fluorophthalonitrile The procedure of Example 11 was used. The x-ray diffraction spectrum (FIG. 33) exhibits major peaks of the Bragg angle at 7.5°, 10.2°, 12.7°, 13.2°, 15.0°, 16.0°, 17.3°, 18.4°, 18.9°, 21.6°, 22.4°, 24.4°, 25.5°, and 28.8° (all ±0.2°).

EXAMPLE 14

Figure 34:
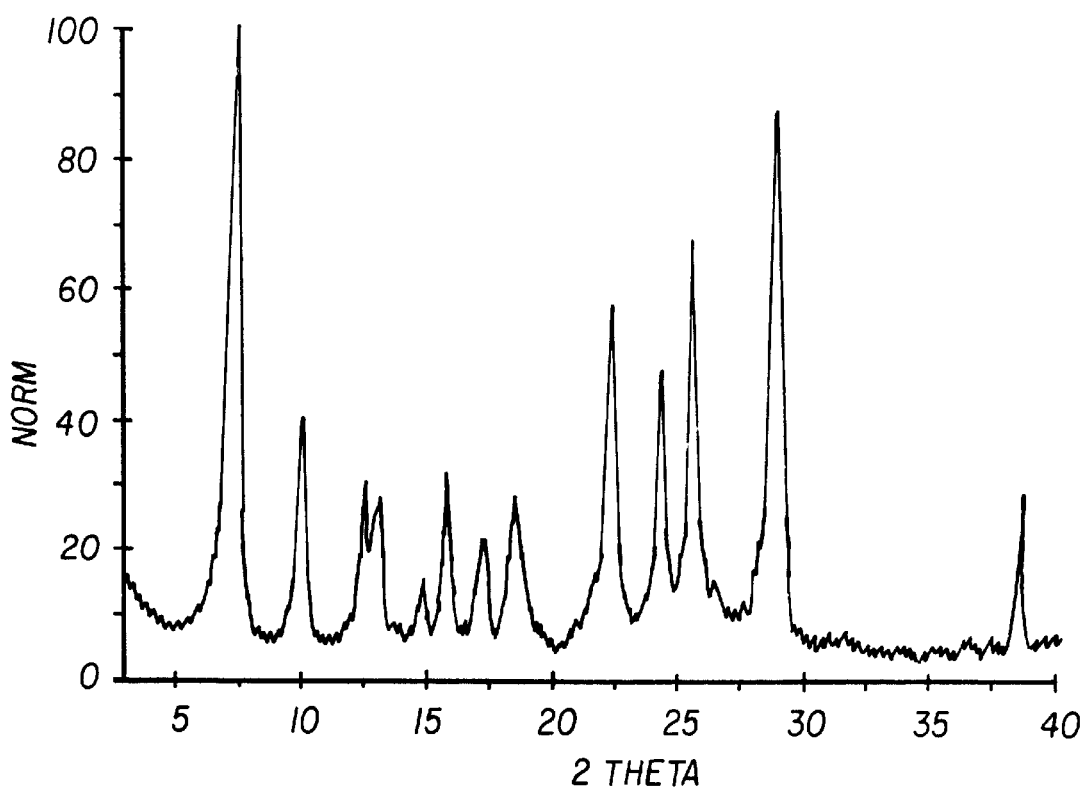

Dichloromethane Treatment of Non-uniformly Substituted Titanyl Fluorophthalocyanine: 45% Fluorophthalonitrile The procedure of Example 11 was used. The x-ray diffraction spectrum (FIG. 34) exhibits major peaks of the Bragg angle at 7.4°, 10.1°, 12.6°, 13.1°, 14.9°, 15.9°, 17.3°, 18.5°, 22.4°, 24.3°, 25.5°, 26.6°, and 28.8° (all ±0.2°).

EXAMPLE 15

Figure 35:
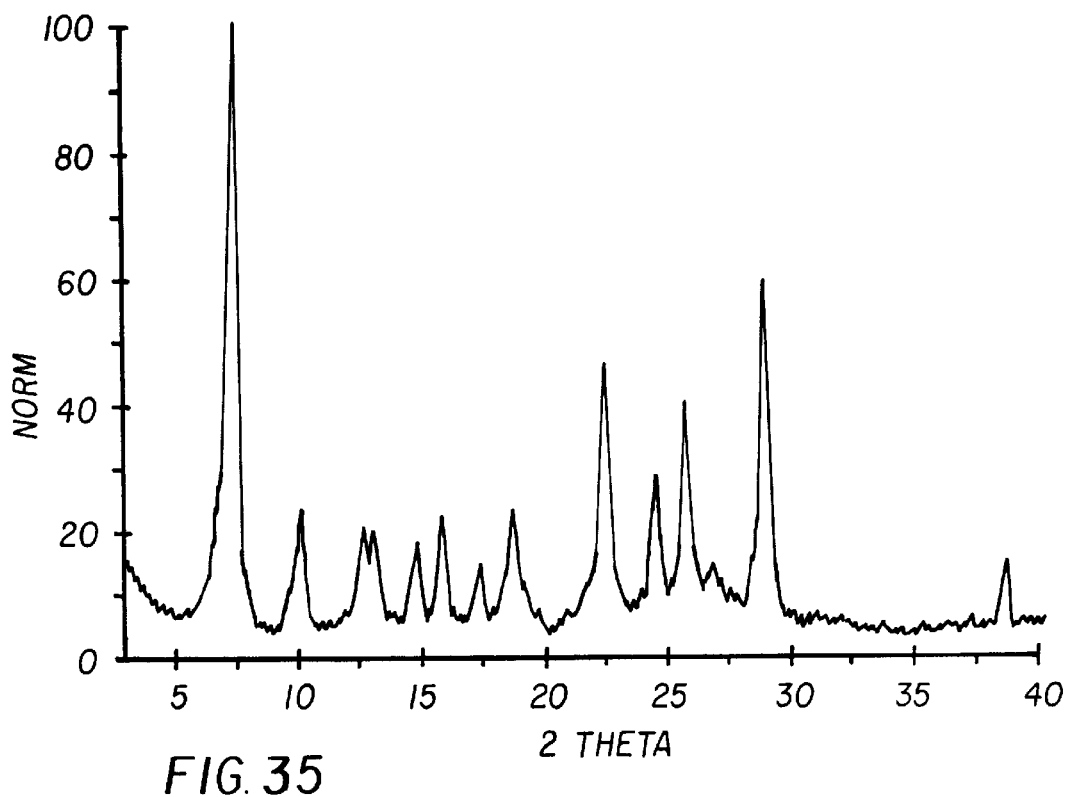

Dichloromethane Treatment of Non-uniformly Substituted Titanyl Fluorophthalocyanine: 50% Fluorophthalonitrile The procedure of Example 11 was used. The x-ray diffraction spectrum (FIG. 35) exhibits major peaks of the Bragg angle at 7.3°, 10.0°, 12.6°, 13.1°, 14.8°, 15.8°, 17.3°, 18.5°, 22.3°, 24.3°, 25.5°, and 28.7° (all ±0.2°).

EXAMPLE 16

Figure 36:
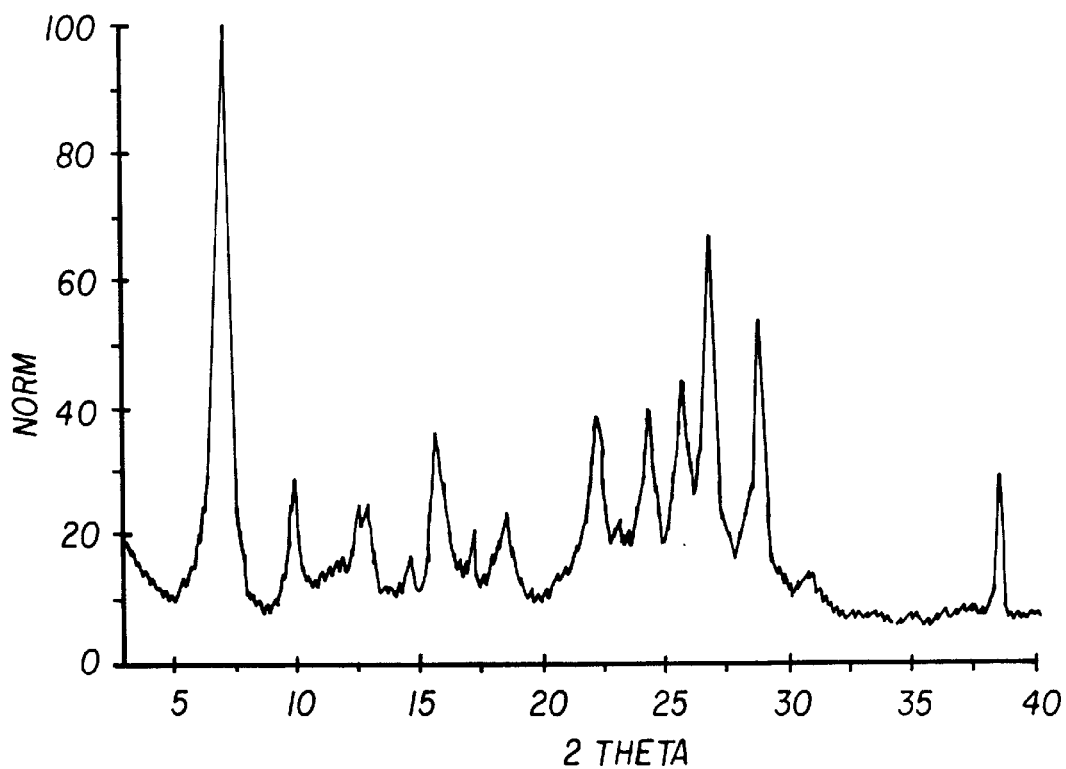

Dichloromethane Treatment of Non-uniformly Substituted Titanyl Fluorophthalocyanine: 55% Fluorophthalonitrile The procedure of Example 11 was used. The x-ray diffraction spectrum (FIG. 36) exhibits major peaks of the Bragg angle at 7.4°, 10.1°, 12.7°, 13.2°, 14.9°, 15.9°, 17.4°, 18.6°, 22.4°, 24.4°, and 28.8° (all ±0.2°).

EXAMPLE 17

Figure 37:
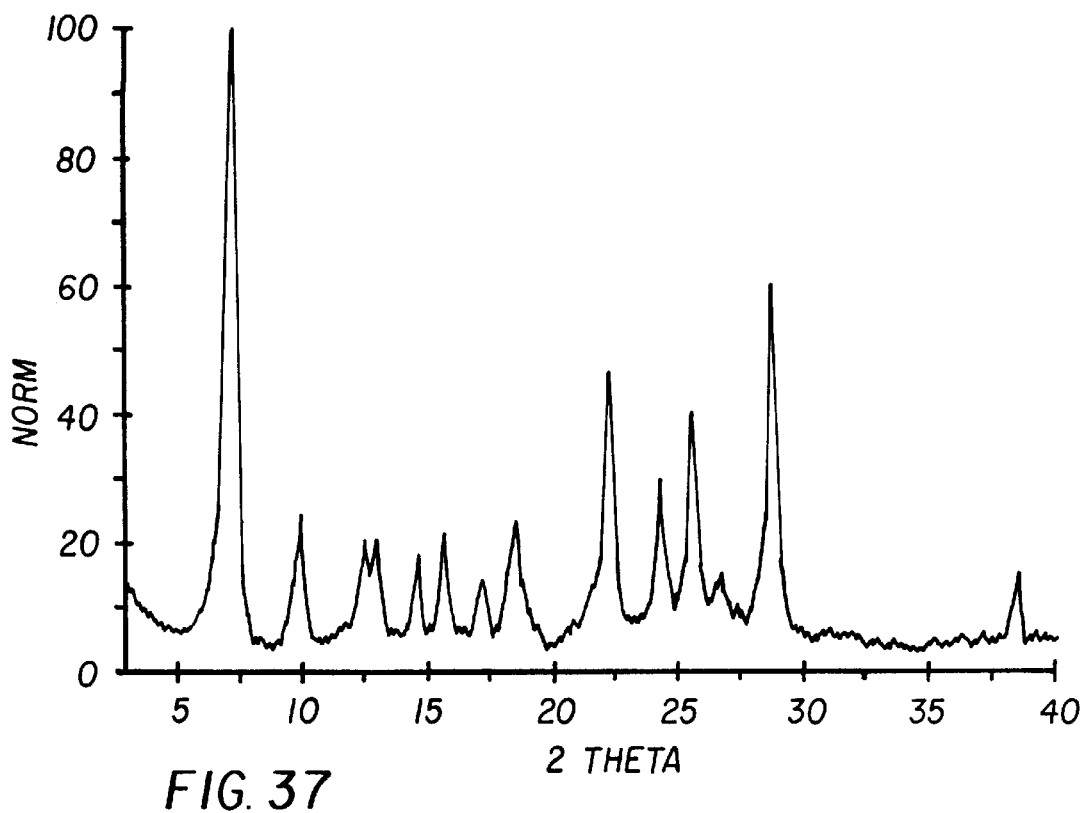

Dichloromethane Treatment of Non-uniformly Substituted Titanyl Fluorophthalocyanine: 60% Fluorophthalonitrile The procedure of Example 11 was used. The x-ray diffraction spectrum (FIG. 37) exhibits major peaks of the Bragg angle at 7.4°, 10.1°, 12.0°, 12.7°, 13.2°, 14.9°, 15.9°, 17.4°, 18.7°, 19.3°, 21.0°, 22.4°, 24.4°, 25.6°, 26.8°, 27.5°, and 28.8° (all ±0.2°).

EXAMPLE 18

Figure 38:
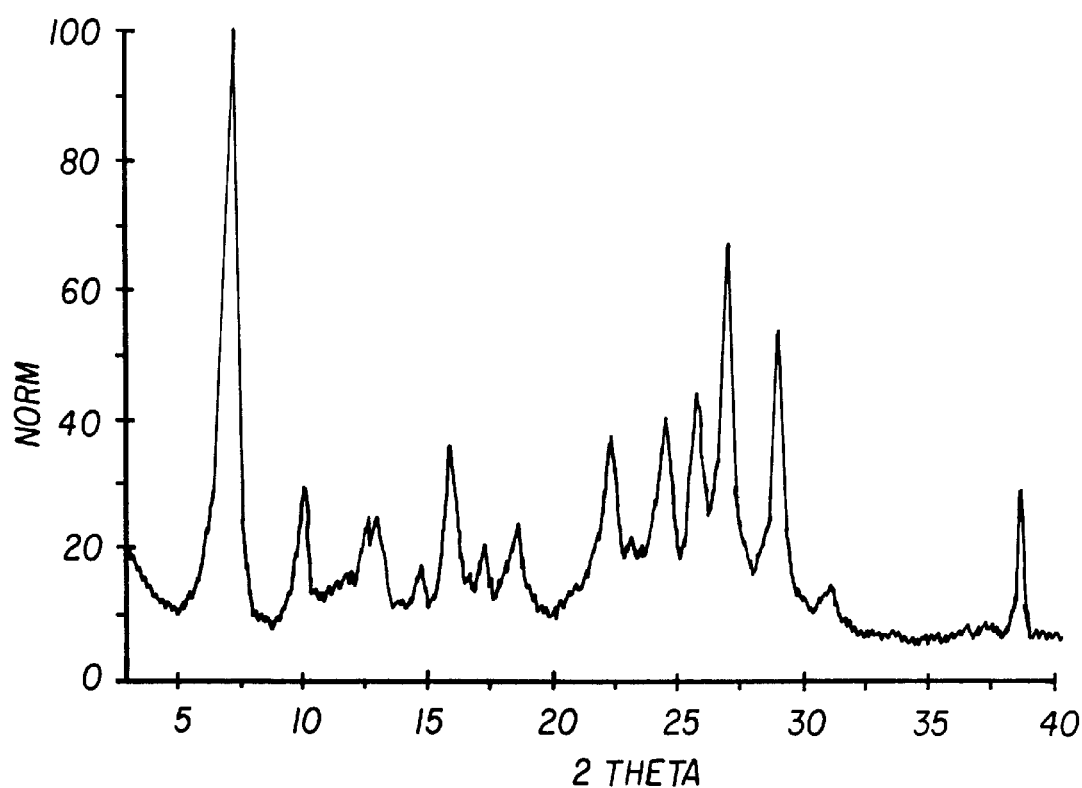

Dichloromethane Treatment of Non-uniformly Substituted Titanyl Fluorophthalocyanine: 65% Fluorophthalonitrile The procedure of Example 11 was used. The x-ray diffraction spectrum (FIG. 38) exhibits major peaks of the Bragg angle at 7.4°, 10.1°, 12.7°, 13.0°, 15.8°, 17.3°, 18.6°, 22.3°, 24.4°, 25.6°, 26.8°, and 28.8° (all ±0.2°).

EXAMPLE 19

Figure 39:
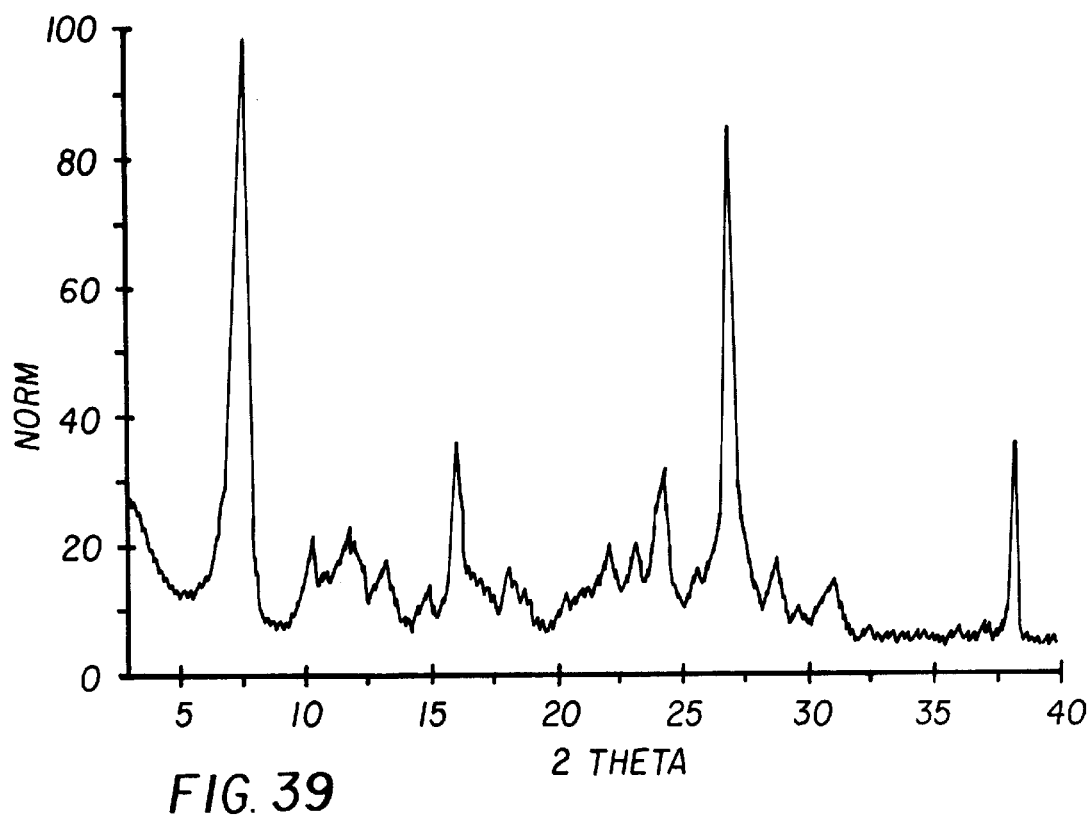

Dichloromethane Treatment of Non-uniformly Substituted Titanyl Fluorophthalocyanine: 75% Fluorophthalonitrile The procedure of Example 11 was used. The x-ray diffraction spectrum (FIG. 39) exhibits major peaks of the Bragg angle at 7.4°, 10.1°, 10.7°, 11.5°, 11.9°, 13.0°, 14.8°, 15.9°, 18.2°, 18.6°, 22.2°, 23.2°, 24.3°, 26.9°, 28.9°, and 31.2° (all ±0.2°)

The x-ray data of Examples 11 through 19 show that the unique highly crystalline product structure (where the presence of titanyl fluorophthalocyanine is not manifested in the spectrum) of this invention is obtained for the 25%, 30%, 40% 45%, 50%, 55%, and 60% phthalonitrile moieties. At phthalonitrile concentration higher than 60%, a mixed crystal is obtained showing the presence of both unsubstituted titanyl phthalocyanine as well as titanyl fluorophthalocyanine.

EXAMPLE 20

Figure 40:
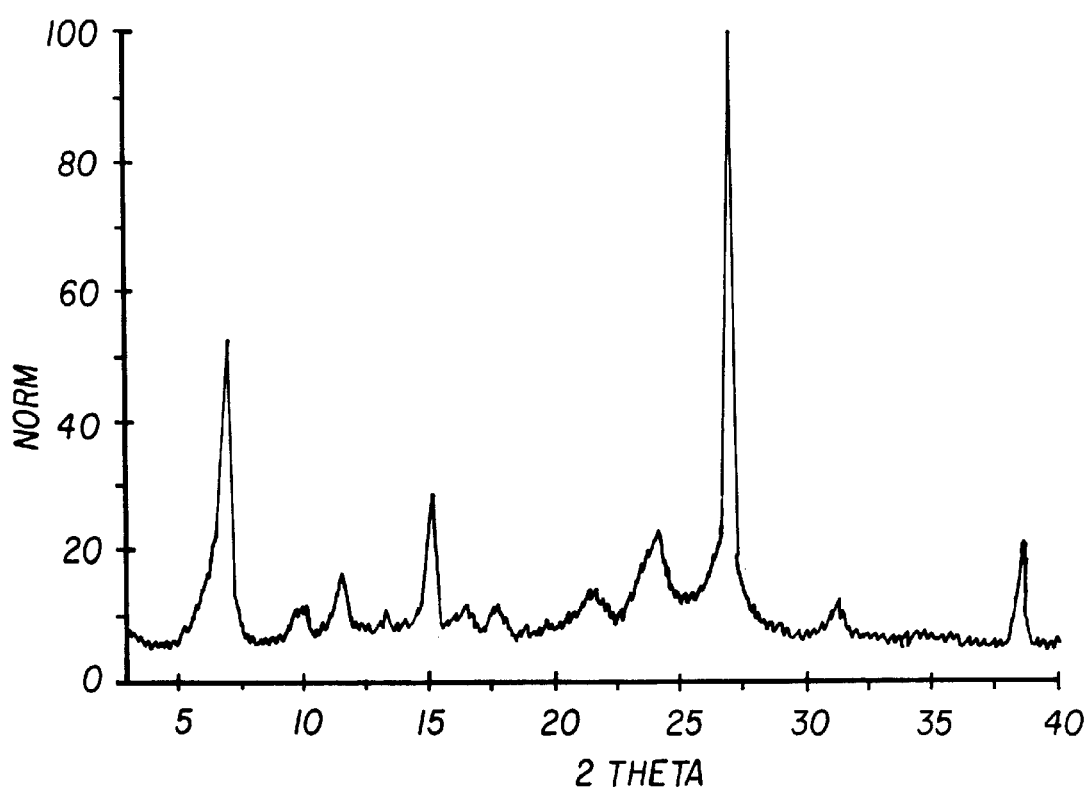

Dichloromethane Treatment of Non-uniformly Substituted Titanyl Fluoro/Chlorophthalocyanine: 50/50 Molar Ratio The procedure of Example 11 was used. The x-ray diffraction spectrum (FIG. 40) exhibits major peaks of the Bragg angle at 6.4°, 9.1°, 14.5°, 24°, and 25.6° (all ±0.2°).

Comparative Example 5

Figure 41:
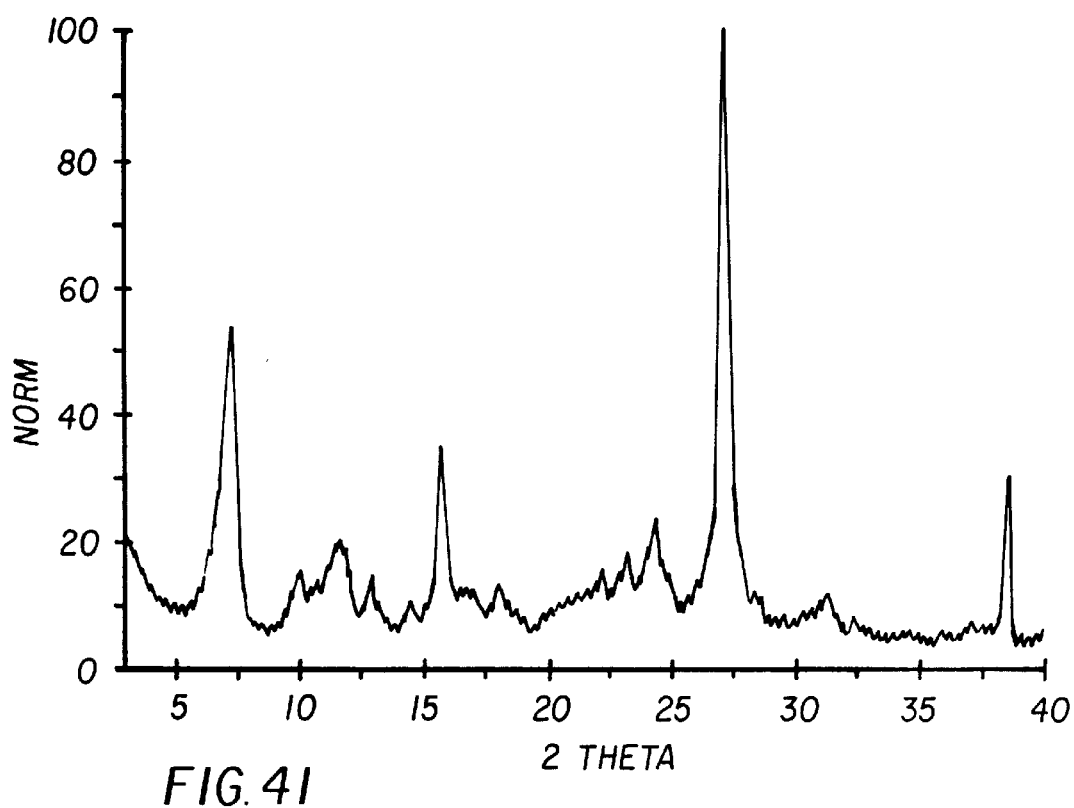
FIGS. 41–44: COMPARATIVE EXAMPLES 5–8, respectively.

Dichloromethane Treatment of Dry-milled Uniformly Substituted Titanyl Fluorophthalocyanine Five grams of the product of Comparative Example 1 were treated with dichloromethane according to the procedures of Examples 1–9. The x-ray diffraction spectrum (FIG. 41) exhibits major peaks of the Bragg angle at 7.3°, 10.1°, 11.7°, 12.9°, 15.8°, 18.2°, 22.2°, 23.2°, 24.4°, 27.1°, and 31.3° (all ±0.2°). This x-ray spectrum is that of the pure uniformly substituted titanyl fluorophthalocyanine dry-milled, and treated with an organic solvent with an hydrogen bonding parameter $\gamma_c$ smaller than 9.0. It is very different from the highly crystalline product structure of this invention (Examples 11, 12, 13, 14, 15, and 16); also there is no indication of the peaks characteristic of unsubstituted phthalocyanine dry-milled and treated with an organic solvent with an hydrogen bonding parameter $\gamma_c$ smaller than 9.0 (Examples 17, 18, and 19).

Comparative Example 6

Dichloromethane Treatment of Dry-milled Titanyl Phthalocyanine

Figure 42:
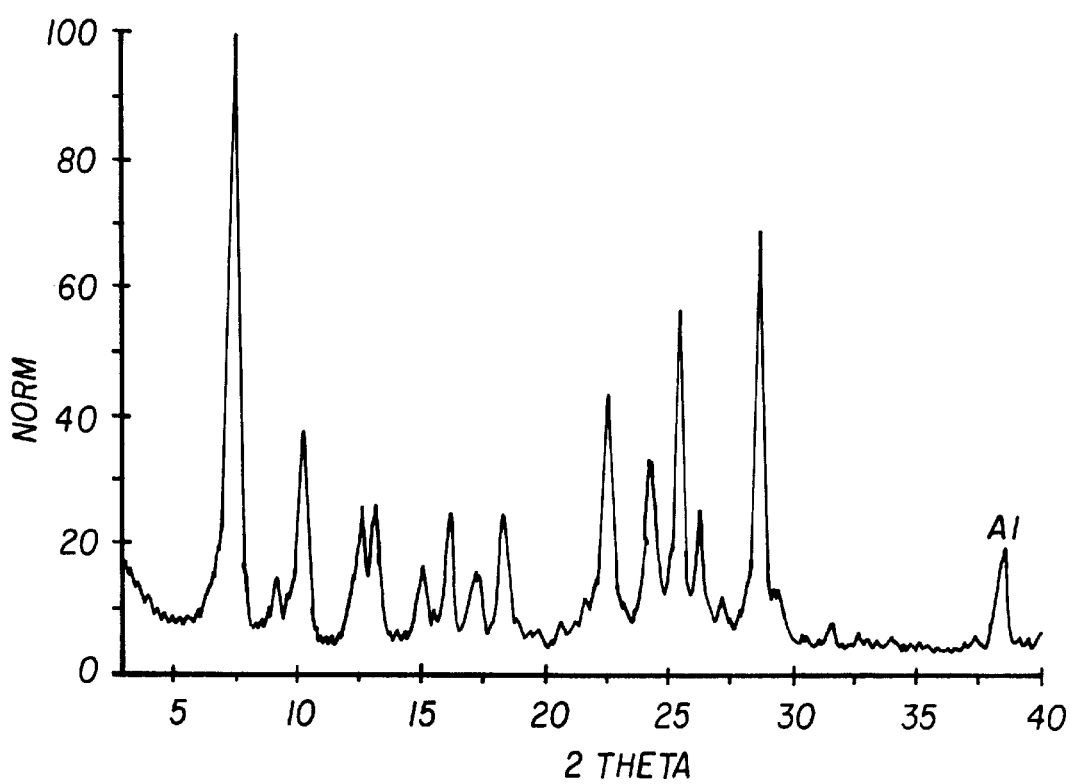

Five grams of the sample of Comparative Example 2 were treated with dichloromethane according to the procedure of Examples 1–9. The x-ray diffraction spectrum (FIG. 42) exhibits major peaks of the Bragg angle at 7.6°, 9.3°, 10.3°, 12.6°, 13.2°, 15.1°, 16.2°, 17.3°, 18.4°, 21.7°, 22.6°, 24.2°, 25.4°, 26.2°, 28.6°, and 29.4° (all ±0.2°)

Comparative Example 7

Figure 43:
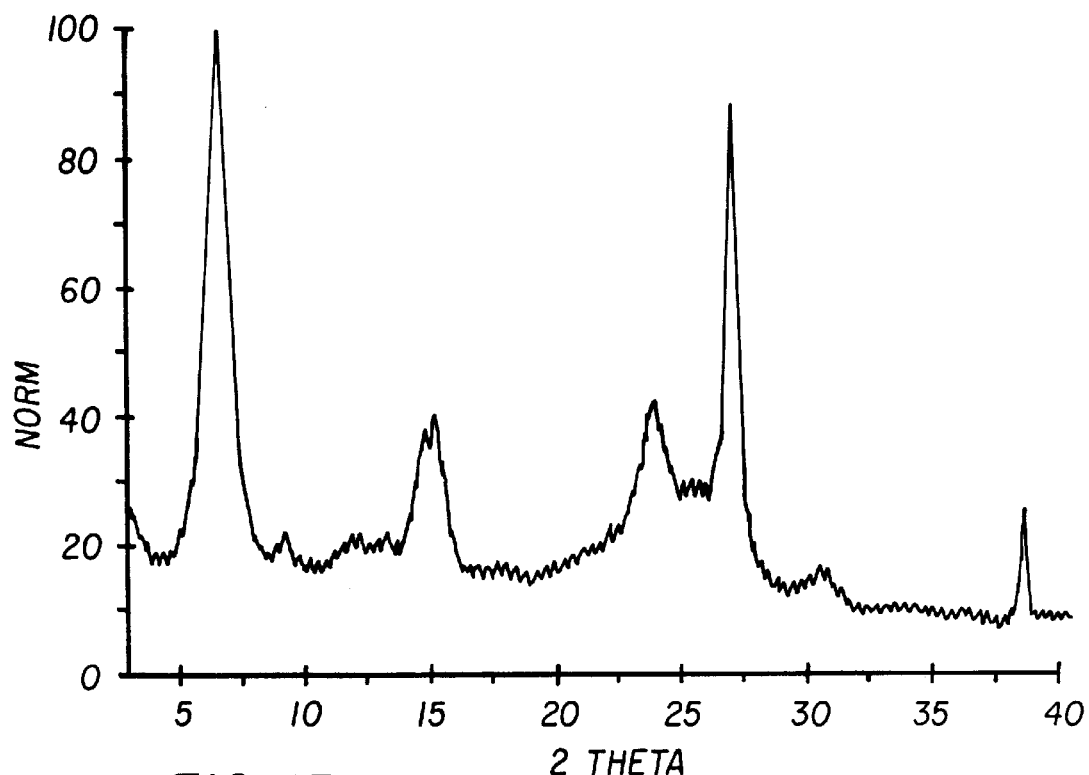

Dichloromethane Treatment of Mixed Titanyl Fluoro/Methyl Phthalocyanine 50:50 Molar Ratio The product of Comparative Example 3 was treated the same way as in Examples 1–9. X-ray diffraction patterns are shown in FIG. 43. The peaks are very broad, and are identical to the peaks of the crude material spectrum. This suggests the presence of a material more amorphous than crystalline. This differs from non-uniformly substituted materials of the invention.

Comparative Example 8

Figure 44:
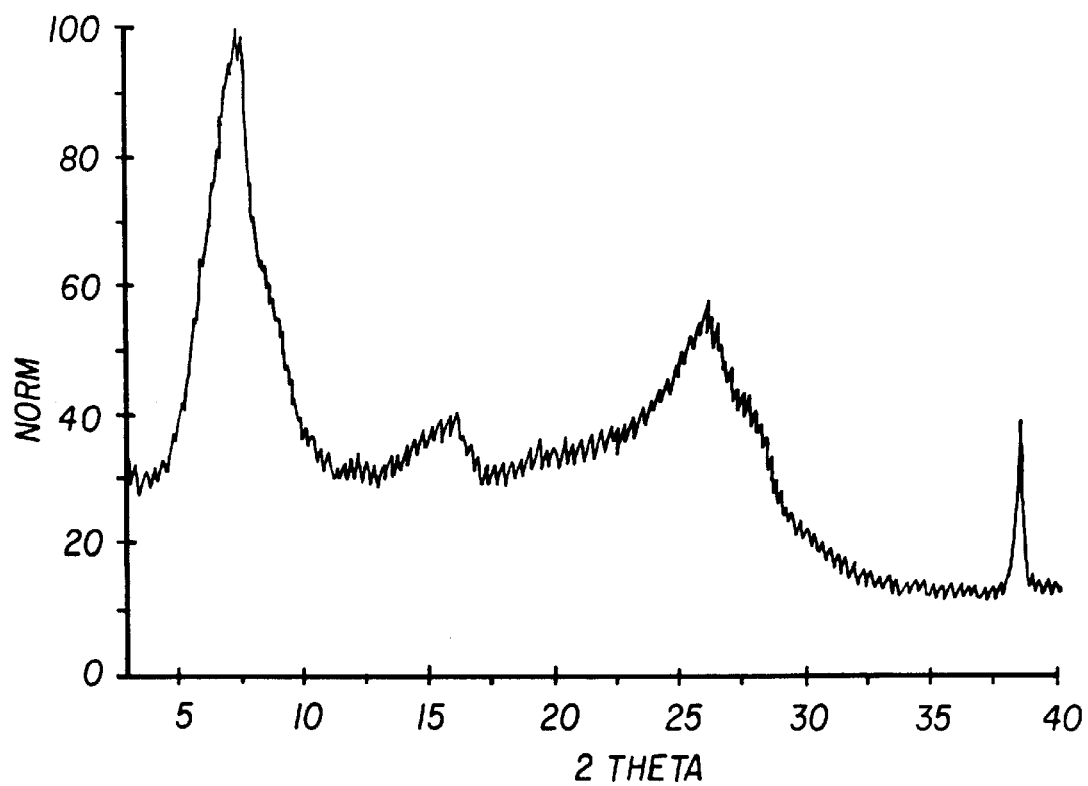

Dichloromethane Treatment of Non-uniformly Substituted Titanyl Methyl Phthalocyanine 50:50 Molar Ratio The product of Comparative Example 4 was treated the same way as in Examples 1–9. X-ray diffraction spectrum is shown in FIG. 44. The peaks are very broad, and are identical to the peaks of the crude material spectrum. This suggests the presence of a material more amorphous than crystalline. This differs from the non-uniformly substituted materials of the invention.

EXAMPLE 21

Figure 45:
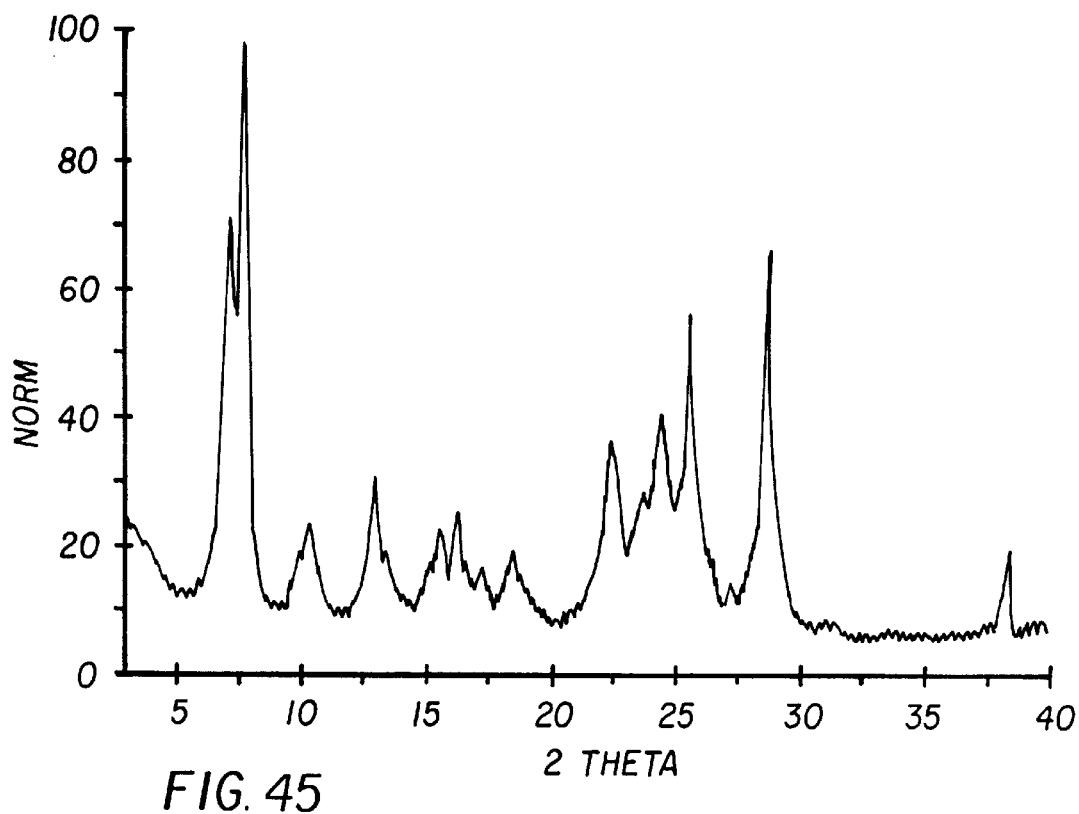
FIGS. 45–47: EXAMPLES 21–23, respectively.

Methanol Treatment of Non-uniformly Substituted Titanyl Fluorophthalocyanine: 25% Fluorophthalonitrile Four grams of Example 1 were mixed with half the original stainless steel beads and about 200 grams of methanol, put back on the Sweco mill for 24 hours. The beads were then filtered off, and the pigment samples isolated. The x-ray diffraction spectrum (FIG. 45) exhibits major peaks of the Bragg angle at 6.9°, 7.4°, 9.7°, 10.1°, 12.6°, 13.2°, 15.0°, 15.4°, 10.1°, 17.2°, 18.4°, 22.4°, 23.7°, 24.4°, 25.5°, 27.3°, and 28.7° (all ±0.2°)

EXAMPLE 22

Figure 46:
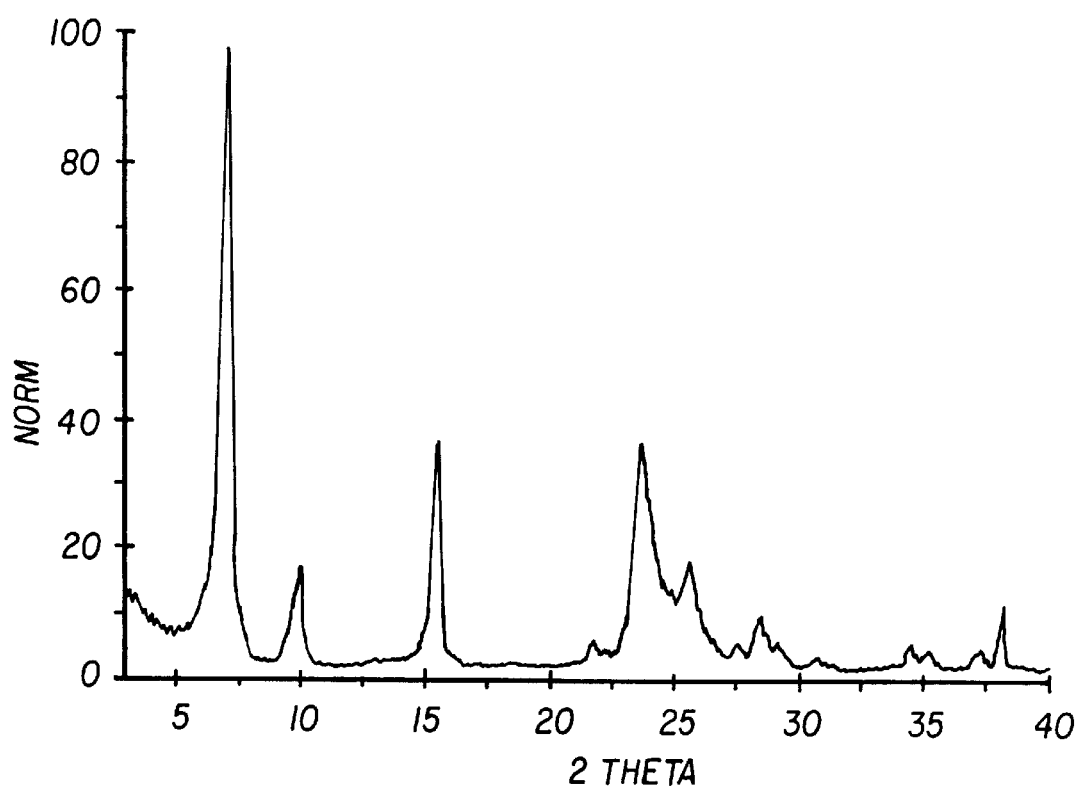

Methanol Treatment of Non-uniformly Substituted Titanyl Fluorophthalocyanine: 50% Fluorophthalonitrile Four grams of the product of Example 5 were mixed with half the original stainless steel beads and about 200 grams of methanol, put back on the Sweco mill for 24 hours. The beads were then filtered off, and the pigment samples isolated. The x-ray diffraction spectrum (FIG. 46) exhibits major peaks of the Bragg angle at 6.9°, 9.7°, 15.3°, 23.6°, 25.6°, and 28.5° (all ±0.2°).

EXAMPLE 23

Figure 47:
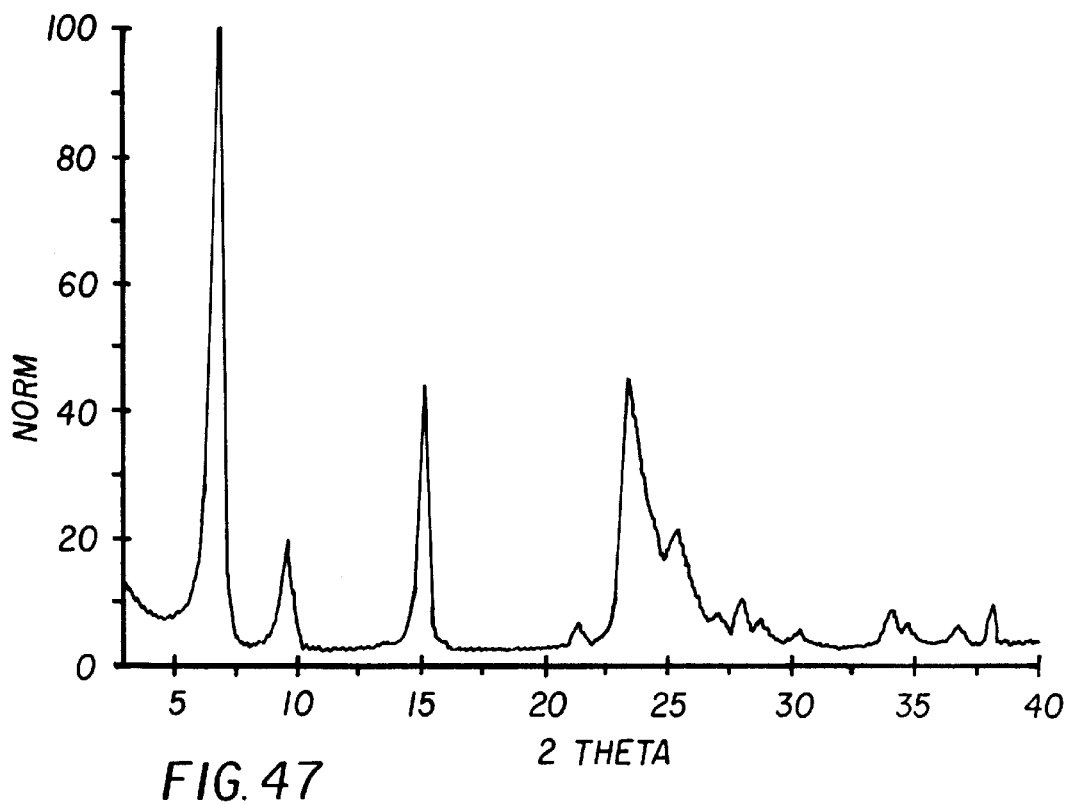

Methanol Treatment of Non-uniformly Substituted Titanyl Fluorophthalocyanine: 75% Fluorophthalonitrile Four grams of the product of Example 9 were mixed with half the original stainless steel beads and about 200 grams of methanol, put back on the Sweco mill for 24 hours. The beads were then filtered off, and the pigment samples isolated. The x-ray diffraction spectrum (FIG. 47) exhibits major peaks of the Bragg angle at 6.9°, 9.7°, 15.3°, 23.6°, 25.6°, 28.3°, and 34.5° (all ±0.2°).

Comparative Example 9

Figure 48:
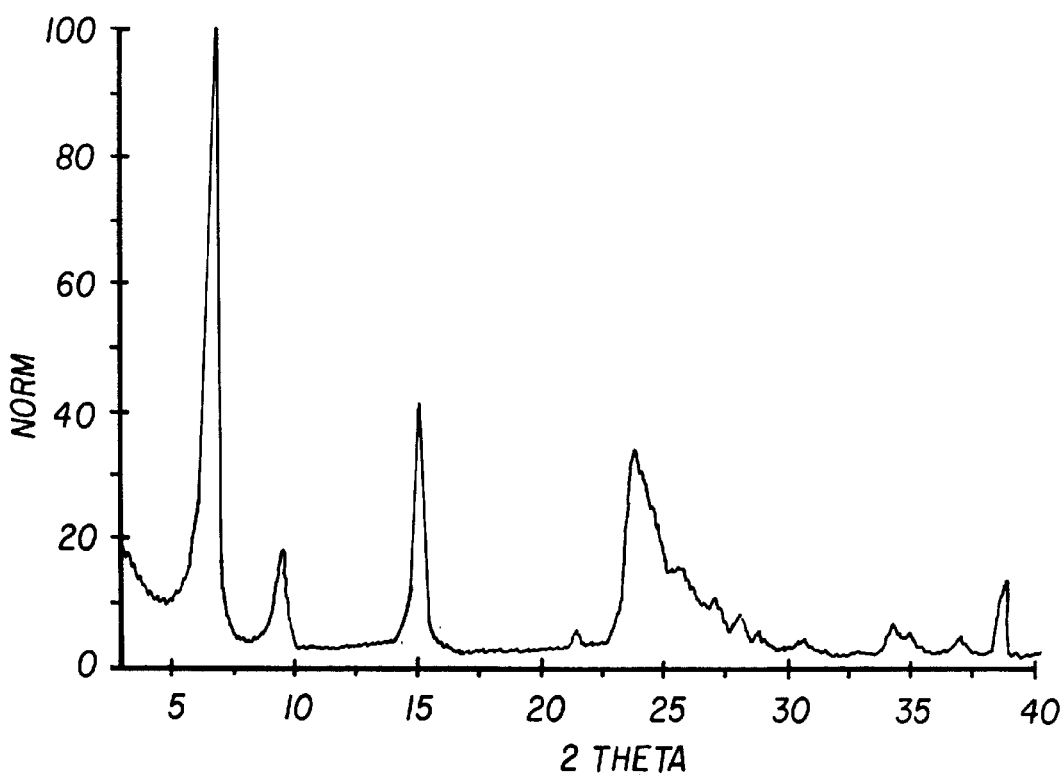
FIGS. 48–49: COMPARATIVE EXAMPLES 9–10, respectively.

Methanol Treatment of Dry-milled Uniformly Substituted Titanyl Fluorophthalocyanine: 100% Fluorophthalonitrile Five grams of the sample of Comparative Example 1 were treated with methanol according to the procedure of Example 1–9. The x-ray diffraction spectrum (FIG. 48) exhibits major peaks of the Bragg angle at 6.8°, 9.5°, 15.1°, 23.7°, 25.7°, 28.1°, and 34.2° (all ±0.2°)

Comparative Example 10

Methanol Treatment of Dry-milled Titanyl Phthalocyanine

Figure 49:
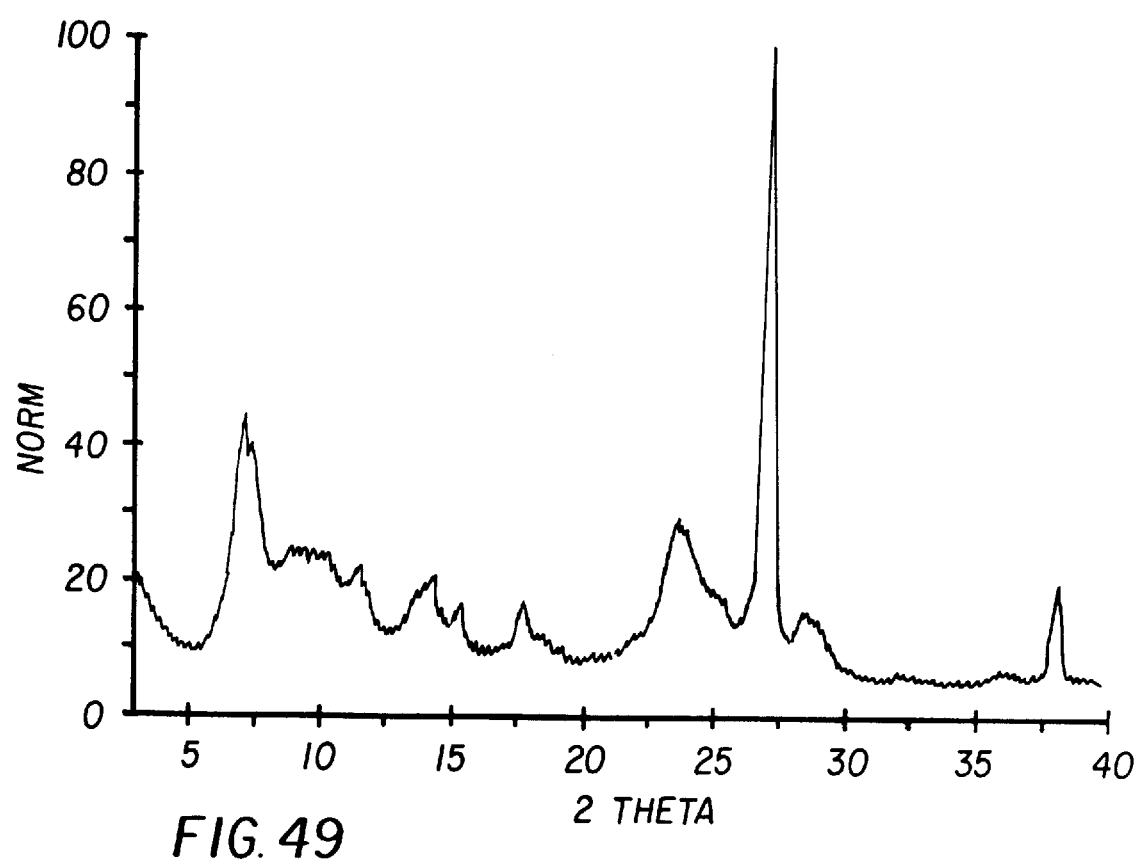

Five grams of the pigment of Comparative Example 2 were treated with methanol according to the procedure of Examples 1–9. The X-Ray diffraction spectrum is shown in FIG. 49.

EXAMPLES 24–32

Electrophotographic Elements

Electrophotographic elements were then prepared using, as a support, 175 micron thick conductive support comprising a thin layer of nickel on poly (ethylene terephtalate) substrate. The film was, as indicated below, prepared using a hopper coating machine. The bare film was first undercoated with a barrier layer of a polyamide resin marketed by Toray Chemical Inc. of Japan as Amilan CM8000, (2% weight/weight solution) in ethanol solvent with the hopper coating machine set at an application rate of 0.05 grams (dry)/ft$^2$.

For each of the pigments of Examples 1–9, a sample (2.04 grams) was individually mixed with a polycarbonate polymer sold by General Electric under the trade name Lexan 145 (0.51 grams), 2 mm diameter stainless steel shots (58.5 grams), dichloromethane (58.5 grams) in a 6 ounce jar, and milled in a Sweco Vibro Energy grinding mill manufactured by Sweco, Inc. of Florence, Ky., for three days. The steel shot was then removed and rinsed with 58.5 grams of dichloromethane, which was added back into the pigment dispersion.

The resulting pigment dispersion was added to a dispersion of Lexan 145 (1.04 grams), 1,1-bis{di-4-tolylaminophenyl}-3-phenylpropane (0.49 grams), 1,1,2,-trichloroethane (24.57 grams), dichloromethane (18.8 grams), and 0.06 g of a siloxane surfactant sold under the trademark DC-510, by Dow Corning, USA. The resulting dispersion was filtered through an 8 micrometer filter and coated onto the undercoated film using the hopper coating machine operated at 0.05 grams(dry)/ft$^2$ to form a charge generation layer (CGL).

The CGL was overcoated using the hopper coating machine at 2.3 grams(dry)/ft$^2$) with a solution of polyester formed from 4,4'(2-norbornylidene) diphenol and a 40/60 molar ratio of terephthalic/azelaic acids (10 parts by weight), a polycarbonate sold by the Mobay Company under the trade name Makrolon (40 parts by weight), 1,1-bis{di-4-tolylaminophenyl}-3-phenylpropane (50 parts by weight), dissolved in dichloromethane (70 parts), and 1,1,2, trichloromethane (30 parts).

The resulting electrophotographic elements were then evaluated as follows. Red and near infrared photosensitivity was determined by electrostatically corona-charging the electrophotographic element to an initial potential of −700 volts and exposing the element to filtered light (narrow band pass) at a wavelength of 775 nm from a xenon flash lamp (160 microsecond flashes), in an amount sufficient to photoconductively discharge the initial potential down to a level of −350 volts. Photosensitivity (also referred to as photographic speed) was measured in terms of the amount of incident actinic radiant energy (expressed in ergs/cm$^2$) needed to discharge the initial voltage down to the desired level of −350 volts. The lower the amount of radiation needed to achieve the desired degree of discharge, the higher is the photosensitivity of the element. Dark decay was determined by letting an unexposed area of the film spontaneously discharge in the dark for seven seconds. The dark decay was calculated by dividing the amount of dark discharge (after seven seconds) by seven. Results appear in Table 2.

Comparative Examples 11–14

Comparative Electrophotoaraphic Elements

The procedures of Examples 24–32 were followed, using crude uniformly-substituted titanyl fluorophthalocyanine, unsubstituted titanyl phthalocyanine, non-uniformly substituted titanyl fluoro methylphthalocyanine, and non-uniformly substituted methylphthalocyanine, in Comparative Examples 11–14, respectively. The results are shown in Table 2.

EXAMPLES 33–41

Electrophotoaraphic Elements

The procedures of Examples 24–32 were followed, using the pigments of Examples 11–19, in Examples 33–41, respectively. The results are shown on Table 3.

Comparative Examples 15–18

Comparative Electrophotographic Elements

The procedures of Examples 24–32 were followed, using crude uniformly-substituted titanyl fluorophthalocyanine, unsubstituted titanyl phthalocyanine, non-uniformly substituted titanyl fluoro methylphthalocyanine, and non-uniformly substituted methylphthalocyanine, in Comparative Examples 15–18, respectively. The results are shown in Table 3.

Comparative Examples 19–21

Comparative Electrophotoaraphic Elements

The procedures of Examples 24–32 were followed, using the pigment of examples 9–11, in Comparative Examples, 19–21, respectively. The results are shown on Table 3.

TABLE 2

| Example or Comp. Ex. | Unsubstituted phthalonitrile/ substituted phthalonitrile (wt %/wt %) | Speed: 700 to 350 volts (ergs/cm$^2$) | Dark decay (volts/sec) |
| --- | --- | --- | --- |
| Comp. Ex. 11 | 0% unsubstituted/ 100% 4-fluoro | 6.9 | 1.4 |
| Comp. Ex. 12 | 100% unsubstituted | — | — |
| Comp. Ex. 13 | 50% fluoro/ 50% methyl | 28.2 | 19.3 |
| Comp. Ex. 14 | 50% unsubsituted/ 50% methyl | >1000 | 4.3 |
| Example 24 | 75% unsubstituted/ 25% 4-fluoro | 1.9 | 10.4 |
| Example 25 | 70% unsubstituted/ 30% 4-fluoro | 1.6 | 10 |
| Example 26 | 60% unsubstituted/ 40% 4-fluoro | 1.3 | 17.1 |
| Example 27 | 55% unsubstituted/ 45% 4-fluoro | 1 | 25 |
| Example 28 | 50% unsubstituted/ 50% 4-fluoro | 1 | 28 |
| Example 29 | 45% unsubstituted/ 55% 4-fluoro | 1.2 | 22.9 |
| Example 30 | 40% unsubstituted/ 60% 4-fluoro | 1.1 | 17.7 |
| Example 31 | 35% unsubstituted/ 65% 4-fluoro | 1.2 | 13.6 |
| Example 32 | 25% unsubstituted/ 75% 4-fluoro | 1.5 | 10 |

TABLE 3

| Example or Comp. Ex | Unsubstituted phthalonitrile/ substituted phthalonitrile (wt % /wt %) | Treatment solvent | Speed: 700 to 350 volts (ergs/cm²) | Dark decay (volts/sec) |
| --- | --- | --- | --- | --- |
| Comp Ex. 15 | 0% unsubstituted/ 100% 4-fluoro | dichloromethane | 2.5 | 2.9 |
| Comp Ex. 16 | 100% unsubstituted | dichloromethane | 3.2 | 5 |
| Comp. Ex 17 | 50% fluoro/ 50% methyl | dichloromethane | 12 | 8.6 |
| Comp. Ex 18 | 50% unsubsituted/ 50% methyl | dichloromethane | >1000 | 10.7 |
| Comp. Ex 19 | 75% unsubstituted/ 25% 4-fluoro | methanol | 2.2 | 20.7 |
| Comp. Ex 20 | 50% unsubstituted/ 50% 4-fluoro | methanol | 14.1 | 32 |
| Comp. Ex 21 | 25% unsubstituted/ 75% 4-fluoro | methanol | 25.1 | 14.3 |
| Example 33 | 75% unsubstituted/ 25% 4-fluoro | dichloromethane | 1.6 | 5 |
| Example 34 | 70% unsubstituted/ 30% 4-fluoro | dichloromethane | 1.4 | 5.7 |
| Example 35 | 60% unsubstituted/ 40% 4-fluoro | dichloromethane | 1.3 | 7.1 |
| Example 36 | 55% unsubstituted/ 45% 4-fluoro | dichloromethane | 1.4 | 6.4 |
| Example 37 | 50% unsubstituted/ 50% 4-fluoro | dichloromethane | 1.5 | 5.4 |
| Example 38 | 45% unsubstituted/ 55% 4-fluoro | dichloromethane | 1.6 | 5 |
| Example 39 | 40% unsubstituted/ 60% 4-fluoro | dichloromethane | 1.8 | 2.9 |
| Example 40 | 35% unsubstituted/ 65% 4-fluoro | dichloromethane | 1.6 | 4.3 |
| Example 41 | 25% unsubstituted/ 75% 4-fluoro | dichloromethane | 1.7 | 3.4 |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims.

What is claimed is:

1. A method for preparing a phthalocyanine composition comprising the steps of:

synthesizing a crystalline product comprising a mixture of phthalocyanines including:

a first phthalocyanine having the general formula $Z(A)_4$ a second phthalocyanine having the general formula $(A)_3ZB$ a third phthalocyanine having the general formula $(A)_2Z(B)_2$ a fourth phthalocyanine having the general formula $AZ(B)_3$ and a fifth phthalocyanine having the general formula $Z(B)_4$ wherein:

each Z, in the above formulas, represents a member selected from the group consisting of moieties having the general stucture:

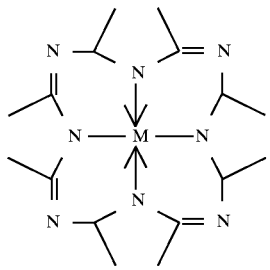

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;

each A, in the above formulas, is the same and represents a member selected from the group consisting of moieties having the general stucture:

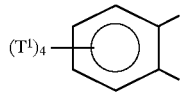

wherein each $T^1$ is independently selected from the group consisting of H and F; and each B, in the above formulas, is the same and represents a member selected from the group consisting of moieties having the general structure:

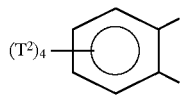

wherein each $T^2$ is independently selected from the group consisting of H and F;

preselecting A and B for said first, second, third, fourth, and fifth phthalocyanines such that:

A and B are differently substituted, the $T^1$ and $T^2$ moieties of A and B together collectively include H and F;

increasing the amorphousness of said mixture of phthalocyanines as determined by X-ray crystallography using X-radiation characteristic of Cu Kα at a wavelength of 1.541 Å of the Bragg angle 2θ to provide an amorphous pigment mixture;

contacting said amorphous pigment mixture with organic solvent having a gamma$_c$ hydrogen bonding parameter of less than 8.0; and prior to said contacting, substantially excluding said amorphous pigment mixture from contact with organic solvent having a gamma$_c$ hydrogen bonding parameter greater than 9.0.

2. A method for preparing a phthalocyanine composition comprising the steps of:

synthesizing a mixture comprising:

a first phthalocyanine having the general formula $Z(A)_4$ a second phthalocyanine having the general formula (A)$_3$ZB a third phthalocyanine having the general formula (A)$_2$Z(B)$_2$ a fourth phthalocyanine having the general formula

AZ(B)$_3$ and a fifth phthalocyanine having the general formula

Z(B)$_4$ wherein:

each Z, in the above formulas, represents a member selected from the group consisting of moieties having the general structure:

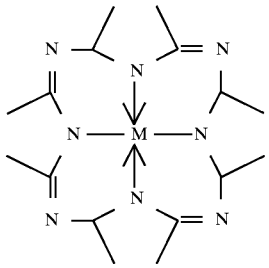

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;

each A, in the above formulas, is the same and represents a member selected from the group consisting of moieties having the general structure:

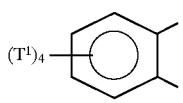

wherein each T$^1$ is independently selected from the group consisting of H and F; and each B, in the above formulas, is the same and represents a member selected from the group consisting of moieties having the general structure:

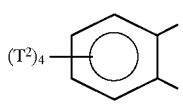

wherein each T$^2$ is independently selected from the group consisting of H and F;

preselecting A and B for said first, second, third, fourth, and fifth phthalocyanines such that:

A and B are differently substituted, the T$^1$ and T$^2$ moieties of A and B together collectively include H and F;

increasing the amorphousness of said mixture of phthalocyanines as determined by X-ray crystallography using X-radiation characteristic of Cu Kα at a wavelength of 1.541 Å of the Bragg angle 2θ to produce an amorphous pigment mixture from said mixture of phthalocyanines contacting said amorphous pigment mixture with organic solvent having a gamma$_c$ hydrogen bonding parameter of less than 8.0 to form a single crystal species; and prior to said contacting, substantially excluding said amorphous pigment mixture from contact with organic solvent having a gamma$_c$ hydrogen bonding parameter greater than 9.0.

3. The method of claim 2 wherein M is selected from the group consisting of TiO, VO, Cu, Zn, Fe, Co, Ni, Ru, Rh, Pd, Pt, Mn, Sn, Al—Cl, Al—Br, In—Cl, In—Br, In—I, SiCl$_2$, SiBr$_2$, SiF$_2$, SnCl$_2$, SnBr2, SnF$_2$, GeCl$_2$, GeBr$_2$, GeF$_2$, Si(OH)$_2$, Ge(OH)$_2$, Ga(O-methyl), Ga—OH, Ga—Cl, and Ga—Br.

4. The method of claim 2 wherein M is TiO.

5. The method of claim 2 wherein said increasing step further comprises milling said pigment mixture under shear conditions.

6. The method of claim 2 wherein said increasing step further comprises milling said pigment mixture under shear conditions in the substantial absence of solvent and in the substantial absence of salt.

7. The method of claim 2 wherein said phthalocyanine composition has a first intensity peak at 7.5°±0.2° with respect to X-rays characteristic of Cu Kα at a wavelength of 1.541 Å of the Bragg angle 2θ, a second intensity peak at 15.9°±0.2° and a third intensity peak at 25.6°±0.2°.

8. The method of claim 2 wherein said phthalocyanine composition exhibits peaks of the Bragg angle 2θ with respect to x-rays of Cu Kα at a wavelength of 1.541 Å at 7.5°, 10.1°, 12.7°, 13.2°, 14.9°, 15.9°, 17.4°, 18.6°, 22.4°, 25.6°, and 28.8°, (all ±0.2°).

9. A composition of matter comprising a mixture of phthalocyanines synthesized together and crystallized as a single crystal species, said mixture of phthalocyanines including:

a first phthalocyanine having the general formula

Z(A)$_4$ a second phthalocyanine having the general formula (A)$_3$ZB a third phthalocyanine having the general formula (A)$_2$Z(B)$_2$ a fourth phthalocyanine having the general formula

AZ(B)$_3$ and a fifth phthalocyanine having the general formula

Z(B)$_4$ wherein:

each Z, in the above formulas, represents a member selected from the group consisting of moieties having the general structure:

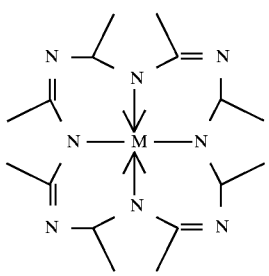

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;

each A, in the above formulas, is the same and represents a member selected from the group consisting of moieties having the general structure:

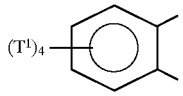

wherein each $T^1$ is independently selected from the group consisting of H and F; and each B, in the above formulas, is the same and represents a member selected from the group consisting of moieties having the general structure:

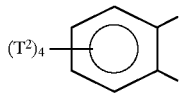

wherein each $T^2$ is independently selected from the group consisting of H and F; and A and B, in the above formulas, are differently substituted, and the $T^1$ and $T^2$ moieties of A and B together collectively include H and F;

and wherein said phthalocyanine composition exhibits peaks of the Bragg angle 2θ with respect to x-rays of Cu Kα at a wavelength of 1.541 Å at 7.5°, 10.1°, 12.7°, 13.2°, 14.9°, 15.9°, 17.4°, 18.6°, 22.4°, 25.6°, and 28.8°, (all ±0.2°).

10. A composition of matter comprising a mixture of phthalocyanines synthesized together; increased in amorphousness as determined by X-ray crystallography using X-radiation characteristic of Cu Kα at a wavelength of 1.541 Å of the Bragg angle 2θ; contacted with organic solvent having a gamma$_c$ hydrogen bonding parameter of less than 8.0; prior to said contacting, substantially excluded from contact with organic solvent having a gamma$_c$ hydrogen bonding parameter greater than 9.0; and crystallized as a single crystal species, said mixture of phthalocyanines including:

a first phthalocyanine having the general formula $Z(A)_4$ a second phthalocyanine having the general formula $(A)_3ZB$ a third phthalocyanine having the general formula $(A)_2Z(B)_2$ a fourth phthalocyanine having the general formula $AZ(B)_3$ and a fifth phthalocyanine having the general formula $Z(B)_4$ wherein:

each Z, in the above formulas, represents a member selected from the group consisting of moieties having the general structure:

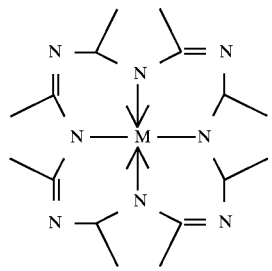

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;

each A, in the above formulas, is the same and represents a member selected from the group consisting of moieties having the general structure:

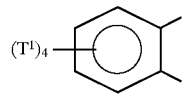

wherein each $T^1$ is independently selected from the group consisting of H and F; and each B, in the above formulas, is the same and represents a member selected from the group consisting of moieties having the general structure:

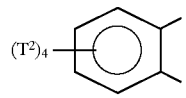

wherein each $T^2$ is independently selected from the group consisting of H and F; and A and B, in the above formulas, are differently substituted, and the $T^1$ and $T^2$ moieties of A and B together collectively include H and F.

11. The composition of matter of claim 10 wherein said mixture is substantially free of salt, acid, and solvent having a gamma$_c$ hydrogen bonding parameter of greater than 9.0.

12. The composition of matter of claim 10 wherein M is TiO.

13. An electrophotographic element comprising:

an electrically conductive layer and a photogenerating layer overlaying said electrically conductive layer, said photogenerating layer including a mixture of phthalocyanines synthesized together; increased in amorphousness as determined by X-ray crystallography using X-radiation characteristic of Cu Kα at a wavelength of 1.541 Å of the Bragg angle 2θ; contacted with organic solvent having a $gamma_c$ hydrogen bonding parameter of less than 8.0; prior to said contacting, substantially excluded from contact with organic solvent having a $gamma_c$ hydrogen bonding parameter greater than 9.0; and crystallized as a single crystal species, said mixture of phthalocyanines including:

a first phthalocyanine having the general formula

a second phthalocyanine having the general formula

a third phthalocyanine having the general formula

a fourth phthalocyanine having the general formula

and a fifth phthalocyanine having the general formula

wherein:

each Z, in the above formulas, represents a member selected from the group consisting of moieties having the general structure:

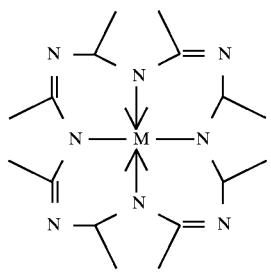

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;

each A, in the above formulas, is the same and represents a member selected from the group consisting of moieties having the general structure:

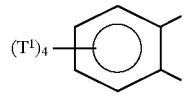

wherein each $T^1$ is independently selected from the group consisting of H and F; and each B, in the above formulas, is the same and represents a member selected from the group consisting of moieties having the general structure:

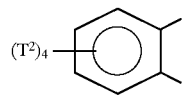

wherein each $T^2$ is independently selected from the group consisting of H and F; and A and B, in the above formulas, are differently substituted, and the $T^1$ and $T^2$ moieties of A and B together collectively include H and F.

14. A method for preparing a phthalocyanine composition comprising the steps of:

synthesizing a crystalline product comprising a mixture of phthalocyanines including:

a first phthalocyanine having the general formula

a second phthalocyanine having the general formula

a third phthalocyanine having the general formula

a fourth phthalocyanine having the general formula

and a fifth phthalocyanine having the general formula

wherein:

each Z, in the above formulas, represents a member selected from the group consisting of moieties having the general structure:

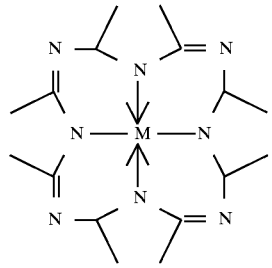

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;

each A, in the above formulas, is the same and represents a member selected from the group consisting of moieties having the general structure:

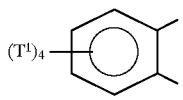

wherein each $T^1$ is independently selected from the group consisting of H, F, Cl, Br, I, and alkyl having from 1 to 18 carbons; and each B, in the above formulas, is the same and represents a member selected from the group consisting of moieties having the general structure:

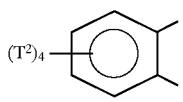

wherein each $T^2$ is independently selected from the group consisting of H, F, Cl, Br, I, and alkyl having from 1 to 18 carbons;

preselecting A and B for said first, second, third, fourth, and fifth phthalocyanines such that:

A and B are differently substituted, the $T^1$ and $T^2$ moieties of A and B together collectively include at least two different members selected from the group consisting of H, F, Cl, Br, I, and alkyl having from 1 to 18 carbons, said members having van der Waal's radii differing by less than about 50 percent of the radius of the smallest member;

increasing the amorphousness of said mixture of phthalocyanines as determined by X-ray crystallography using X-radiation characteristic of Cu Kα at a wavelength of 1.541 Å of the Bragg angle 2θ to provide an amorphous pigment mixture;

contacting said amorphous pigment mixture with organic solvent having a gamma$_c$ hydrogen bonding parameter of less than 8.0; and prior to said contacting, substantially excluding said amorphous pigment mixture from contact with organic solvent having a gamma$_c$ hydrogen bonding parameter greater than 9.0.

15. The method of claim 14 wherein each $T^1$ and $T^2$ substituent is independently selected from the group consisting of H, F, Cl, Br, I, and alkyl having from 1 to 6 carbons.

16. The method of claim 14 wherein M is selected from the group consisting of TiO, VO, Cu, Zn, Fe, Co, Ni, Ru, Rh, Pd, Pt, Mn, Sn, Al—Cl, Al—Br, In—Cl, In—Br, In—I, SiCl$_2$, SiBr$_2$, SiF$_2$, SnCl$_2$, SnBr$_2$, SnF$_2$, GeCl$_2$, GeBr$_2$, GeF$_2$, Si(OH)$_2$, Ge(OH)$_2$, Ga(O-methyl), Ga—OH, Ga—Cl, and Ga—Br.

17. The method of claim 14 wherein M is TiO.

18. The method of claim 14 wherein said increasing step further comprises milling said pigment mixture under shear conditions.

19. The method of claim 14 wherein said increasing step further comprises milling said pigment mixture under shear conditions in the substantial absence of solvent and in the substantial absence of salt.

20. The method of claim 19 wherein said $T^1$ and $T^2$ substituents are selected from the group consisting of Cl and F.

21. The method of claim 14 wherein said $T^1$ and $T^2$ substituents are selected from the group consisting of Cl and F.

22. A composition of matter comprising a mixture of phthalocyanines synthesized together; increased in amorphousness as determined by X-ray crystallography using X-radiation characteristic of Cu Kα at a wavelength of 1.541 Å of the Bragg angle 2θ; contacted with organic solvent having a gamma$_c$ hydrogen bonding parameter of less than 8.0; prior to said contacting, substantially excluded from contact with organic solvent having a gamma$_c$ hydrogen bonding parameter greater than 9.0; and crystallized following said contacting, said mixture of phthalocyanines including:

a first phthalocyanine having the general formula

a second phthalocyanine having the general formula

a third phthalocyanine having the general formula

a fourth phthalocyanine having the general formula

and a fifth phthalocyanine having the general formula

wherein:

each Z, in the above formulas, represents a member selected from the group consisting of moieties having the general structure:

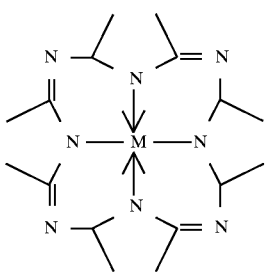

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;

each A, in the above formulas, is the same and represents a member selected from the group consisting of moieties having the general structure:

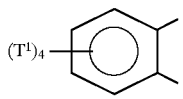

wherein each $T^1$ is independently selected from the group consisting of H, F, Cl, Br, I, and alkyl having from 1 to 18 carbons; and each B, in the above formulas, is the same and represents a member selected from the group consisting of moieties having the general structure:

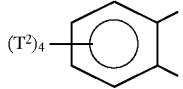

wherein each $T^2$ is independently selected from the group consisting of H, F, Cl, Br, I, and alkyl having from 1 to 18 carbons; and A and B, in the above formulas, are differently substituted, and the $T^1$ and $T^2$ moieties of A and B together collectively include at least two different members selected from the group consisting of H, F, Cl, Br, I, and alkyl having from 1 to 18 carbons, said members having van der Waal's radii differing by less than about 50 percent of the radius of the smallest member.

23. The composition of matter of claim 22 wherein said mixture is substantially free of salt, acid, and solvent having a $gamma_c$ hydrogen bonding parameter of greater than 9.0.

24. The composition of matter of claim 22 wherein M is TiO.

25. An electrophotographic element comprising:
an electrically conductive layer and
a photogenerating layer overlaying said electrically conductive layer, said photogenerating layer including a mixture of phthalocyanines synthesized together; increased in amorphousness as determined by X-ray crystallography using X-radiation characteristic of Cu Kα at a wavelength of 1.541 Å of the Bragg angle 2θ; contacted with organic solvent having a $gamma_c$ hydrogen bonding parameter of less than 8.0; prior to said contacting, substantially excluded from contact with organic solvent having a $gamma_c$ hydrogen bonding parameter greater than 9.0; and crystallized following said contacting, said mixture of phthalocyanines including:
a first phthalocyanine having the general formula $Z(A)_4$ a second phthalocyanine having the general formula $(A)_3 ZB$ a third phthalocyanine having the general formula $(A)_2 Z(B)_2$ a fourth phthalocyanine having the general formula $AZ(B)_3$ and a fifth phthalocyanine having the general formula $Z(B)_4$ wherein:
each Z, in the above formulas, represents a member selected from the group consisting of moieties having the general structure:

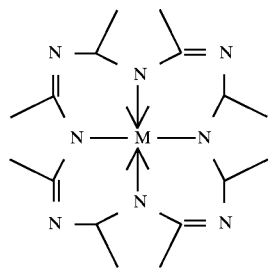

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;

each A, in the above formulas, is the same and represents a member selected from the group consisting of moieties having the general structure:

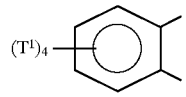

wherein each $T^1$ is independently selected from the group consisting of H, F, Cl, Br, I, and alkyl having from 1 to 18 carbons; and each B, in the above formulas, is the same and represents a member selected from the group consisting of moieties having the general structure:

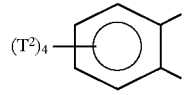

wherein each $T^2$ is independently selected from the group consisting of H, F, Cl, Br, I, and alkyl having from 1 to 18 carbons; and A and B, in the above formulas, are differently substituted, and the $T^1$ and $T^2$ moieties of A and B together collectively include at least two different members selected from the group consisting of H, F, Cl, Br, I, and alkyl having from 1 to 18 carbons, said members having van der Waal's radii differing by less than about 50 percent of the radius of the smallest member.

* * * * *